US006980935B2

(12) United States Patent
Lu et al.

(10) Patent No.: US 6,980,935 B2
(45) Date of Patent: Dec. 27, 2005

(54) METHOD, APPARATUS AND SYSTEM FOR CONSTRUCTING AND MAINTAINING SCENEGRAPHS FOR INTERACTIVE FEATURE-BASED GEOSCIENCE GEOMETRIC MODELING

(75) Inventors: HongQian Karen Lu, Austin, TX (US); David Mack Endres, Leander, TX (US); Yann Cudennec, Austin, TX (US); Eric Jonathan Schoen, Austin, TX (US)

(73) Assignee: Schlumberger Technology Corp., Houston, TX (US)

( * ) Notice: Subject to any disclaimer, the term of this patent is extended or adjusted under 35 U.S.C. 154(b) by 769 days.

(21) Appl. No.: 10/010,540

(22) Filed: Nov. 8, 2001

(65) Prior Publication Data

US 2003/0025692 A1 Feb. 6, 2003

Related U.S. Application Data

(60) Provisional application No. 60/308,915, filed on Jul. 31, 2001.

(51) Int. Cl.$^7$ ............................................. G06F 17/50
(52) U.S. Cl. .............................. 703/1; 700/98; 345/619
(58) Field of Search .............................. 703/1; 700/98; 345/419, 420, 440, 619

(56) References Cited

U.S. PATENT DOCUMENTS

| | | | |
|---|---|---|---|
| 6,191,787 B1 | 2/2001 | Lu et al. | |
| 6,266,053 B1 | 7/2001 | French et al. | |
| 6,483,513 B1 * | 11/2002 | Haratsch et al. | ............ 345/473 |
| 6,608,628 B1 * | 8/2003 | Ross et al. | .................. 345/619 |
| 6,631,403 B1 * | 10/2003 | Deutsch et al. | ............. 709/217 |
| 6,751,655 B1 * | 6/2004 | Deutsch et al. | ............. 709/219 |

FOREIGN PATENT DOCUMENTS

| | | |
|---|---|---|
| GB | 2 317 798 A | 4/1998 |
| GB | 2 353 115 A | 2/2001 |

OTHER PUBLICATIONS

Kochhar, S. et al. "A Unified, Object-Oriented Graphics System and Software Architecture for Visualising CAD/CAM Presentations", Computer Graphics Forum Amsterdam, NL, vol. 15, No. 4, 1996, pp. 229-248, XP001057314, ISSN: 0167-7055.
International Search Report in PCT/US02/24045 dated Mar. 5, 2003. (5 pages).

* cited by examiner

Primary Examiner—Albert W. Paladini
(74) Attorney, Agent, or Firm—Danita J. M. Masele

(57) ABSTRACT

A method, computer system or computer program is provided for interactively constructing, editing, rendering and manipulating geoscience models, including aggregating the functionality of a geometry system and a graphics system, enforcing consistency between the geometry system and the graphics system, and interfacing the geometry system and the graphics system to an application through an integration layer. State machines are also provided that enable updating of only those graphics objects whose geometry or topology have been changed and that are specified as visible by the user, thus increasing performance. A scenegraph construction technique is also provided to reduce memory requirements and further enhance performance. A material property framework is provided, among other things, to communicate changes in the geometry or topology to aggregate objects which then determine which graphics objects are affected by the changes and which graphics objects are to be updated.

65 Claims, 41 Drawing Sheets

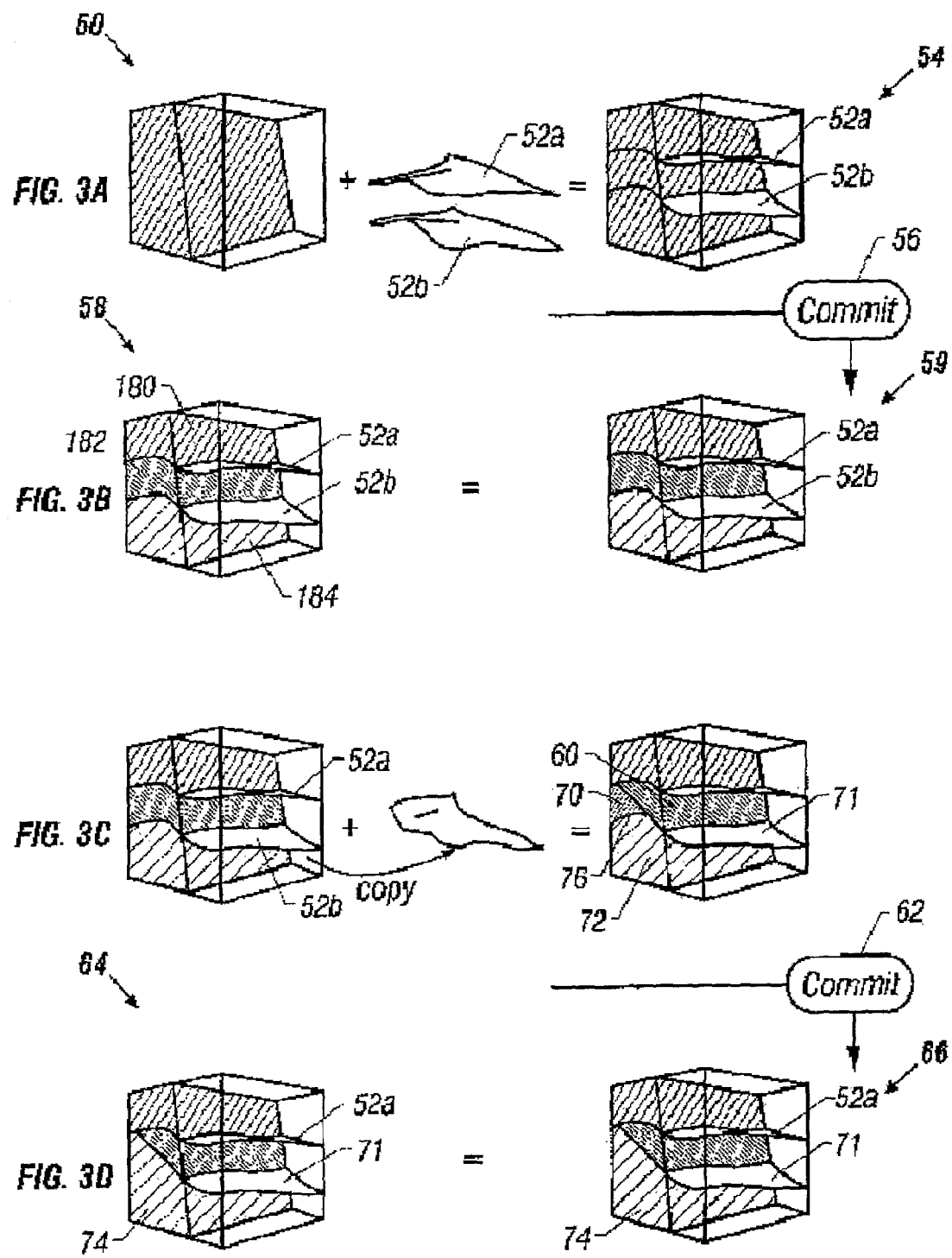

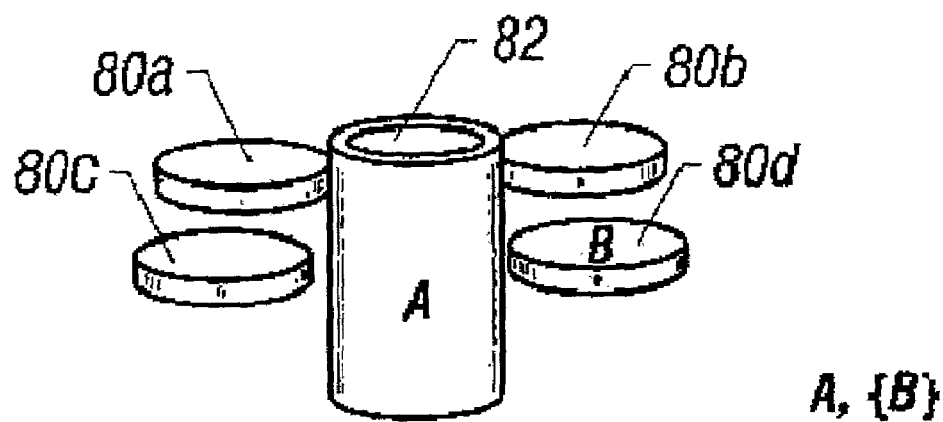
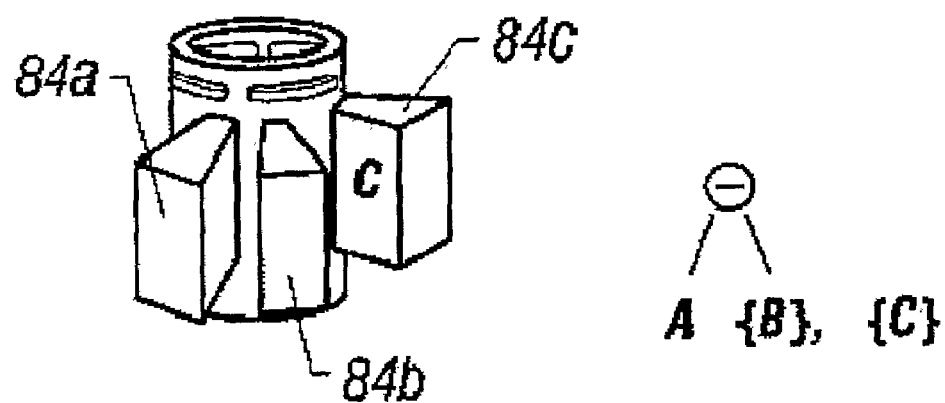
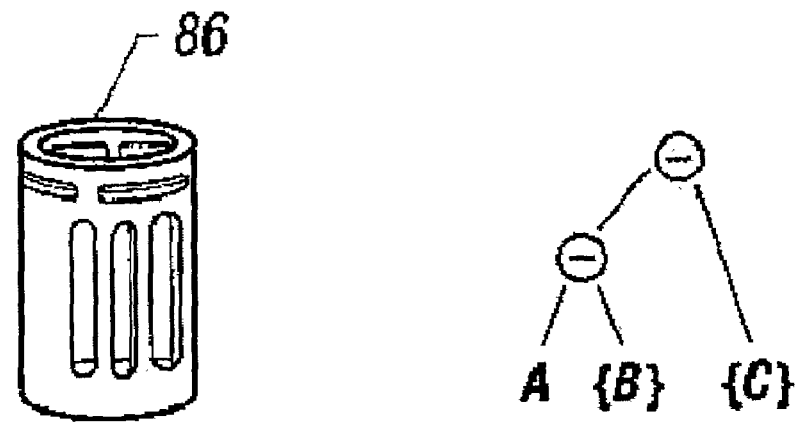
FIG. 4A

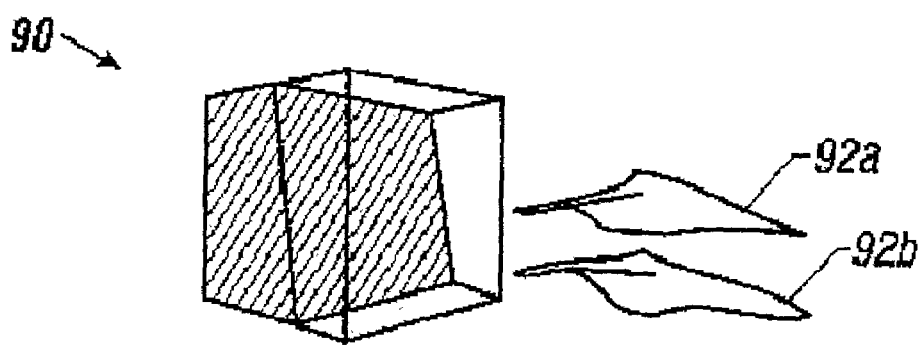
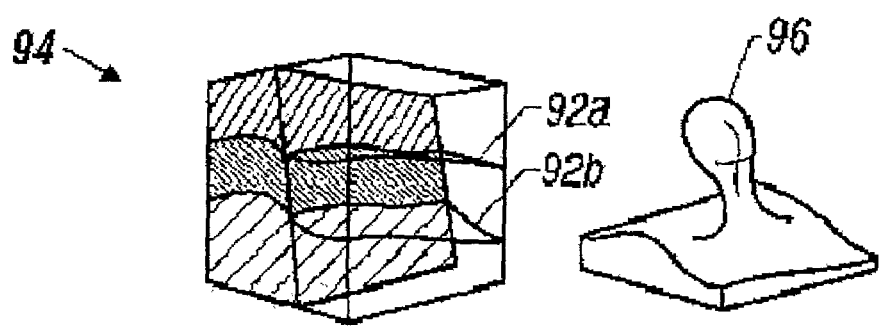
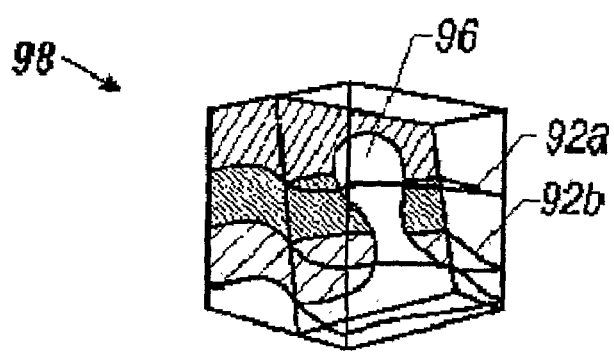
FIG. 4B

METHOD, APPARATUS AND SYSTEM FOR CONSTRUCTING AND MAINTAINING SCENEGRAPHS FOR INTERACTIVE FEATURE-BASED GEOSCIENCE GEOMETRIC MODELING

RELATED APPLICATION

This application is a conversion of Provisional U.S. Application Ser. No. 60/308,915 that was filed on Jul. 31, 2001 from which priority is claimed under 35 U.S.C. 120.

TECHNICAL FIELD OF THE INVENTION

This invention relates in general to computer graphics imaging and geometric modeling, and more particularly, the present invention relates to interactively constructing, editing, rendering and manipulating geoscience models.

BACKGROUND OF THE RELATED ART

Geologists, geophysicists and petroleum engineers use models, including computerized models, of the earth's shell to plan exploration and production of hydrocarbons and, to a lesser extent, other minerals. As hydrocarbons become more and more scarce, the accuracy of the computerized models becomes increasingly important to limiting the cost of locating and producing hydrocarbons and the associated cost of hydrocarbon products, such as gasoline and heating oil.

Interpretation of geophysical and geological data stored in a computerized model relies on the ability of the model to be displayed in such a way that the information contained in the model can be discerned and edited.

The Interactive Geometric Modeling library (IGM) (see U.S. Pat. No. 6,191,787 to Lu, et al.) integrates a geometry engine and a graphics engine. This integration provides a high level interface that supports interactive feature-based 3D geoscience geometric model building, rendering and editing.

A scenegraph is a representation of a scene by a graphics engine. Efficient scenegraph construction and maintenance directly affect the performance of an interactive system. This patent application describes several new techniques for constructing and maintaining a scenegraph, which greatly enhances performance of and adds new functionality to the IGM.

The geometry engine that the IGM uses is the Geometry Query Interface (GQI) (see U.S. Pat. No. 6,128,577 to Assa, et al.). The GQI is a layer built on top of a geometry kernel called "Shapes" from XOX, Inc. The graphics engine is called Open Inventor. The IGM integrates the two engines to enable interactive feature-based geometric modeling.

The GQI builds geometric models via Irregular Space Partitioning using Boolean operations. The resulting model is a boundary representation (b-rep) model. The GQI provides feature-based modeling for geoscience applications, where features are entities of interest to an end user concerning group geometric and topological elements in a model.

Several factors have to be considered for constructing and maintaining scenegraphs for building geoscience models. The process and the generated geoscience geometric models are different from those in traditional CAD industry. Some of these differences that relate to this invention are listed below. These differences affect the manner of constructing and maintaining the scenegraph for rendering.

First, models are built via irregular space partitioning where input features are split into pieces, while CAD industry typically uses Constructive Solid Geometry where input features are combined via Boolean operations. Secondly, the material properties in a geoscience geometric model are typically space changing and are attached at the feature level, while in CAD industry each element in a model typically has a constant material property. Third, a crack is normal in a geoscience model, while a crack may be a defect in a CAD model.

Similar to the needs of users in the CAD industry, a geoscience user wants to be able to interact with and maintain the identities of input features and to assign and interact with new features.

For geoscience applications, the following two types of views are typically required. The first type is surface view that renders surface cells or features in the model. The second type is volume view that renders the volume cells or features in the model. A surface cell has its own identity. It also serves as a boundary cell for two volumes that share it. A user may also want combinations of the two types. Consequently, there is more than one graphical representation for the same geometric model.

Finally, software related to geoscience applications typically consume considerable computer resources, oftentimes requiring powerful workstations that are not easily moved. However, it would be desirable to have the capability mentioned above at field locations. There is, therefor, a need in the art to increase the efficiency of geoscience software to the point that it can be installed on normal mobile computing devices, such as laptop computers.

SUMMARY OF THE INVENTION

In accordance with the present invention, the disadvantages and problems associated with the prior art are solved by reducing memory requirements through a new scenegraph construction method, as well as a providing a finite state machine that handles the consistency between graphics objects (whether set visible or invisible and valid or invalid) and their corresponding geometry objects, thereby enabling the selective or partial updating of only those graphics objects whose geometries or topologies have been changed and that are set as visible by the user, further enhancing performance.

The present invention includes a method for interactively editing a model comprising a first surface method being implemented on a programmable computer having a processor, a storage system and at least one input and at least one output device. The model is preferably stored in media that is readable by the programmable computer or can be stored on other media such as tape, hard disk, CD-ROM, etc. A database that is operative with the storage system and the processor stores a model of the various objects that can be viewed on one or more scenegraphs.

In the simplest embodiment of the method of the present invention, the data representing a first surface feature in the database is loaded into random access memory or system memory of the computer system of the present invention. An aggregate feature is created for the first surface feature. After creating the aggregate feature, a first graphics object is created from the aggregate feature. Then the first graphics object is added to the application scenegraph. Thereafter, a geometry object for the aggregate feature is created and then the first surface feature is edited in the model. After editing the surface feature, the graphics for the model are updated selectively so that only those graphics objects whose geometry objects have been changed and that are not set as viewable by the user are not updated—thus conserving time and resources. Selective updating is an important feature of the present invention and distinguishes it from prior art systems that update all objects, regardless of whether or not those objects are visible and/or have changed. The present invention only updates those graphics in the model that are displayed to the user. For instance, if the graphics object in question is set as invisible to the user, then they are not immediately updated. Once the updating step is completed, the first graphic object is removed from the application scenegraph.

The present invention also provides an interface and an IGM that is operative with the interface as well as a GQI that is operative with the IGM. The interface is used for selecting an operation to perform on a second surface feature and that interface is also developed to inform the IGM of the selection that the user has made. Once that has happened the IGM can invoke the operation with the GQI. And then thereafter, at least one callback from the GQI is performed to inform the IGM during the execution of the operation so that the updating of the graphics object of the model can be done to refresh the output device.

It is preferred that the editing be accomplished by irregular space partitioning and that the updating of the graphics object includes the creation of graphics objects or, if the performing of the callback causes a change of state for the aggregate feature, the aggregate feature change of state is recorded in a consistency finite state machine of the present invention. The consistency finite state machine manages consistency between geometry and graphics. The consistency finite state machine facilitates the selective (partial) update of the graphics presented to the user.

The method in the present invention also includes a callback method that includes the invalidation of graphics objects for the aggregate feature. The callback method can also perform validation of the geometry of the aggregate feature so that a distinction between invalid graphics and valid geometry can be made.

The callback method of the present invention includes providing a set of objects that facilitates the callback, namely a first geometry modeler feature object. Also included in the method is a changed geometry object that is contained in a geometry model or feature object. There is also a first meta-property attribute object that is associated with the changed geometry object. In addition, a first meta-property object that is associated with a meta-property attribute object is provided. The first meta-property object has a number of properties associated with it, mainly a point set preservation property, a point set preservation property policy object, a cell back pointer property object, an aggregate back pointer property policy object, a geometry cell object that is associated with the back cell pointer object, an aggregate cell object associated with the geometry cell object and a display cell graphics object associated with the aggregate cell object. Further, a second meta-property object that is associated with the geometry modeler feature object is included as well as a second meta-property object that is associated with second meta-property attribute object. The second meta-property object has a number of the same objects and features as the first meta-property object. Namely, the second meta-property object has a point set preservation property object, a point set preservation property policy object, a feature back pointer property object, a second aggregate back pointer property policy object, a geometry feature object associated with the feature back pointer property object, an aggregate feature object associated with a geometry feature object and a display feature object that is associated with the aggregate feature object.

Callbacks are performed in a series of sub-steps. For instance, if the callback is for a volume object then the edit is performed for the volume feature, otherwise the edit is for the surface feature. In the case of updating graphics, preferably the update is performed for only those cells that have changed geometrically. Alternatively, the update in the graphics can include only those features that have changed topologically. However, another embodiment of the present invention includes the updating of graphics for those features that have changed either topologically or geometrically. Finally, the update can take place for those features that have changed both topologically and geometrically.

The creation of graphics for the aggregate feature of the model is performed in a series of sub-steps. Generally, the relevant surface features from the model are obtained and for each of the relevant surfaces, if the surface feature has a graphics object then the graphics object is updated. Otherwise, the graphics object is first created and then either the updated graphics object or the created graphics object is added to the surface scenegraph root node.

OPERATION OF THE PRESENT INVENTION

The present invention can be described as a method for interactively editing a model that is implemented on a computer comprising a processor, a data storage system, at least one input device and at least one output device, including, but not limited to, a computer monitor, storage device, or print-out. The model is preferably stored on a computer-readable media. The model itself has at least a first surface, although many surfaces are typically modeled.

The method begins by loading data of the first surface feature from a database that is stored in the data storage system. Next, an aggregate feature is created for the first surface feature. This enables the creation of a first graphics object from the aggregate feature. Thereafter, the first graphic object is added to the application scenegraph. Next, a geometry object is created for the aggregate feature. The first surface feature in the model is then edited as desired. Once editing is complete (e.g., the user opts out of edit-mode, or a requisite period of time elapses) the graphics for the model are selectively updated. The selective update relieves the various devices from recalculating and displaying all updates and changes. Instead, only those updates that affect what the user experiences are updated. Finally, the first graphics object of the first surface feature is removed from the application scenegraph.

Editing and Updating

The process of editing itself is composed of several steps. First, one must provide an interface. Next, an IGM that is operative with the interface must also be provided. A GQI is provided that is operative with the IGM to enable geometric modeling. This enables the user, through the interface, to select an operation to perform on a second surface feature. The interface is designed to inform the IGM of the user's selection. The operation itself is invoked with the GQI. During the editing process, it is necessary to perform at least one callback from the GQI to the IGM during execution of the operation. The callback is used to update the graphics object of the model to refresh the output device. Editing can be accomplished via irregular space partitioning, although other techniques of editing are possible with the present invention. Once the editing is complete, the updating of the graphics can commence, typically by creating the graphics object. The present invention has a special feature wherein the step of updating includes updating graphics only those cells that have changed geometrically and/or topologically. The updating step may also include the referencing of a visibility finite state machine. The visibility finite state machine aids in the managing of the graphics object's updating operations, and the graphics object's visibility update operations. Use of the visibility finite state machine enables the updating of only those graphics objects that are designated as visible (to the user). The visibility finite state machine can be used to designate a graphics object as visible, and also to check on the validity of the graphics object. If the graphics object is valid, then the graphics object can be added to the scenegraph. Otherwise, the graphics object can be updated and then added to the scenegraph.

The process of updating can encompass several steps. For example, updating may include checking the state of each feature in the scenegraph. Generally, if the graphics of the feature is valid or if the feature's geometry is invalid, then the feature's graphics object is not updated. However, if the feature's geometry is valid and the graphics are invalid, then the graphics object of the feature is updated.

Another form of updating can include checking the state of each cell in the scenegraph. In this scenario, if the graphics for the cell are valid or if the geometry of the cell is invalid, then the graphics object of the cell is not updated. If the geometry for the cell is valid and the graphics of the cell is invalid, then graphics object of the cell is updated.

The method of the present invention may also encompass those situations where a second surface feature is not contained within the model, although the second feature can, of course, be contained within the model.

Creating Graphics

The method of the present invention also involves the creation of graphics for various entities, such as an aggregate feature. Typically, this process involves obtaining all relevant surface features in the model. For each of the relevant surface features, if that surface feature has a graphics object, then that graphics object is updated. Otherwise, a graphics object for the surface feature is created. Afterward, the graphics object for the surface feature is added to a surface scenegraph root node.

In addition to the steps outlined in the preceding paragraph, other steps may optionally be accomplished, for example, the aggregate objects of all two-dimensional cells for the surface feature may be obtained. Next, the aggregate objects of each of the cells can be prompted to obtain at least one valid graphics object and to add that graphics object to a sub-scenegraph of the surface feature. Once that is completed, the graphics object of the surface feature can be validated.

Still more steps may be taken for the method outlined immediately above. For example, the step of obtaining valid graphics object for a cell can include a check to determine if the graphics object for the cell does not exist. If the graphics object doesn't exist, then the graphics object for the cell is created and validated. If the graphics object for the cell does exist but is not valid, then the graphics object for the cell is updated and validated.

Alternatively, the method of the present invention for creating graphics may also include creating graphics for at least one volume cell from the model. This alternative method includes obtaining at least one relevant active volume cell in the model. Once obtained, a check can be made to ensure that the graphics objects of all of the two-dimensional cells of each volume cell have been created. Then, for each of the two-dimensional cells, aggregates can be obtained. A new aggregate can be created if the two-dimensional cell aggregate does not exist. Then each two-dimensional cell is checked to ensure that it has valid graphics. Thereafter, a graphics object can be created for each of the volume cells. Then, for each volume cell, the graphics content, preferably without color material, of each two-dimensional cells of the volume cell is added to the sub-scenegraph of the graphics object of the volume cell. Finally, the graphics object is added for each of the volume cells to the volume scenegraph root node. An instantiation of a graphics content, preferably without color material, that graphically represents a two-dimensional cell is shared by at least one scenegraph containing a graphics object of a surface feature that has the two-dimensional cell as a child, as well as at least one of the scenegraphs that contains graphics objects of either one volume cell or two volume cells that have the two-dimensional cell as part of their boundaries.

Callbacks

The present invention makes extensive use of callback within the object framework. For instance, a callback can cause a change of state for the aggregate feature. Preferably, the aggregate features is a consistency finite state machine, so that the callback is facilitated efficiently. It is also preferable that the consistency finite state machine manage the consistency between the geometry and the graphics. Callbacks are also useful for invalidating the graphics object for the aggregate feature and for validating the geometry of the aggregate feature. For example, if the callback is for a volume object, then a specific callback is used for the volume feature. Otherwise, an edit callback for a surface feature is performed.

Callbacks according to the present invention can come in a variety of configurations and circumstances. For example, edit callbacks for a volume feature include registering the meta-property split callback class method with the geometry modeler interface. The geometry modeler interface is intended to be invoked when a volume split event occurs. Thereafter, a first meta-property attribute is attached to at least one volume object that is contained by the volume feature. Then a callback is received from the geometry modeler interface that specifies a first volume object, a second volume affected by a change to the first volume object and the first meta-property attribute. A pointer value is then obtained from the first meta-property attribute which then allows the de-referencing of the pointer value to locate a first meta-property object. A split callback is invoked in the first meta-property object with the first meta-property attribute, the first volume object and the second volume object. This last step itself encompasses obtaining a first point set preservation property instance and a first point set preservation policy instance from the property instance, as well as initiating a first split callback to the point set preservation policy instance with the point set preservation property instance, the first volume object and the second volume object. This last sub-step itself includes obtaining at least one containing feature for the first volume object and initiating a feature add child update on the geometry modeler interface with the containing feature and the second volume object. Then, a cell back pointer property instance is obtained so that an aggregate back pointer property policy instance can be obtained from the cell back pointer property instance whereupon a second split callback is initiated to the aggregate back pointer property policy instance with the cell back pointer property instance. The latter callback itself includes obtaining a volume geometry cell object from the cell back pointer property instance and initiating a cell split call to the volume geometry cell object. The latter sub-step may encompass initiating a call to the volume cell aggregate patron of the volume geometry cell object to invalidate the graphics of the first volume.

Performing a feature add child callback for a volume feature includes registering the meta-property add child callback class method with the geometry modeler interface that is to be invoked when a feature add child event occurs. This can include attaching a second meta-property attribute instance to the volume feature; and receiving, from the geometry modeler interface, the add child callback specifying the volume feature, a volume object and the second meta-property attribute. Next, a pointer value from the second meta-property attribute is obtained and then the pointer value is de-referenced to locate a second meta-property object. The add child callback is invoked in the second meta-property object. The latter step includes obtaining a second point set preservation property instance; obtaining a second point set preservation property policy instance from the second point set preservation property instance; and initiating the add child callback method of the second point set policy object with the volume feature and the volume geometry object. That latter sub-step itself includes attaching the point set preservation property to the volume cell; obtaining a feature back pointer property instance; and obtaining a second aggregate back pointer property policy instance from the feature back pointer property instance; and initiating the add child callback method of the second aggregate back pointer property policy instance with the volume feature, the volume geometry object and the volume feature back pointer property. The latter sub-step itself includes initiating an add child notify method call to the volume feature geometry object identified by the feature back pointer property instance. That latter sub-step itself includes initiating a call to the volume feature aggregate patron of the volume feature object in order to validate the geometry of the volume feature object; and initiating a call to the volume feature aggregate patron of the volume feature object in order to invalidate the graphics of the volume feature object.

Yet another aspect of the method of the present invention involves performing an edit callback for a surface feature. This aspect of the method includes registering the meta-property split callback class method with the geometry modeler interface to be invoked when a surface split event occurs; attaching a first meta-property attribute to at least one surface object contained by the surface feature; receiving from the geometry modeler interface a callback specifying a first surface object, a second surface affected by a change to the first surface and the first meta-property attribute; obtaining a pointer value from the first meta-property attribute and de-referencing the pointer value to locate a first meta-property object; invoking a split callback in the first meta-property object with the first surface object, the second surface object and the first meta-property attribute. The latter step itself includes obtaining a first point set preservation property instance; obtaining a first point set preservation policy instance from the property instance; and initiating a first split callback to the point set preservation policy instance with the point set preservation property instance, the first surface object and the second surface object. The latter sub-step itself includes obtaining at least one containing feature for the first surface object; and initiating a feature add child update on the geometry modeler interface with the containing feature and the second surface object; obtaining a cell back pointer property instance; obtaining an aggregate back pointer property policy instance from the cell back pointer property instance; and initiating a second split callback to the aggregate back pointer property policy instance with the cell back pointer property instance. The latter sub-step itself includes obtaining a surface geometry cell object from the cell back pointer property instance; and initiating a cell split call to the surface geometry cell object. This latter sub-step includes initiating a call to the surface cell aggregate patron of the surface geometry cell object to invalidate the graphics of the first surface.

The step of performing a feature add callback (mentioned in the preceding paragraph) itself includes registering the meta-property add child callback class method with the geometry modeler interface that is to be invoked when a feature add child event occurs; attaching a second meta-property attribute instance to the surface feature; receiving from the geometry modeler interface the add child callback specifying the surface feature, a surface object and the second meta-property attribute; obtaining a pointer value from the second meta-property attribute and de-referencing the pointer value to locate a second meta-property object; and invoking the add child callback in the second meta-property object. This latter sub-step itself includes obtaining a second point set preservation property instance; obtaining a second point set preservation property policy instance from the second point set preservation property instance; and initiating the add child callback method of the second point set policy object with the surface feature and the surface geometry object. This latter sub-step itself includes attaching the point set preservation property to the surface cell; obtaining a feature back pointer property instance; obtaining a second aggregate back pointer property policy instance from the feature back pointer property instance; and initiating the add child callback method of the second aggregate back pointer property policy instance with the surface feature, the surface geometry object and the surface feature back pointer property. This latter sub-step itself includes initiating an add child notify call to the surface feature geometry object identified by the feature back pointer property instance. This latter sub-step itself includes initiating a call to the surface feature aggregate patron of the surface feature object to validate the geometry of the surface feature object; and initiating a call to the surface feature aggregate patron of the surface feature object to invalidate the graphics of the surface feature object.

Callbacks can have a number of effects on various objects of the present invention. For instance, performing the callback may cause a change of state for a cell. The change of state of the cell can be recorded in a consistency finite state machine.

Another aspect of the method of the present invention is the performing of an edit callback for a volume feature. That aspect of the method of the present invention includes registering the meta-property merge callback class method with the geometry modeler interface to be invoked when a volume merge event occurs; attaching a first meta-property attribute to at least one volume object contained by the volume feature; receiving from the geometry modeler interface a callback specifying a first volume object, a second volume object, a surface object which formerly bounded the first and second volume objects and which has been removed from the model, and a meta-property attribute; obtaining a pointer value from the geometry model attribute and de-referencing the pointer value to locate a first metaproperty object; and invoking a merge callback in the first meta-property object. The latter sub-step itself includes obtaining a first point set preservation property instance; obtaining a first point set preservation policy instance from the property instance; and initiating a first merge callback to the point set preservation policy instance with the point set preservation property instance, the first volume object, the second volume object, and the surface object. That latter sub-step itself includes obtaining at least one containing feature for the first volume object; and initiating a feature remove child update on the geometry modeler interface with the containing feature and the second volume object; obtaining a cell back pointer property instance; obtaining an aggregate back pointer property policy instance from the cell back pointer property instance; and initiating a second merge callback to the aggregate back pointer property policy instance with the cell back pointer property instance, the first volume object, the second volume object, and the surface object. The latter sub-step itself includes obtaining a volume geometry cell object from the cell back pointer property instance, and initiating a cell merge call to the volume geometry cell object. That latter sub-step itself includes initiating a call to the volume cell aggregate patron of the volume geometry cell object to invalidate the graphics of the first volume.

The method for performing an edit callback on a volume feature itself optionally has a removal of the child edit callback. That sub-method includes registering the meta-property remove child callback class method with the geometry modeler interface to be invoked when a feature remove child event occurs; attaching a second meta-property attribute instance to the volume feature; receiving from the geometry modeler interface the remove child callback specifying the volume feature, a volume object and the second meta-property attribute; obtaining a pointer value from the second meta-property attribute and de-referencing the pointer value to locate a second meta-property object; and invoking the remove child callback in the second meta-property object. The latter sub-step includes obtaining a second point set preservation property instance; obtaining a second point set preservation property policy instance from the second point set preservation property instance; initiating the remove child callback method of the second point set policy object with the volume feature and the volume geometry object. The latter sub-step includes removing the point set preservation property from the volume cell; obtaining a feature back pointer property instance; obtaining a second aggregate back pointer property policy instance from the feature back pointer property instance; and initiating the remove child callback method of the second aggregate back pointer property policy instance with the volume feature, the volume geometry object and the volume feature back pointer property. The latter sub-step includes initiating a remove child notify call to the volume feature geometry object identified by the feature back pointer property instance. That latter sub-step includes initiating a call to the volume feature aggregate patron of the volume feature object to validate the geometry of the volume feature object; and initiating a call to the volume feature aggregate patron of the volume feature object to invalidate the graphics of the volume feature object.

Performing an edit callback on a surface volume is similar to the same method for the volume feature (described above). Specifically, the step of performing an edit callback for a surface feature includes registering the meta-property merge callback class method with the geometry modeler interface to be invoked when a surface merge event occurs; attaching a first meta-property attribute to at least one surface object contained by the surface feature; receiving from the geometry modeler interface a callback specifying a first surface object, a second surface object, and a curve object which formerly bounded the first and second surfaces and which has been removed from the model and a meta-property attribute; obtaining a pointer value from the geometry model attribute and de-referencing the pointer value to locate a first meta-property object; and invoking a merge callback in the first meta-property object. The latter sub-step includes obtaining a first point set preservation property instance; obtaining a first point set preservation policy instance from the property instance; and initiating a first merge callback to the point set preservation policy instance with the point set preservation property instance, the first surface object, the second surface object, and the curve object. The latter sub-step includes obtaining at least one containing feature for the first surface object; and initiating a feature remove child update on the geometry modeler interface with the containing feature and the second surface object; obtaining a cell back pointer property instance; obtaining an aggregate back pointer property policy instance from the cell back pointer property instance; and initiating a second merge callback to the aggregate back pointer property policy instance with the cell back pointer property instance, the first surface object, the second surface object, and the curve object. The latter sub-step includes obtaining a surface geometry cell object from the cell back pointer property instance; and initiating a cell merge call to the surface geometry cell object. The latter sub-step itself includes initiating a call to the surface cell aggregate patron of the surface geometry cell object to invalidate the graphics of the first surface.

Finally, the step of performing a feature remove callback for a surface feature includes registering the meta-property remove child callback class method with the geometry modeler interface to be invoked when a feature remove child event occurs; attaching a second meta-property attribute instance to the surface feature; receiving from the geometry modeler interface the remove child callback specifying the surface feature, a surface object and the second meta-property attribute; obtaining a pointer value from the second meta-property attribute and de-referencing the pointer value to locate a second meta-property object; and invoking the remove child callback in the second meta-property object with the second meta-property attribute, the surface feature and the surface geometry object. The latter sub-step includes obtaining a second point set preservation property instance; obtaining a second point set preservation property policy instance from the second point set preservation property instance; and initiating the remove child callback method of the second point set policy object with the surface feature and the surface geometry object. The latter sub-step itself includes removing the point set preservation property from the surface cell; obtaining a feature back pointer property instance; obtaining a second aggregate back pointer property policy instance from the feature back pointer property instance; and initiating the remove child callback method of the second aggregate back pointer property policy instance with the surface feature, the surface geometry object and the surface feature back pointer property. The latter sub-step includes initiating an remove child notify call to the surface feature geometry object identified by the feature back pointer property instance. The latter sub-step includes initiating a call to the surface feature aggregate patron of the surface feature object to validate the geometry of the surface feature object; and initiating a call to the surface feature aggregate patron of the surface feature object to invalidate the graphics of the surface feature object.

A callback can be performed in a number of ways. Generally, however, the callback is accomplished with a set of one or more objects. Generally, that set of objects includes a first geometry modeler feature object; a changed geometry object that is contained in the geometry modeler feature object; a first meta-property attribute object that is operatively associated with the changed geometry object; a first meta-property object that is associated with the first meta-property attribute; a second meta-property attribute object that is associated with the geometry modeler feature object; and a second meta-property object associated with the second meta-property attribute object.

The first meta-property object itself has a set of objects, such as a point set preservation property object; a point set preservation property policy object; a cell back pointer property object; an aggregate back pointer property policy object; a geometry cell object associated with the cell back pointer object; an aggregate cell object associated with the geometry cell object; and a display cell graphics object associated with the aggregate cell object.

The second meta-property attribute object itself has a set of objects, includes a second point set preservation property object; a second point set preservation property policy object; a feature back pointer property object; a second aggregate back pointer property policy object; a geometry feature object associated with the feature back pointer property object; an aggregate feature object associated with the geometry feature object; and a display feature graphics object associated with the aggregate feature object.

BRIEF DESCRIPTION OF THE DRAWINGS

For a more complete understanding of the present invention and its advantages, reference is now made to the following description, taken in conjunction with the accompanying drawings, in which:

FIGS. 3, 4*a* and 4*b* are representations of stages in a modeling process.

DETAILED DESCRIPTION OF THE INVENTION

Geometric model building and editing are largely an interactive process that requires adequate graphics support. Given the complexity of interactive computer graphics, it is desirable to write applications using high-level development tools such as OPEN INVENTOR, an object oriented graphics library.

Schlumberger Ltd.'s GEOFRAME product, an application for performing geoscience modeling, includes a geometry modeling component, called the GEOMETRY QUERY INTERFACE ("GQI"), which provides an application programming interface ("API") to build and edit solid 3D geometry models. Solid 3D geometry models contain the relationships between the various geometry elements contained in the model. A portion of The GQI's geometry modeling functionality is provided by a commercial geometry engine, XOX Corporation's SHAPES package.

A graphics system displays graphic information in such a way so that complicated relationships, such as those contained in the geometry model, can be visualized. The SHAPES package includes a graphics system based on OpenGL. For performance reasons, however, it is important to separate graphics interaction and geometry processing. Further, virtually all earth science applications require visualization or interactive graphics but not all of them require geometric modeling. Therefor, it simplifies development to use one generally suitable graphics system for writing applications and to add a geometry engine only where required.

When designing an application including both a graphics and a geometry system, the design issues are not only how to render and visually interact with the geometry model, but also how to make the geometry engine and the graphics engine work together smoothly. In the case of OPEN INVENTOR and GQI/SHAPES, both engines are self-contained and manage their own objects and operations on those objects. The two engines use different internal representations for equivalent objects to describe their geometry, topological relationships, and physical properties. This leads to inconsistencies when the same object is operated on by both engines. Integration of the two engines entails the addition of some mechanism to keep track of and reconcile those inconsistencies.

Figure 1:
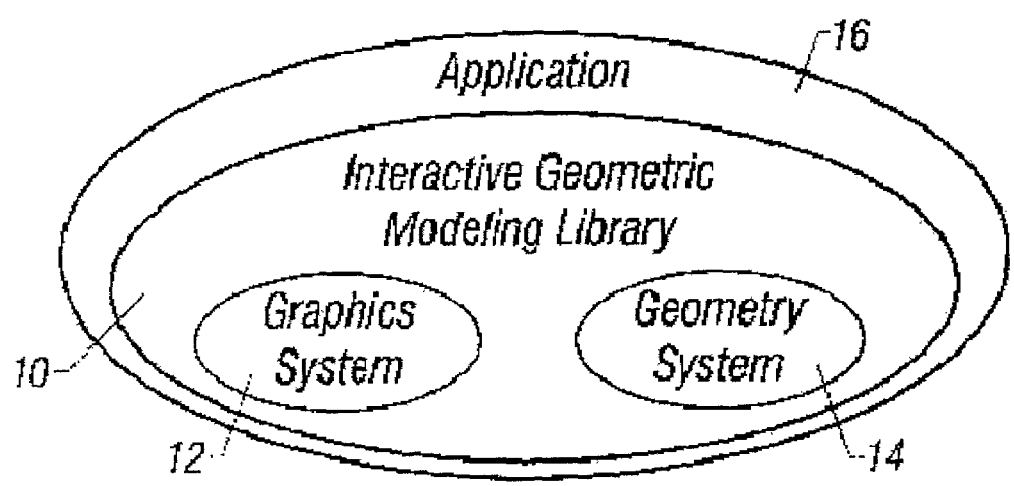
FIGS. 1 and 7 are block diagrams.

One such design, an interactive geometric modeling library ("IGM") 10, integrates a high-level graphics system ("graphics system") 12 and a high-level geometric modeling package ("geometry system") 14, providing an application 16 with a consistent view of both sub-systems, as shown in FIG. 1. The IGM provides an architecture that integrates a graphics system and a geometry system to enable interactive construction, editing, and visualization of geoscience models.

Figure 2:
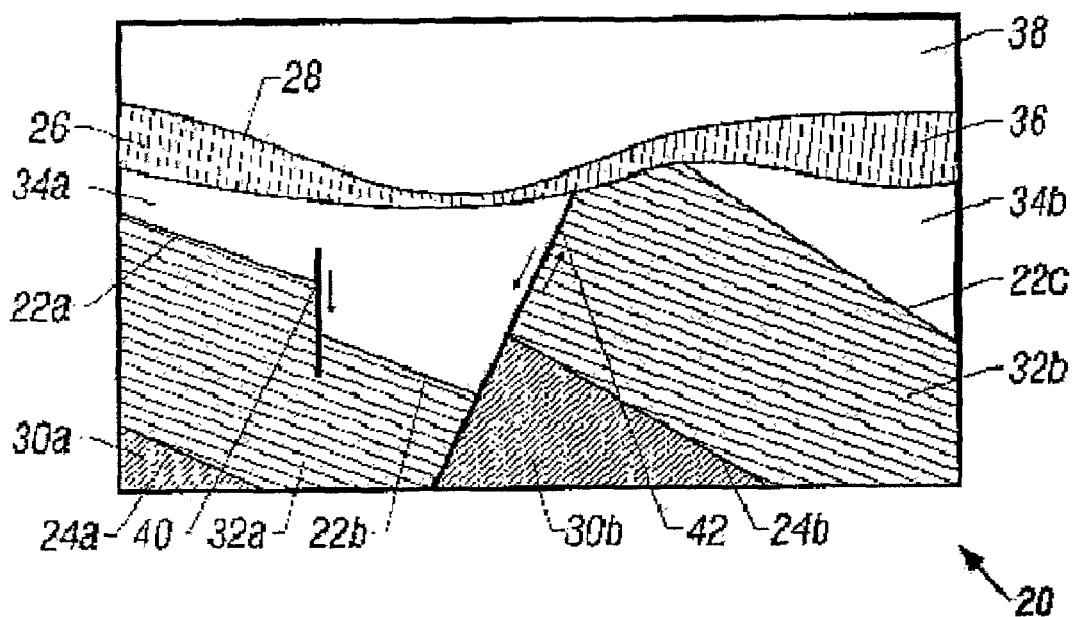
FIGS. 2, 5*a* and 5*b* are a representation of items to be modeled.

Earth science applications have specific geometry modeling requirements in addition to those met by conventional CAD packages. Subsurface structures form typically "layer cakes" 20 where "horizons", such as horizon 22*a*, 22*b*, 22*c*, horizon 24a, 24b, and horizons 26 and 28, separate layers, such as segmented layer 30a, 30b, segmented layer 32a, 32b, segmented layer 34a, 34b, and layers 36 and 38, as shown in FIG. 2. Layer cakes are often broken up into "fault blocks", such as fault blocks 30a, 30b, 32a, 32b, 34a, 34b, that are bounded by "faults", such as faults 40 and 42. In terms of geometric modeling, this means that the geometry engine used must support the representation and computation of non-manifold geometries, that is, geometries having mixed dimensions (i.e., 3D fault blocks and 2D faults).

Horizons form the boundaries of layers; faults separate and offset blocks of layers. Logically, layers and horizons are considered single objects even if they are split up and spatially separated as, for example, the horizon 22a, 22b, 22c separating layer 32a, 32b from layer 34a, 34b.

A region of interest 50 may be sub-divided by inserting surfaces 52a, 52b to produce layer cake 54, as shown in FIG. 3. At first, the sub-division appears only on the screen. Once the application is satisfied with the location of the surfaces, it "commits" 56, computing intersections, and establishing connection relationships between all objects in the assembly to produce layer cake 58 and the layers are rendered on the screen to provide screen view 59.

Building geometric models of subsurface structures, or earth models, is largely an iterative process in which models are refined as new subsurface data become available. In FIG. 3, the lower surface 52b is deformed to produce horizon 71, changing the geometry of the layer 60 above it to a wedge or "pinchout". Again, after the application is satisfied, it commits 62, causing the change to be reflected in the geometry model 64 and on the screen 66. In particular, the IGM merges two layers 70 and 72, to produce layer 74, removing horizon 76 in the process. To accommodate such changes, adequate support for model editing is as important as facilities to build models from scratch.

Earth models can be large and may contain several tens to hundreds of surfaces, each represented by several ten-thousands to hundred-thousands of triangles, in the case of a tessellated surface. The IGM must perform well on large data sets. While it may be acceptable, or even required, for some applications to run as batch processes, it must be possible to interactively work with an earth model. This includes viewing a model as well as editing its objects and their attributes.

Different applications have to be able to share the earth model. This means that persistent storage must include all shapes, topological relationships, and attributes which make up a model.

Most commercial geometric modeling systems use boundary representations and architecturally separate the representations of shape, topology, and attributes such as material properties. Some systems are able to represent non-manifold geometries, for example, 3D objects with embedded surfaces or 2D objects with embedded curves. In such objects, boundaries are shared between adjacent components, for example, fault 42 is shared by fault blocks 30b, 32a, and 32b, as shown in FIG. 2.

Traditional computer aided design ("CAD") applications build complex 3D geometries by combining primitive 3D building blocks such as blocks and cylinders. This is referred to as constructive solid geometry (CSG) modeling. For example, as shown in FIG. 4a, subvolumes 80a–d are subtracted from an initial shape 82. Further subvolumes 84a–c are subtracted producing the final shape 86. CSG modeling is unsuitable for building earth models where the shapes of 3D objects such as geologic layers have to be inferred from the 2D objects that bound them such as horizons and fault planes.

Irregular space partition ("ISP") provides the capability to build earth models because it operates as a sequence of sub-divides and inserts, as shown in FIG. 4b. Region of interest 90 is sub-divided by surfaces 92a and 92b to produce layer cake 94. A subvolume 96, representing a salt dome, is inserted into layer cake 94 and the shape of the boundaries between the objects is edited to produce the final model 98.

ISP models can, in addition, represent smoothly varying material property fields which may contain internal discontinuities that occur along distinct boundaries. The location of the discontinuity boundaries make up the shape and structure of the model. The shape of discontinuity boundaries is explicitly represented. These boundaries may lie anywhere in an infinite space, have any shape, and intersect one another to partition space into sets of distinct sub-regions.

An ISP model is built by defining a "region of interest" and subdividing it with lower-dimensional objects, for example, a subsurface region subdivided into layers by stratigraphic boundaries. In addition to subdividing a region, other regions can be embedded into them. The GQI's implementation of ISP modeling supports the notion of features which makes it possible to treat collections of regions as uniform objects.

Geometry engines provide a variety of representations for shapes, including analytical and parametric curve and surface representations. In earth science, triangle meshes are widely used for surface representation.

Topological relationships in a model are represented as a graph in which nodes are topological entities such as vertices, curves, faces, and volumes, and in which edges are connectivity relationships. This is called a boundary representation, or "b-rep". Both CSG and ISP modeling can generate b-reps.

Figure 5A:
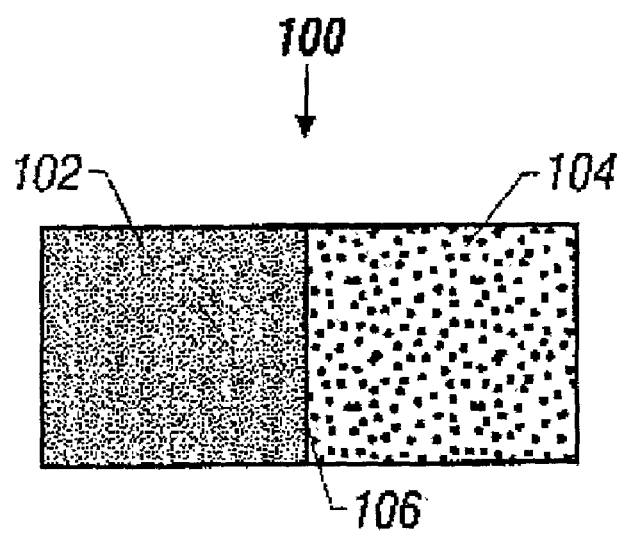
Figure 5B:
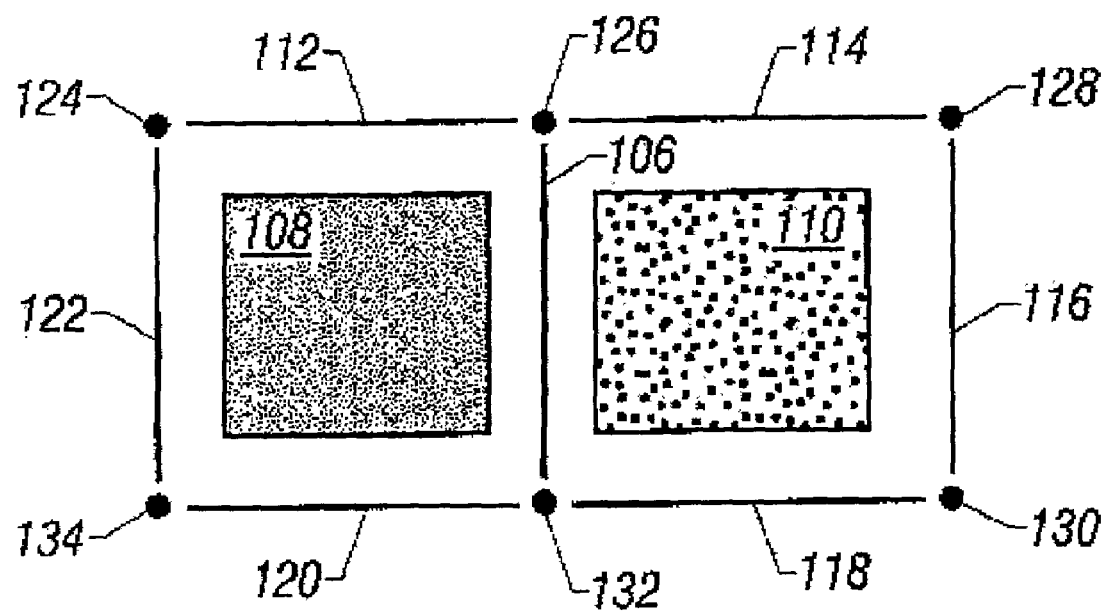

For example, FIG. 5a shows an object 100 comprised of two adjacent rectangles 102, 104 with a shared boundary 106. An exploded version of object 100, shown in FIG. 5b, demonstrates that it comprises two faces 108, 110, seven edges 106, 112, 114, 116, 118, 120, and 122, and six vertices 124, 126, 128, 130, 132 and 134. The topological relationships between these geometric elements, illustrated in FIG. 5c, comprises circles 136 and 138, representing face 108 and 110, respectively. Face 108 is connected to and bounded by four edges 120, 122, 112, and 106, represented by circles 140, 142, 144 and 146, respectively. The "bounded by" relationship is represented by arcs 150, 152, 154, and 156. Face 110 is connected to and bounded by four edges 114, 116, 118, and 106, represented by circles 158, 160, 162 and 146, respectively. The "bounded by" relationship is represented by arcs 164, 166, 168, and 170.

Attributes are typically associated with topological entities. For example, the rectangles' color attribute 172 and 174 may be associated with their corresponding faces 136 and 138, respectively.

Geometric modeling systems support a comprehensive set of geometric operations. These include curve/curve, surface/surface and surface/curve intersections as well as boolean operations such as the union, subtraction, and intersection of solid objects. Boolean operations on solids are also called (topological) classification. Support for non-manifold objects implies that some classifications, namely the Subdivide operation, produce composite rather than "monolithic" objects. Consider, for example, the subdivision of the region of interest 50 by two surfaces 52a and 52b in FIG. 3.

In addition to surfaces 52a and 52b, the resulting model contains three layers 180, 182, and 184 that replace the original block.

Many geometric computations run in "interactive time", that is, they are completed in less than a few seconds. Boolean operations involving meshes composed of on the order of half a million triangles, however, may take in the order of minutes.

Transformation of a single object is very fast; transforming the same object, if it forms a piece of a larger assembly, may take considerably more time due to the required re-classification.

GQI/SHAPES implements a geometry modeling system that supports representation and computation of non-manifold objects. GQI/SHAPES provides a C-language API with encapsulated abstract data types. Extensibility is given through the SHAPES attribute mechanism that allows applications to register callbacks with attributes. The callbacks that are triggered as classification algorithms change the states of their associated objects. GQI/SHAPES defines a proprietary file format for persistent storage.

High-level 3D graphics systems are libraries that encapsulate shape and attribute representations, rendering methods, and interaction methods. Commercial products include OPEN INVENTOR, IRIS PERFORMER, HOOPS, RENDERWARE, COSMO 3D and others. The model uses OPEN INVENTOR, an extensible, object-oriented 3D graphics library. Applications use OPEN INVENTOR calls to create 3D objects and arrange them in a directed acyclic graph (DAG), the so-called scene graph.

Figure 6:
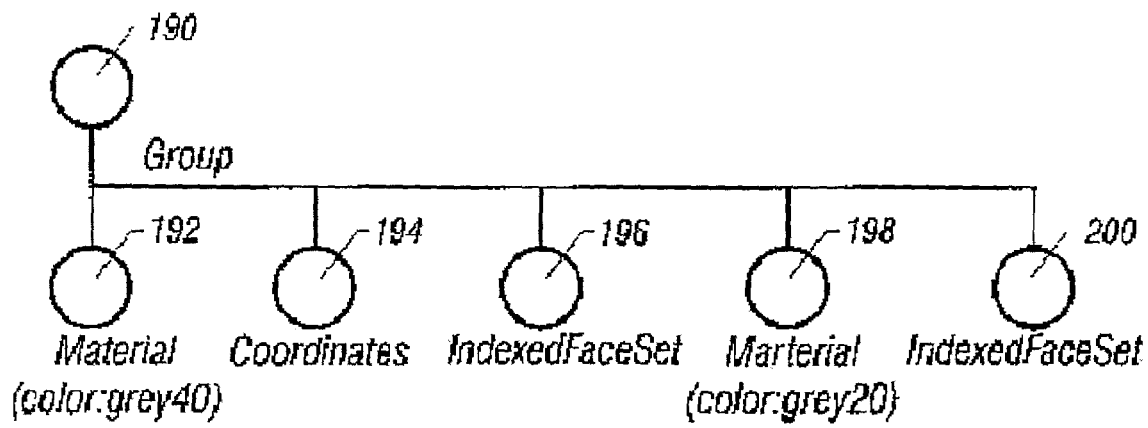
FIG. 6 is a representation of a graphics model.

For example, the two rectangles with a shared edge illustrated in FIG. 5a may be represented by a scene graph, as shown in FIG. 6. ("Scene graph" is also written herein as one word "scenegraph".) The traversal order in the scene graph is top-to-bottom and left-to-right. A group node 190, is the beginning of the traversal. A next node 192 establishes a material property, namely a color (grey40). Node 194 establishes the beginning coordinates of the image and node 196 establishes an "IndexedFaceSet", or index of the vertices of the left-hand rectangle. Node 198 changes the value of the color material property to grey20 and node 200 establishes an "IndexedFaceSet" for the right-hand triangle. When this scene graph is traversed, the image shown in FIG. 5a is displayed on the screen.

A specific set of classes, called actions, allow applications to create objects that traverse a scene graph and perform operations on its nodes. For example, there is a render action to display the objects in a scene graph, a search action to find objects in a scene graph, etc. The role of the scene graph is to define a traversal order. Actions are used wherever operations must maintain a state that is not stored in the objects but is a side-effect of the operations performed during traversal. For example, the scene graph in FIG. 6 contains one Coordinates node 194 whose coordinates are shared by two IndexedFaceSets. During traversal an array of "current coordinates" is maintained. Each IndexedFaceSet represents one rectangle and contains the indices of its corner coordinates. Similar to coordinates, Material values remain active until overridden by a new Material node. Consequently, in FIG. 6, the first rectangle is drawn in a darker shade of gray than the second.

Another set of classes, called sensors, can be used to monitor nodes and sub-graphs of a scene graph. Applications can associate callbacks with sensors that are triggered each time the state of the "sensed" object changes.

Open Inventor objects include implicit shapes such as boxes, spheres, and cylinders, as well as parametric shapes such as NURBS curves and surfaces, and triangle meshes. While it is possible to create and display shapes, there is no support for geometric computations other than coordinate transformations and ray-object intersections. These operations typically run fast and are dominated by rendering time if re-rendering is required. Interactive work is possible as long as achievable frame rates support it. For example, if a scene can be rendered in 0.1 seconds, an object can be moved around the scene at 10 frames per second.

There are a few important requirements which are met by the IGM's integration of a geometry and a graphics sub-system. First, the IGM provides a consistent, object-oriented interface for interactively constructing, rendering, editing and manipulating 3D objects. Second, the IGM is light-weight in terms of overhead. Each sub-system by itself is complex and integration minimizes additional overhead and does not degrade performance. Third, the interface is customizable and extensible.

In addition, there are three major issues described in the above overviews of the geometry and graphics systems which are addressed by the IGM. They are a mismatch in the representations of geometric objects in either system, a mismatch in the representation of object attributes, and a discrepancy in processing speed.

Figure 5C:
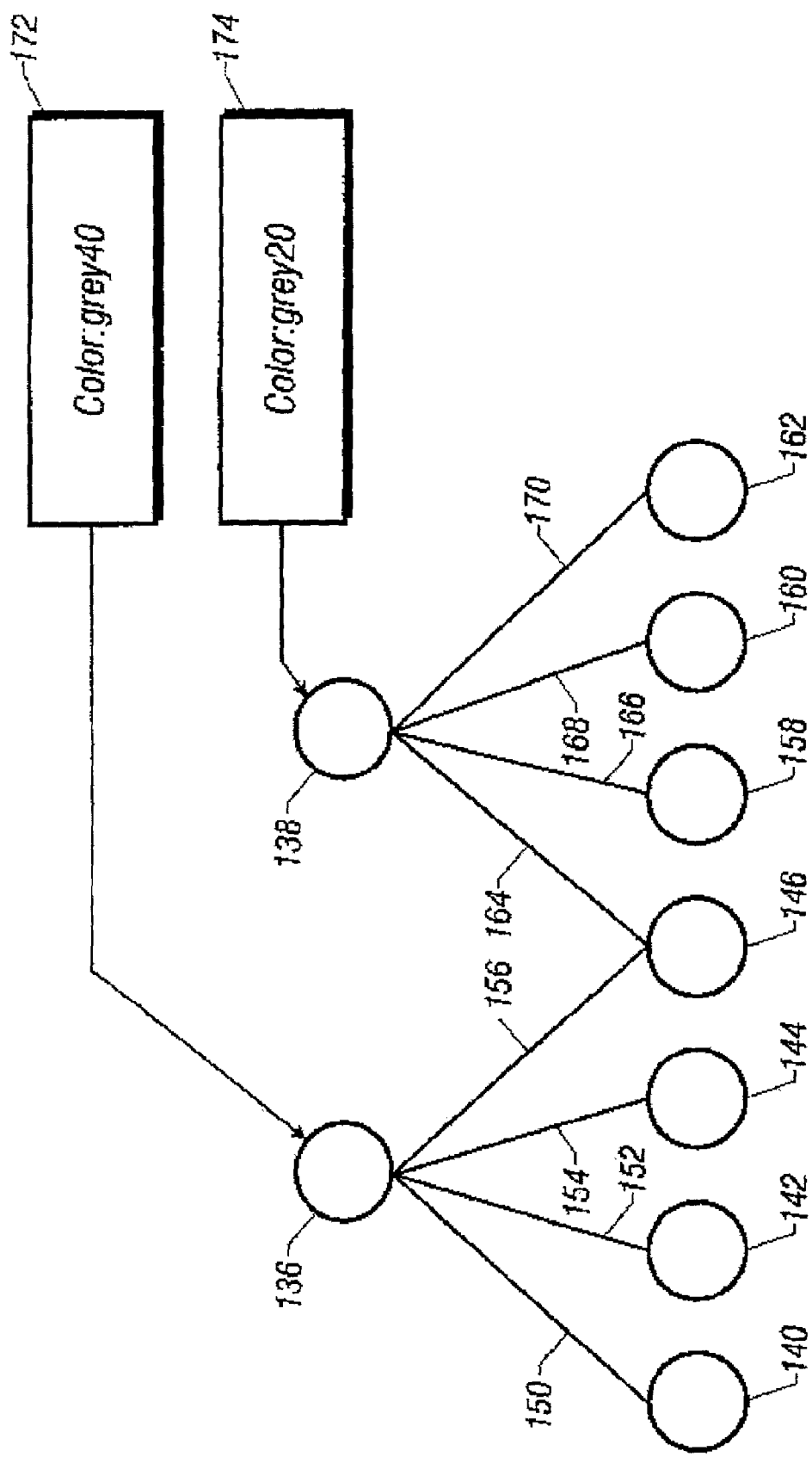
FIG. 5*c* is a representation of a geometric model.

Object representations in the geometry system and in the graphics system do not match. While objects in the geometry system are connected explicitly through a topology graph, as shown in FIG. 5c, graphics objects are merely ordered in a scene graph, as shown in FIG. 6.

Further, in earth models, many surfaces are shared as boundaries between adjacent objects and, consequently, serve two roles in the geometry system. First, they are objects in their own right, used to build an earth model by subdividing some region in space. Second, they are bounding surfaces of rock layers, and as such they are parts of layer objects. In the graphics system, when an earth model is rendered, it may be rendered as a set of surfaces or as a set of layers, or a mix of both. When rendering a set of layers, shared surfaces are rendered only once for good performance.

As a consequence, there is no one-to-one relationship between geometric objects and graphic objects. Rather, the graphic objects must be transient representations of geometric objects which potentially leads to data replication when two representations of object data must be maintained. Further, data replication requires data consistency control to guarantee that, as one representation of an object changes, its other representation is updated as well. Attributes in the geometry system are directly associated with objects or pieces of objects, such as color attributes 172 and 174 in FIG. 5c. Attributes in the graphics system are not explicitly associated with geometric objects. Rather, they are "autonomous" objects in a scene graph, such as nodes 192 and 198 in FIG. 6, that affect the rendering state and thus, indirectly, control the appearance of rendered shapes.

The IGM supports interactive work with complex geometric models. It is possible to monitor the changes that users make to the graphics representation of objects, requiring users to "commit" any changes to the geometric representation when desired. Consider the examples in FIG. 3. To subdivide a region of interest 50 with surfaces 52a and 52b, the surfaces must first be positioned correctly. This could be done interactively by manipulating the graphics representations of the surface geometries only. In this phase, the geometry model is not consistent with what is visible on the screen. Next, a classification is performed to incorporate the surfaces into the geometric model. After this process, which may take some time, the geometry model 58 and the rendering on the screen 54 are again consistent.

Both the graphics system and the geometry system may be extensible systems. The primary design choice in integrating the two systems is whether to view one system as the primary system and extend it by functionality found in the other, or to create an integration layer on top of both subsystems. The model uses the latter approach. With an integration layer integrating the graphics system and the geometry system, either subsystem can be replaced, if necessary, a clear separation exists between graphics and geometry operations, and it is possible to have a distributed implementation in which each subsystem runs on a different host.

The integration layer is implemented in C++. The next design choice is whether to use multiple inheritance or object aggregation. With multiple inheritance, the grandchildren inherit a child's parents without access to any of their other descendants. It was desired to model "cousin"-relationships where descendants in one hierarchy are associated with descendants in other hierarchies, and therefor, multiple inheritance is not appropriate.

Further, the preferred embodiment does not completely encapsulate the subsystems but rather exposes them to applications. This minimizes overhead, because it leaves objects accessible for operations that are specific to their respective subsystems, while allowing applications to manage only the objects defined in the integration layer. Data consistency control helps to avoid the consequential creation of inconsistencies between the subsystems.

Figure 7:
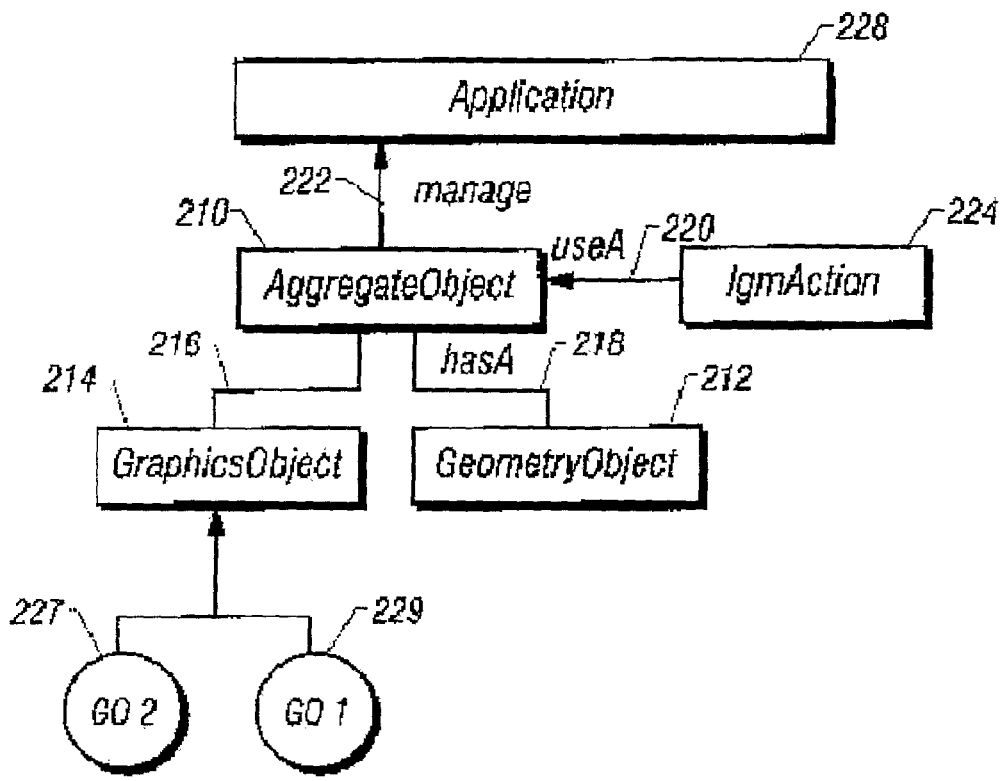

The model uses "object aggregation" in the design of the integration layer. An "AggregateObject" class 210 encapsulates the common aspects of a GeometryObject representation 212 and a GraphicsObject representation 214 of an object, as shown in FIG. 7. Lines 220 and 222 denote one-to-many relationships, represented by a line with an arrow on one end, with the "one" relationship being at the end with the arrow. For example, line 222 indicates that a single Application 228 manages a plurality of AggregateObjects, one of which is AggregateObject 210 (the others are not shown). Lines 216, 218 indicate one-to-one relationships. In the example shown, AggregateObject 210 has one GraphicsObject 214, and one GeometryObject 212. The GraphicsObject class may include multiple graphic views 227 and 229 of the same GeometryObject.

The "IgmAction" class 224, shown on FIG. 7, encapsulates methods required either to traverse a topology graph and generate appropriate graphics representations or to traverse a scene graph removing obsolete GraphicsObjects or to generate a GeometryObject.

Figure 8:
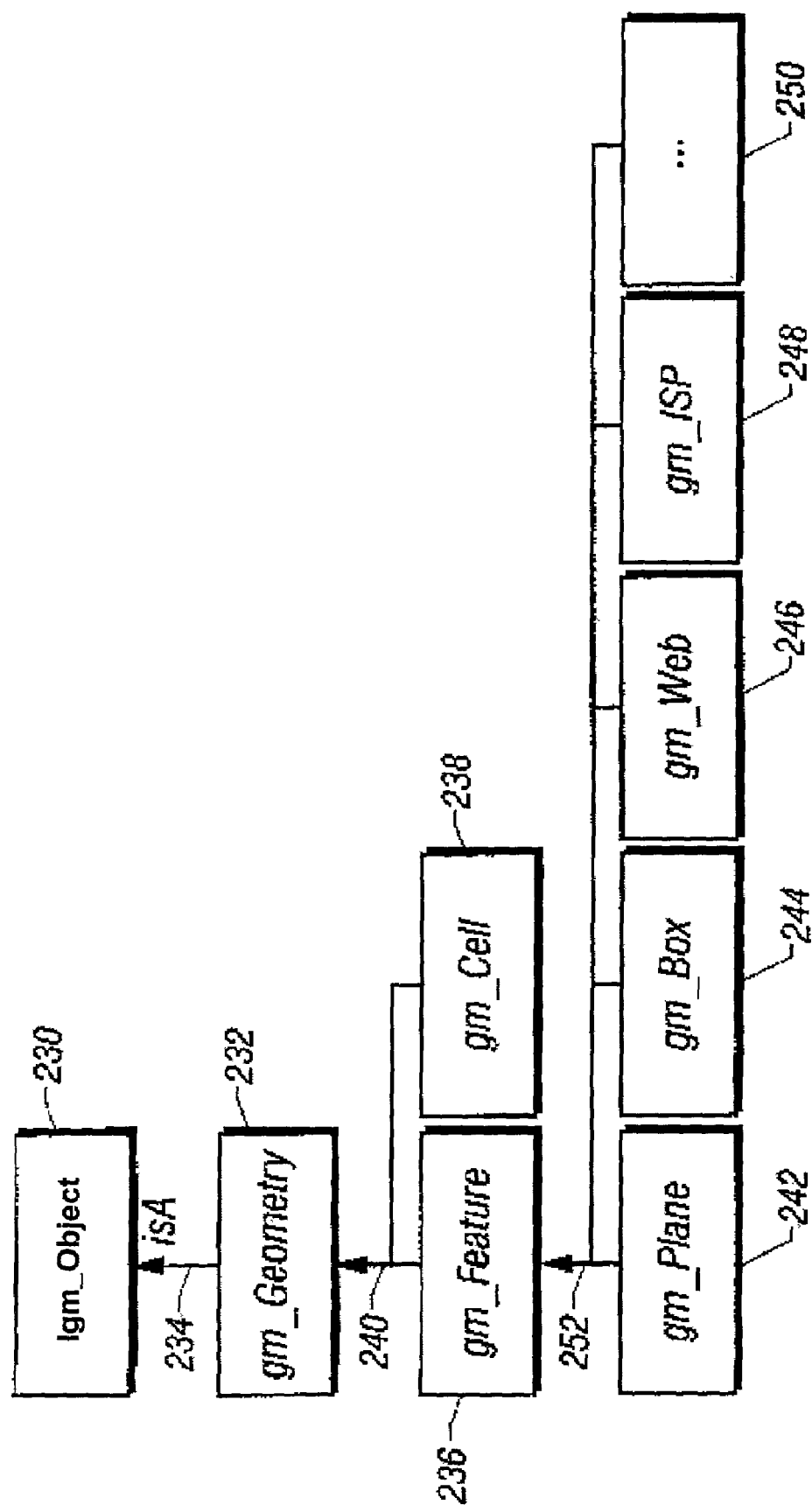
FIGS. 8–14 are diagrams representing object relationships.

A GeometryObject class hierarchy provides C++ wrappers for geometric objects in the geometry subsystem, as shown in FIG. 8. At the top of the tree, the IgmObject 230 is the GeometryObject base class. The gmGeometry class 232 (the underscore in variable names shown in the Figures, such as the one between "gm" and "Geometry" in FIG. 8, is left out in the text portion of the specification) is a sub-class of the IgmObject, sub-classing being represented by a line with an arrow-head, such as line 234. The gmGeometry class has two sub-classes, gmFeature 236 for features and gmCell 238 for cells, with the sub-classing indicated by a line 240. The gmFeature class and the gmCell class store The GQI handles to features and cells, respectively. The gmFeature class has a number of sub-classes, including gmPlane 242 for a plane, gmBox 244 for a box, gmweb 246 for a web, gmISP 248 for an ISP, and others 250, with the sub-classing indicated by a line 252.

Figure 9:
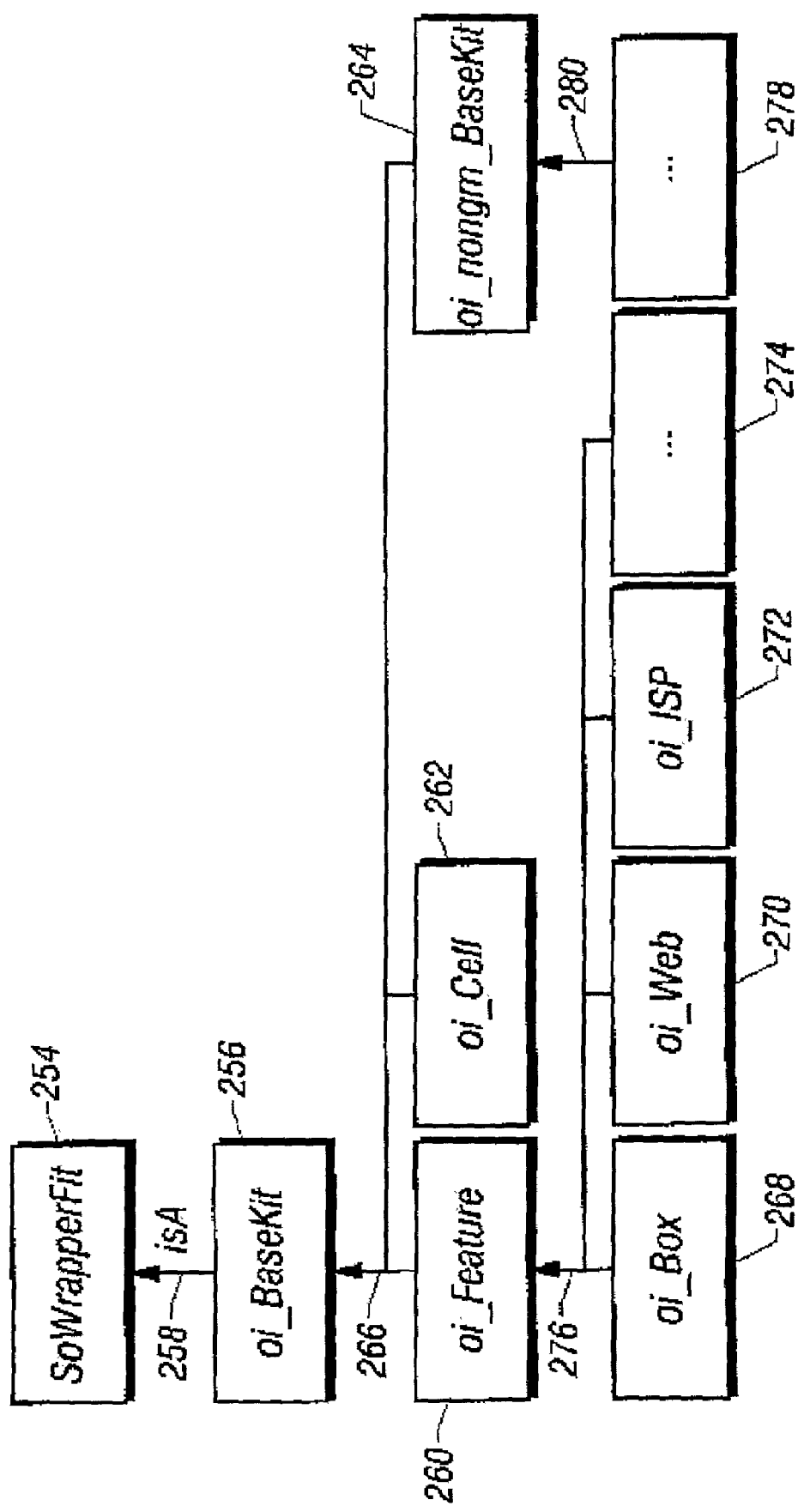

The GraphicsObject class hierarchy describes objects that can be rendered on the screen, as shown in FIG. 9. The GraphicsObject class is responsible for rendering GeometryObjects and handling graphical interactions. At the top of the GraphicsObject tree is an OPEN INVENTOR's SoWrapperKit 254, which provides a mechanism to build and manage scene sub-graphs. Typically, those subgraphs contain attribute and shape nodes. Thus, SoWrapperKits associate attributes and shapes, providing a simple way to handle the attribute representation mismatch between the graphics and geometry subsystems. An oiBaseKit 256 is a sub-class of the SoWrapperKit, as indicated by a line 258. The oiBasekit has a number of sub-classes including an oiFeature class 260, an oiCell class 262 and oinongmBasekit class 264, with the sub-classing being indicated by a line 266. The oiFeature class has a number of sub-classes, including an oiBox class 268, an oiweb class 270, an oiISP class 272, and other classes 274, the sub-classing being indicated by a line 276. Further, the oinongmBaseKit, which renders objects that are not part of the geometry model, has a number of sub-classes 278, the sub-classing being indicated by line 280.

Graphics objects, except those graphics objects that are not part of the geometry model, contain a scene graph representing the current rendering of their corresponding GeometryObjects, such as that shown in FIG. 6. For example, the GraphicsObject for an ISP model may contain a scene graph populated with GraphicsObjects representing its constituent features. Applications add GraphicsObjects to their own scene graph to render the desired portions of a geometry model. Usually, the application adds the GraphicsObject of a new unclassified object to the scene graph. After classification, the new object becomes part of a composite object and its "standalone" representation is removed from the scene graph. The GraphicsObject for the ISP model is either added to the scene graph or is updated if it already had been added.

Changes made to the GraphicsObject through user interaction can be monitored by Open Inventor sensors. Sensors can trigger callbacks that notify an AggregateObject of the change. Users interact with GraphicsObject via an IGM interactor. The changes are graphical only until the user is satisfied, and the application notifies the AggregateObject to update the GraphicsObject and propagate the changes to the GeometryObject.

GraphicsObjects do not need to be as specialized as GeometryObjects although specialization is possible where required. In many cases, the generic GraphicsObject suffices to encapsulate the required functionality. Exceptions include objects for which a pure graphical representation exists that is not constructed from a GeometryObject, for example, surfaces built from extruded curves before they have been classified; and objects that require special interaction, such as web surfaces, which require special interactions to edit or deform.

Figure 10:
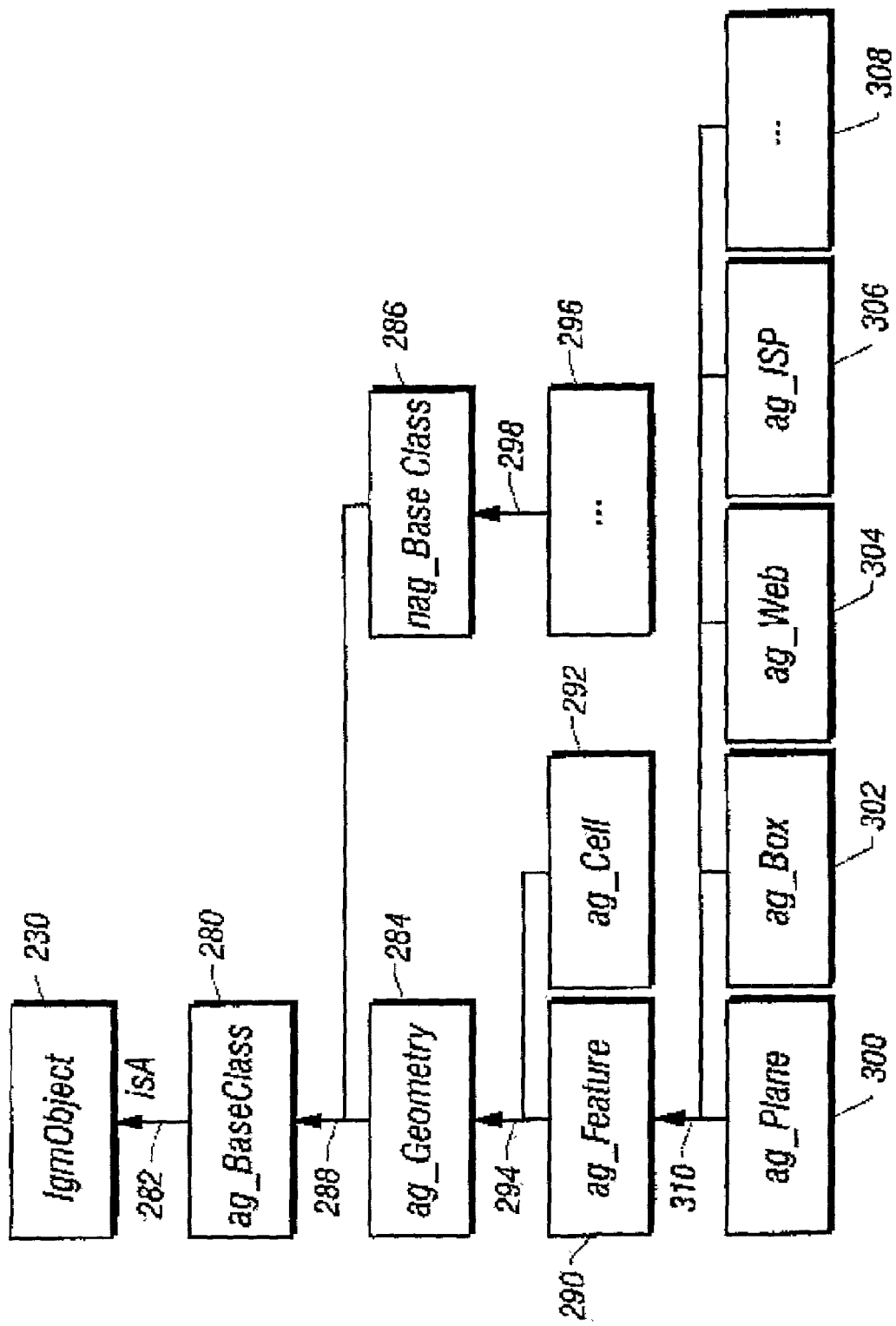

The AggregateObject class hierarchy represents integrated objects, as shown in FIG. 10. At the top of the AggregateObject class tree is the IgmObject 230 which was also at the top of the GeometryObject class hierarchy (see FIG. 8). An agBaseClass 280 is a sub-class of the IgmObject class 230, with the sub-classing being indicated by a line 282. The agBaseClass class has two sub-classes: a agGeometry class 284 and a nagBaseClass class 286, the sub-classing being indicated by a line 288. The agGeometry class has two sub-classes, an agFeature class 290 and an agcell class 292, the sub-classing being indicated by a line 294. The nagBaseClass 286, which represents objects that are not part of the geometry model, has a plurality of sub-classes 296, the sub-classing being indicated by a line 298. The agFeature class has a number of sub-classes, including a agPlane class 300, an agBox class 302, an agweb class 304, an agISP class 306 and other classes 308, the sub-classing being indicated by a line 310.

Figure 11:
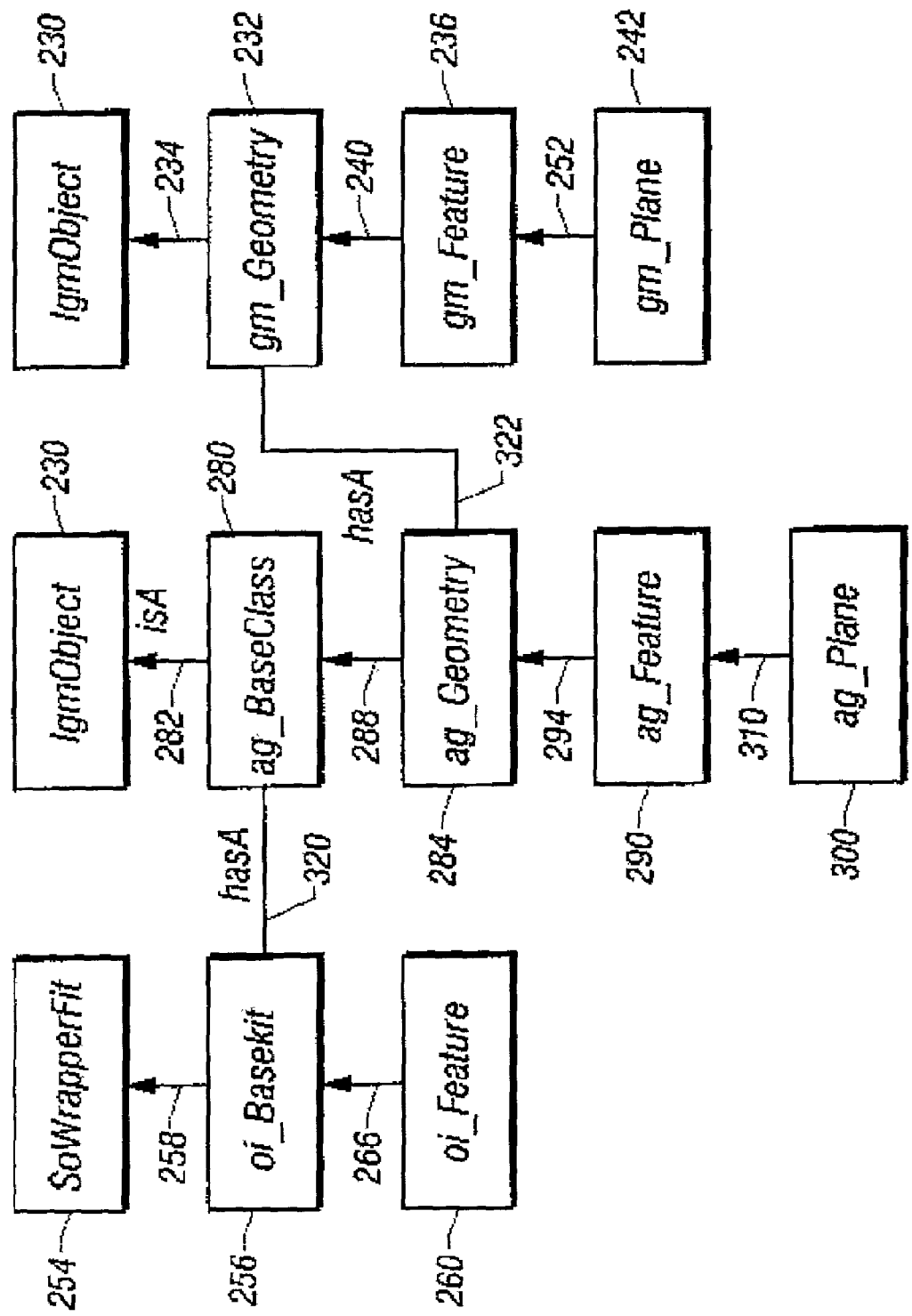

AggregateObject represents the integration of data and methods shared between GraphicsObject and GeometryObject. For example, the agPlane object together with its corresponding GraphicsObjects and GeometryObjects form a class hierarchy, as shown in FIG. 11. Most of the hierarchy is extracted from the class hierarchies illustrated in FIGS. 8–10. The association between the aggregate class and the graphics class, represented by a line 320, and the association between the aggregate class and the geometry class, represented by line 322, have been added and represent the aggregation.

AggregateObjects can be constructed from object parameters, for example, a point and the normal of a plane. The AggregateObject class provides methods to construct its corresponding GraphicsObjects and GeometryObjects. Applications control when to create the subobjects.

Alternatively, AggregateObjects can be constructed from existing GraphicsObjects or from existing GeometryObjects. This allows applications to import objects from packages that provide only the equivalent of graphics representations (for example, other OPEN INVENTOR applications). More importantly, it allows applications to use GeometryObjects representations, complete with shape, topological, and attribute information, for persistent storage. Typically, AggregateObjects and GraphicsObjects are created on the fly when GeometryObjects are loaded from persistent storage.

The three class trees are similar but have some differences. For example, the three class trees are of different depths. All three classes support dynamic type checking.

The IGM defines a number of standard objects in addition to the generic GraphicsObjects, GeometryObjects, and AggregateObjects. For example, the GeometryObject class hierarchy contains many sub-classes because they encapsulate the different objects that can be modeled with the geometry system. The GraphicsObject hierarchy contains fewer objects because many GeometryObjects can be rendered using generic methods. For example, there is a specific GeometryObject for a plane, 242 in FIG. 8, but no specific GraphicsObject, as shown in FIG. 9. Other objects such as meshed surfaces and composite objects require support for interactive editing which is implemented in specialized GraphicsObjects. Composite objects may become fairly complex and are encapsulated in a special class that manages updates on a per-component basis.

Figure 12:
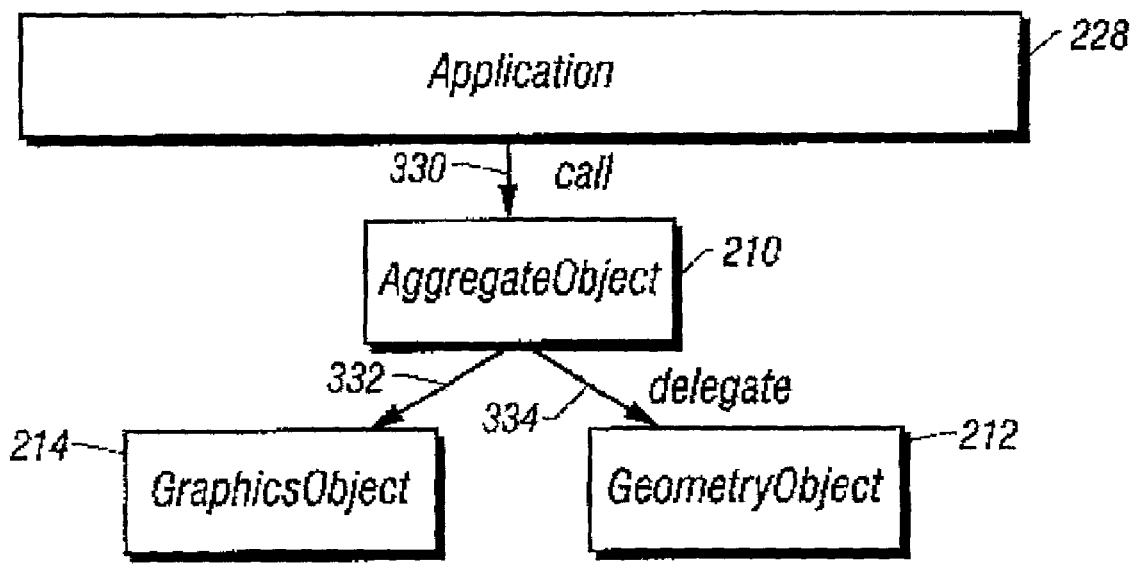
Figure 13:
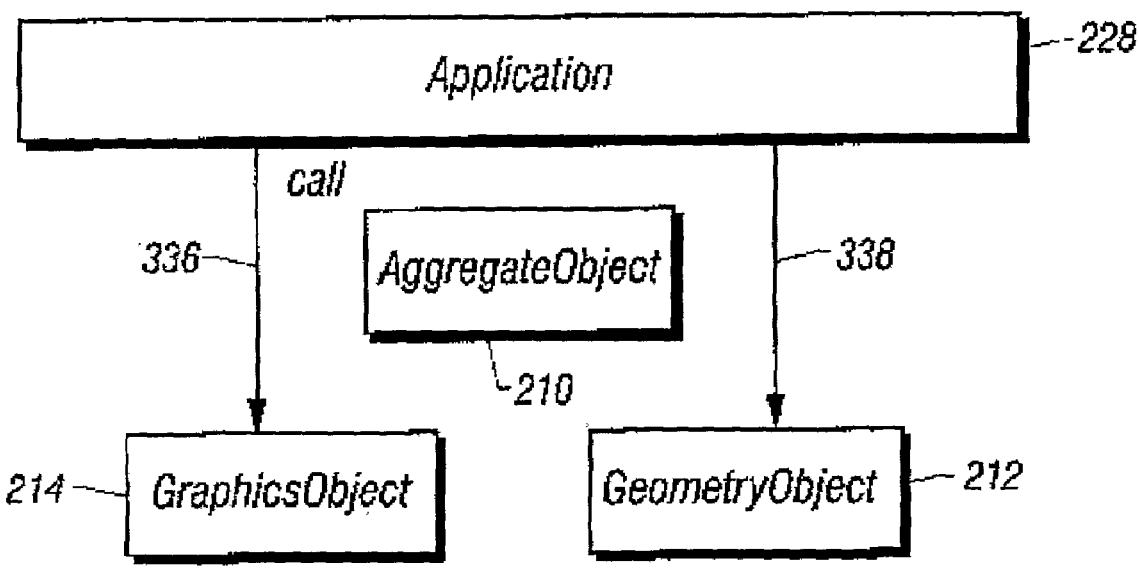

Applications instantiate and manage AggregateObjects, as shown in FIG. 7. AggregateObjects also provide graphics and geometry operations through calls 330 to the AggregateObject which are then delegated to the appropriate subobjects, either the GraphicsObject 214, through delegation path 332 or to the GeometryObject 212 through delegation path 334, as shown in FIG. 12. Applications also have read-only access to GraphicsObjects and GeometryObjects through call paths 336 and 338, respectively, to perform operations that do not affect system consistency, as shown in FIG. 13. Through this exposure, the requirement of minimal overhead can be met because replication of GraphicsObject or GeometryObject methods in AggregateObject is minimized.

Figure 14:
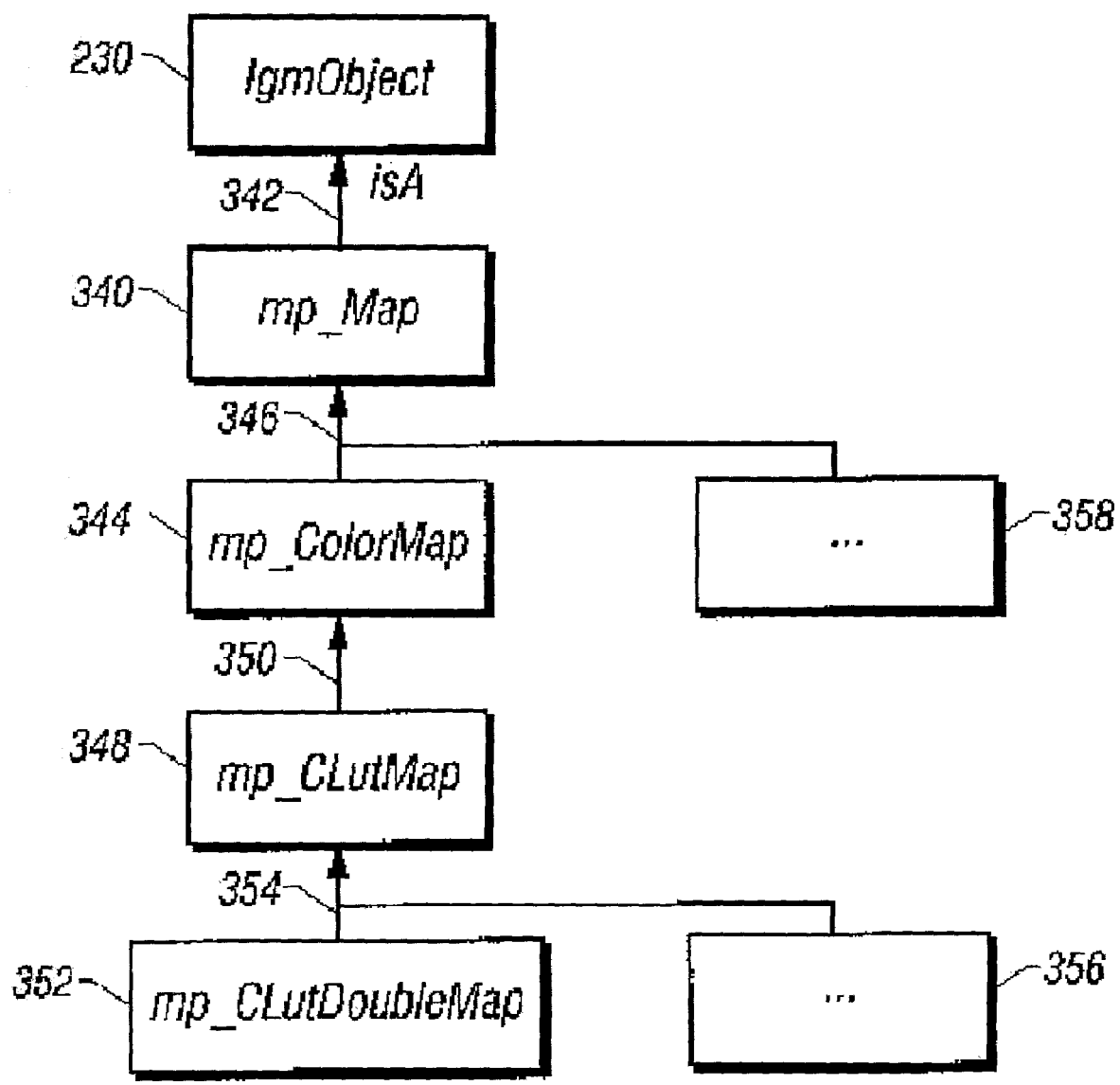

Special classes, illustrated in FIG. 14, whose root class is mpMap 340 (which is itself rooted in the Igmobject class 230 as shown by line 342) implement the necessary data format translations and mappings from physical properties to renderable attributes. For example, an mpColorMap class 344, sub-classed from the mpMap class as shown by line 346, and mpCLutMap class 348, sub-classed from the mpColorMap class 344 as shown by line 350, provide color maps that can be indexed in a number of ways. An mpCLutDoubleMap class 352, sub-classed from the mpCLutMap class as shown by line 354, provides methods to map colors to ranges of double precision floating point numbers. There are other classes, 356 and 358, sub-classed from the mpMap and mpCLutMap classes, respectively.

GeometryObject uses the callback mechanism available through GQI/Shapes attributes the same way GraphicsObject uses Open Inventor sensors: AggregateObject is notified of changes to the state of a geometry object.

The AggregateObject fulfills a number of tasks, two of which, consistency control and data conversion management, will be discussed in more detail. The tasks are:

1. Integrate GraphicsObject and GeometryObject, providing applications with a simple consistent interface to the geometry and graphics subsystems.
2. Manage object consistency. For example, GraphicsObject transformations can be performed interactively while GeometryObject transformations may require time because they may require intersections and topological relationships to be recomputed. AggregateObject keeps track of whether transformations have been applied in both subsystems.
3. Minimize side effects of edit operations. ISP objects may consist of many subobjects not all of which are typically affected by a classification involving the composite object. By managing state changes at the boundary representation level, AggregateObject localizes required updates.
4. Manage "flat geometry data" conversion between GeometryObject and GraphicsObject. Flat geometry data are shape descriptions without the representation of topological relationships.
5. Manage picks. Picking will usually be initiated by GraphicsObject but for some sub-classes will be performed by the corresponding GeometryObject. The AggregateObject coordinates picking and communicates results.

The two subsystems being integrated by the IGM are not always consistent, that is, they sometimes have inconsistent representations of the same geological data. Often, the two subsystems are intentionally left inconsistent for the duration of an extended edit operation to improve performance.

Figure 15:
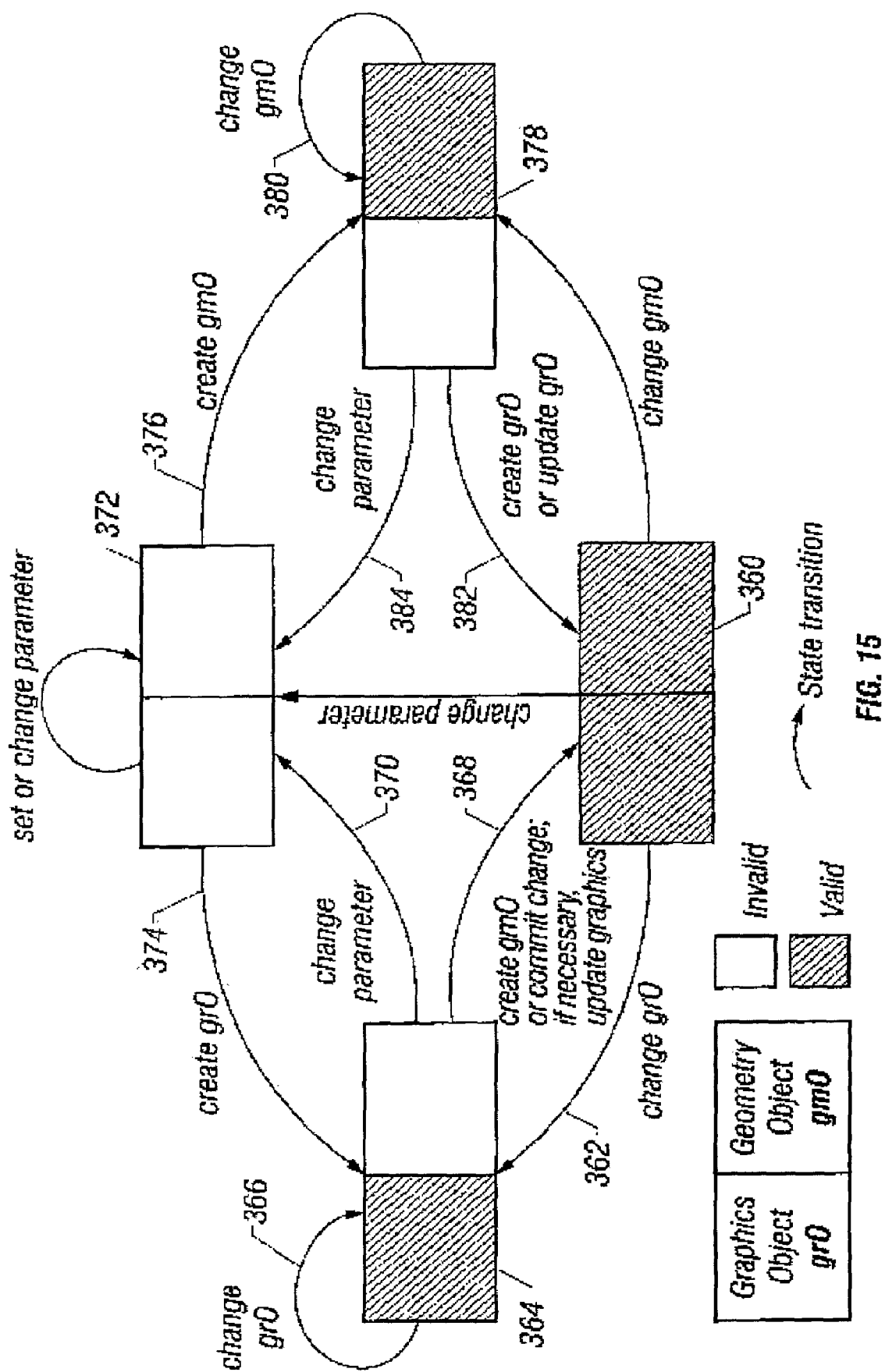
FIG. 15 is a state diagram.

There are a finite number of possible "valid/invalid" states for the two subobjects, and AggregateObject can be treated as a finite state machine with the two subobjects as state variables, as shown in FIG. 15. Subobjects can be either "valid" or "invalid", depending on whether or not they represent the result of the last user interaction. AggregateObject monitors and manages the transition from one state to another, thus managing consistency and addressing the issue of processing speed discrepancies.

The state machine operates by changing states in response to a variety of events. Assume that both the GraphicsObject and the GeometryObject are valid, which means that the system is in state 360. The left half of a box representing a state, such as state 360, is shaded or unshaded if the GraphicsObject is valid or invalid, respectively. Similarly, the right half of the box is shaded or unshaded if the GeometryObject is valid or invalid, respectively. Both halves of the box representing state 360 are shaded, indicating that both the GraphicsObject and the GeometryObject are valid.

Now assume that the GraphicsObject changes. An example of such a change would be an application picking a graphics object and moving it without committing to the move. Such a change is represented by transition 362 to state 364, in which the GraphicsObject is valid but the GeometryObject is invalid. The system does not transition out of this state if the GraphicsObject is further changed, as indicated by transition 366.

If the change to the GraphicsObject is committed causing the change (such as classifying a moved surface) to be made in the GeometryObject, or if a GeometryObject is created, the system transitions 368 back to state 360, in which both the GraphicsObject and the GeometryObject are valid. If, instead, a parameter is changed, the system transitions 370 to state 372, in which both the GraphicsObject and the GeometryObject are invalid. Further setting of or changes to the parameters leave the system in state 372.

The system can leave state 372 under two circumstances. If the system creates a GraphicsObject, the system transitions 374 back to state 364, where the GraphicsObject is valid and the GeometryObject is invalid. If, instead, the system creates a GeometryObject, the system transitions 376 to state 378, where the GraphicsObject is invalid and the GeometryObject is valid. The system remains in state 378 for further changes in GeometryObject 380. If the GraphicsObject is updated or a GraphicsObject is created, the system transitions 382 to state 360. If, instead, a parameter is changed, the system transitions 384 from state 378 to state 372, where both the GeometryObject and the GraphicsObject are invalid.

Consider the example in FIG. 3 where the user positions new surfaces on the screen. The graphics representations of the surfaces are valid since they have the shape and position intended by the user. The geometric model is invalid because the objects overlap existing objects without establishing topological relationships between them. Thus, the system is in state 364. Once the user commits to the change, the system transitions 368 to state 360, changing the geometry and updating the graphics.

Methods that perform complex conversions between GeometryObject and GraphicsObject are implemented as their own classes and their base class is called IgmAction 224, as shown in FIG. 7. IgmAction includes gg_Action (and its subclasses) that are used to generate graphics from geometry. A gm_object, with the help of an ag_object or an oi_object, generates a geometry object (a gqi instance) from a graphics object. gg_Action objects, which are derived from the igm_Object class, can traverse a topology graph, performing desired operations and calling methods on individual objects as appropriate. ggAction is a component that handles the aspect of geometric object representation mismatch between the sub-systems. It is used by AggregateObject to support consistency management.

An example is an IgmAction that can create or update GraphicsObjects from GeometryObjects according to several different rendering modes, depending on which GraphicsObjects will contain different attributes and shapes to render. Rendering modes include:

1. Rendering of subvolumes, where each volume's bounding surfaces are rendered (boundaries between adjacent volumes are rendered only once). In this mode, picks return volume objects and clipped volumes are rendered as closed objects (as opposed to objects that appear to be cut open);
2. Rendering of surfaces that partition space. Picks return surfaces and clipping may create holes in surfaces.

The management of rendering modes illustrates that GraphicsObjects are visual representations of their corresponding GeometryObjects. As described above, there is no one-to-one relationship between the two object types. For example, which shapes are rendered by a GraphicsObject representing a volume depend on adjacent objects and the presence of clipping planes.

Not all objects to be displayed in a 3D view are necessarily objects forming, or intended to form, part of a geometry model. Examples include text, symbols, and glyphs. In addition, many applications work with data that have a geometric interpretation which is rendered but is not part of a geometry model. An example from earth science is a borehole trajectory that may be rendered for reference only. The IGM provides agBaseClass 280 (FIG. 10) from which nagBaseClass 286 for such "non-geometry-model" objects is derived. The equivalent GraphicsObject of nagBaseClass is oinongmBaseKit 264 (FIG. 9).

This approach allows applications to manage one generic type of objects regardless of whether they are to be used for the geometry model. For example, a SceneManager class can be written that keeps track of objects that are displayed or hidden in one or more application windows. In addition, sub-classes of nagBaseClass can encapsulate the bindings of GraphicObjects to entities stored in a database.

The present invention may be implemented in hardware or software, or a combination of both. However, preferably, the present invention is implemented in computer programs executing on programmable computers each comprising a processor, a data storage system (including volatile and non-volatile memory and/or storage elements), at least one input device, and at least one output device. Program code is applied to input data to perform the functions described above and generate output information. The output information is applied to one or more output devices, in known fashion.

Each program is preferably implemented in a high level procedural or object oriented programming language (such as C++ or C) to communicate with a computer system. However, the programs can be implemented in assembly or machine language, if desired. In any case, the language may be a compiled or an interpreted language.

Each such computer program is preferably stored on a storage media or device (e.g., ROM or magnetic/optical disk or diskette) readable by a general or special purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

Figure 16:
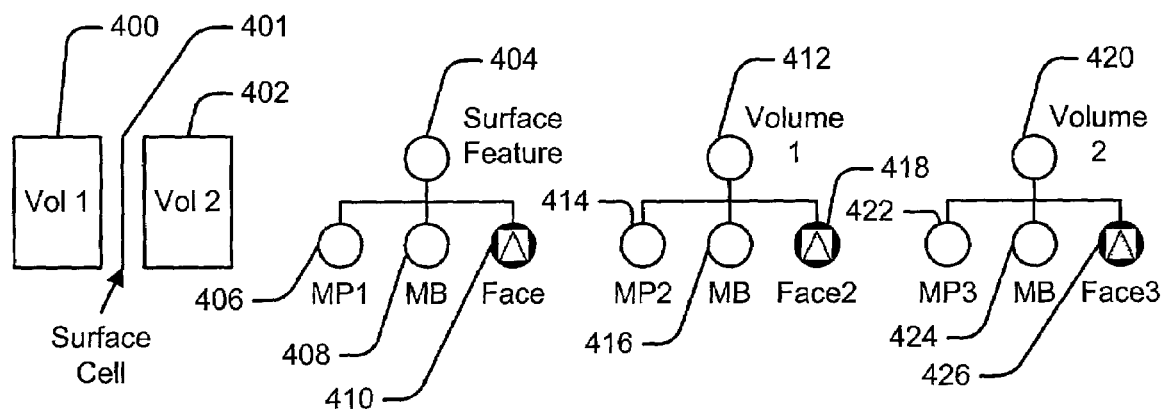
FIG. 16 is a block diagram illustrating two volumes and a surface cell and their respective node representations of the present invention.

Attention is directed to FIG. 16 where a first volume 400 and a second volume 402 is separated by a surface cell 401. To the right of the volume cells 400 and 402 are a series of note interpretations indicated by a surface feature 404 which corresponds to surface cell 401. The surface feature node 404 contains nodes MP 406, MB 408 and face 410 that are the graphics content without color material. The volume cell 400 has a node representation of volume 4012 having MP 414, MB 416 and face 418. Some of the second volume 402 having note representation that is headed off with a volume 2 node of 420. The MP 422, the MB 424 and face 426.

Figure 17:
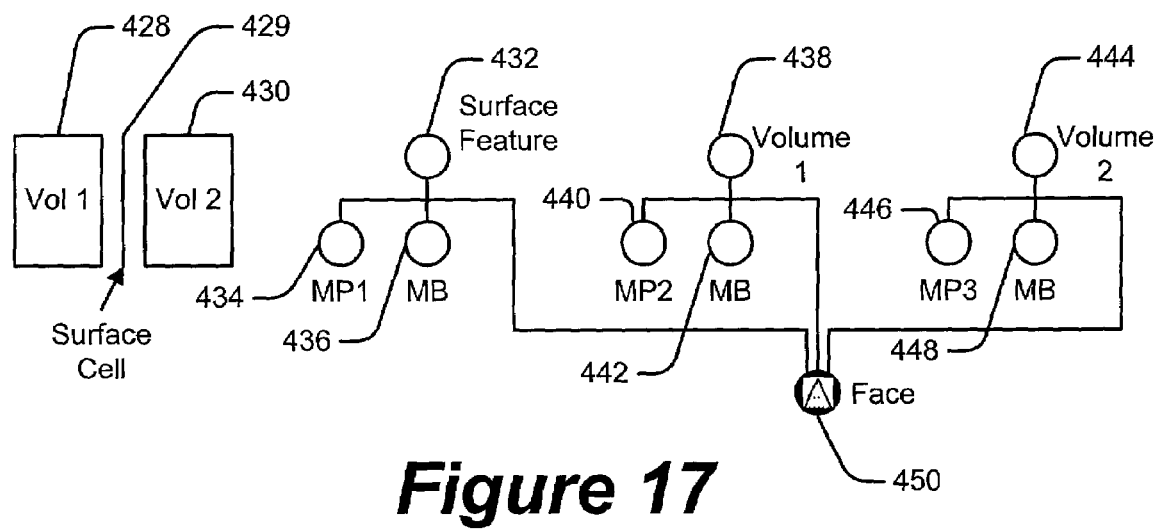
FIG. 17 is a block diagram illustrating two volumes and a surface cell and their respective node representations of the present invention having a common face.

FIG. 17 shows a different implementation wherein the similar volume surface cell arrangements with volume 428 and volume 430 separated by surface cell 429. The node representation has significant differences from the node representation of FIG. 16. Like the node representation of FIG. 16, there is a surface feature node 432, volume node 438 and volume node 444 as shown in FIG. 17. However, several of the embodiments of the present invention have a common face 450 that is connected to the surface feature node 432, volume node 438 and volume node 444 as shown in FIG. 17. The other elements such as MP 434, MP 440, MP 446 as well as MB 436, MB 442 and MB 448 are connected as illustrated in FIG. 17.

Figure 18A:
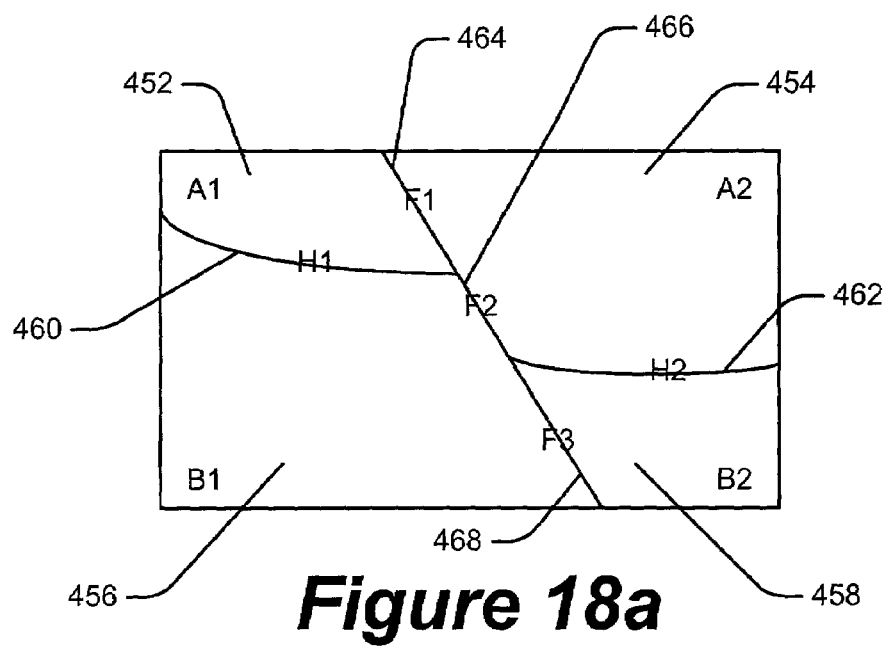
FIGS. 18*a* and 18*b* are block diagrams that illustrate the correspondence between surface and volume features and the node representation of the present invention.
Figure 18B:
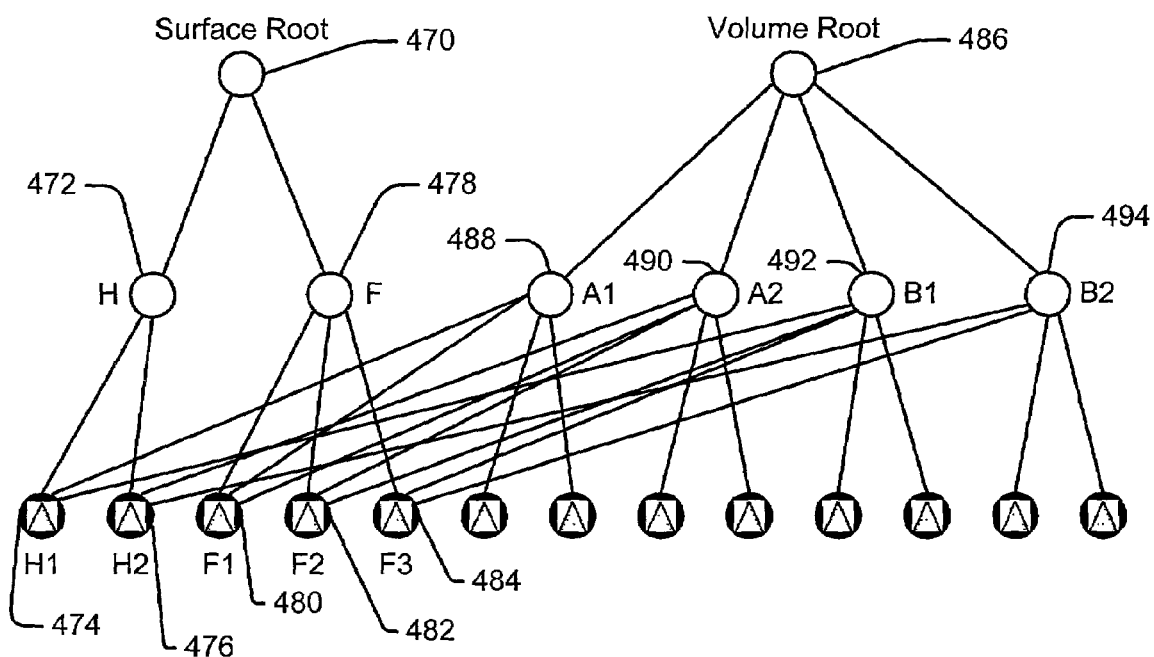

FIG. 18a shows a two-dimensional representation of various volumes and surface features that can be illustrated with the present invention. In particular, volumes A1 452, B1 456, A2 454 and B2 458 are separated by surface features H1 460, F1 464, F2 466, H2 462 and F3 468. The various surfaces and volumes of FIG. 18a are represented in node form in FIG. 18b. Specifically, the surface root 470 contains all of the surface nodes. The volume root 486 contains all of the volume nodes. For instance, surface feature H 472, which has surface features H1 474 and H2 476 that correspond to H1 460 and H2 462, respectively, of FIG. 18a. Similarly, there are the other surface features F1 480, F2 482 and F3 484, that correspond to the surface features F1 464, F2 466 and F3 468 of FIG. 18a. The volume elements illustrated in FIG. 18a have corresponding node representations on the right side of FIG. 18b. Specifically, node volume 488, node volume 490, node volume 492 and node volume 494 correspond to volumes 452, 454, 456 and 458 of FIG. 18a. The graphics contents, faces 474, 476, 480, 482, and 484, are shared by both the surface scenegraph rooted at surface root 470 and the volume scenegraph rooted at volume root 486.

FRAMEWORK OF THE PRESENT INVENTION

The present invention replaces the low level GQI C-structure mechanisms of the other implementations with a new framework. To further improve performance, the core gmMP framework classes described above no longer have any dependencies on the IGM. The present invention is composed of a set of object instances that are implemented as software on, for instance, a digital computer. However, the present invention is amenable to being implemented completely in hardware, or some combination of hardware and software.

Figure 20:
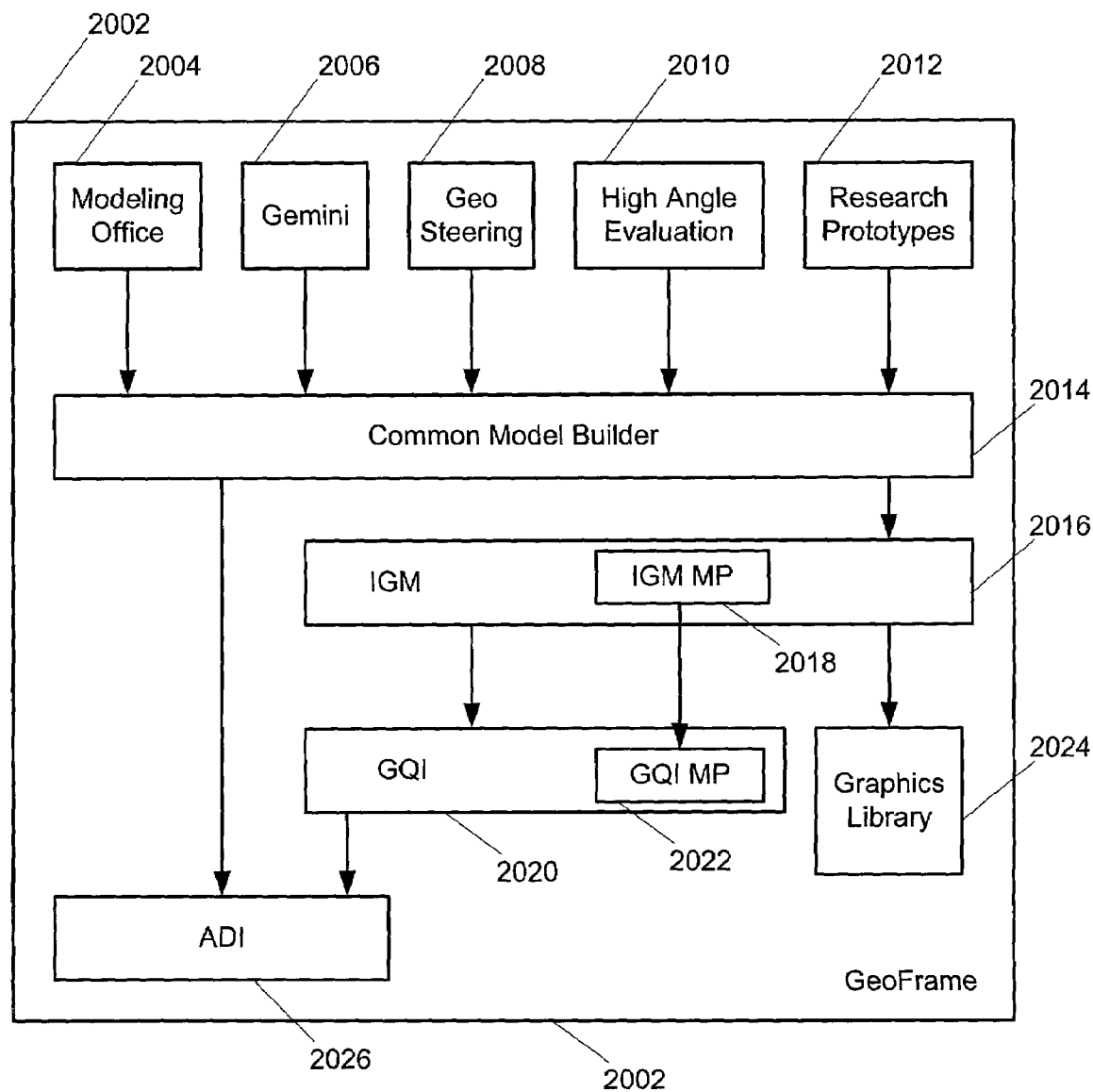
FIG. 20 is a block diagram of the main framework of the present invention.

FIG. 20 illustrates the framework 2002 of the present invention that includes a set of modular application entities that are interrelated. For instance, there is the Modeling Office Application 2004, Gemini Application 2006, Geo-Steering Application 2008, a High-Angle Well Evaluation Application 2010 and one or more research prototypes modules 2012, all of which are operative with the Common Model Builder 2014 facilities as illustrated in FIG. 20. The Common Model Builder 2014 provides interfaces to the services of the other modules of FIG. 20 in its base classes. The various applications either use the Common Model Builder base classes directly, or derive from them, to realize specialized behavior. Those other services include the interactive geometric modeling library (IGM) 2016 and the Application Data Interface ADI 2026 that is a data access API for GeoFrame. The geometry query interface (GQI) 2020 is operative with both the IGM 2016 and the ADI 2026. Both the IGM 2016 and the GQI 2020 have material property elements IGM MP 2018 and the GQI MP 2022, respectively. As illustrated in FIG. 20, the IGM MP 2018 is operative with the GQI MP 2022. Finally, the graphics library 2024 implements graphical representations of the data that are used by the various modules. The graphics library 2024 is operative with the IGM 2016 as illustrated in FIG. 20.

Figure 21:
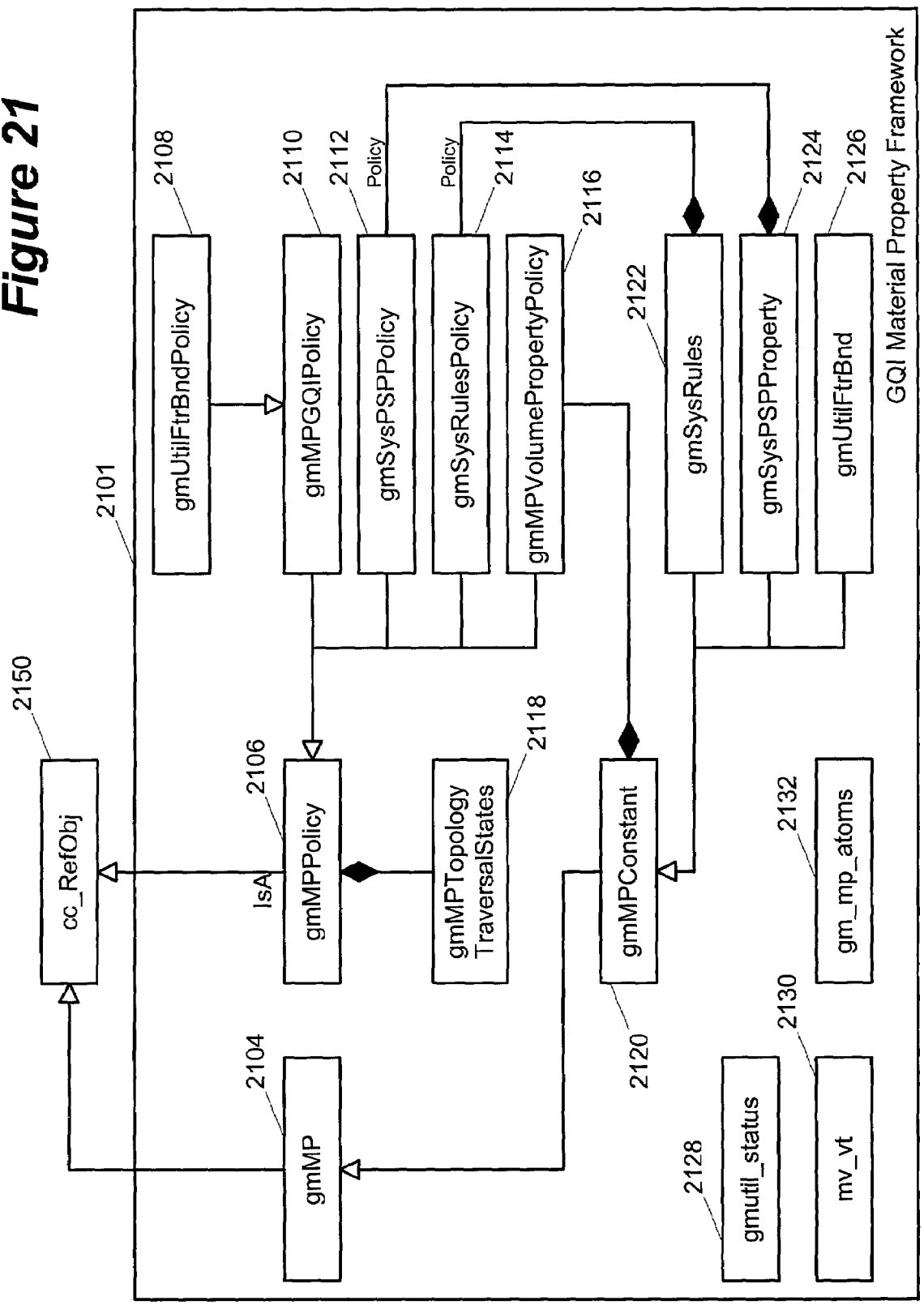
FIG. 21 is a block diagram illustrating the relationships of various objects of the present invention.

FIG. 21 illustrates a set of objects for the GQI Material Property Framework. Specifically, the GQI Material Property Framework 2022 contains a set of objects, including gmMP 2104, which has an IsA relationship with the cc_RefObj object 2150 as illustrated in FIG. 21. There is also a gmMPPolicy object 2106 that has an IsA relationship with the cc_RefObj object 2150. There is a gmMPTopologyTraversalStates object 2118 which has a composition relationship with the gmMPPolicy class 2106, as illustrated in FIG. 21.

A gmMPConstant object 2120 has an IsA relationship with the gmMP object 2104. A gmUtilFtrBndPolicy object 2108 has an IsA relationship with the gmMPGQIPolicy object 2110, as illustrated in FIG. 21. Several other policy objects, including the gmSysPSPPolicy object 2112, the gmSysRulesPolicy object 2114, and the gmMPVolumePropertyPolicy object 2116, all have IsA relationships with the gmMPPolicy object 2106 as illustrated in FIG. 21. In addition, the gmSysPSPPolicy object 2112 has a policy composition relationship with the gmSysPSPProperty object 2124. Similarly, the gmSysRulesPolicy object 2114 has a policy composition relationship with the gmSysRules object 2122. The gmUtilFtrBnd object 2126 is the last of the group and it, along with gmSysRules 2122 and gmSysPSPProperty object 2124, have an IsA relationship with the gmMPConstant object 2120. The gmMPVolumePropertyPolicy object 2116 also has a composition relationship with the gmMPConstant object 2120, as illustrated in FIG. 21. Finally, the GQI Material Property Framework 2022 also optionally includes a gmutil_status object 2128 and mv_vt object 2130 and a gm_mp_atoms object 2132, all of which facilitate the interactions and relationships in the storing and the processing of information for the present invention.

Figure 22:
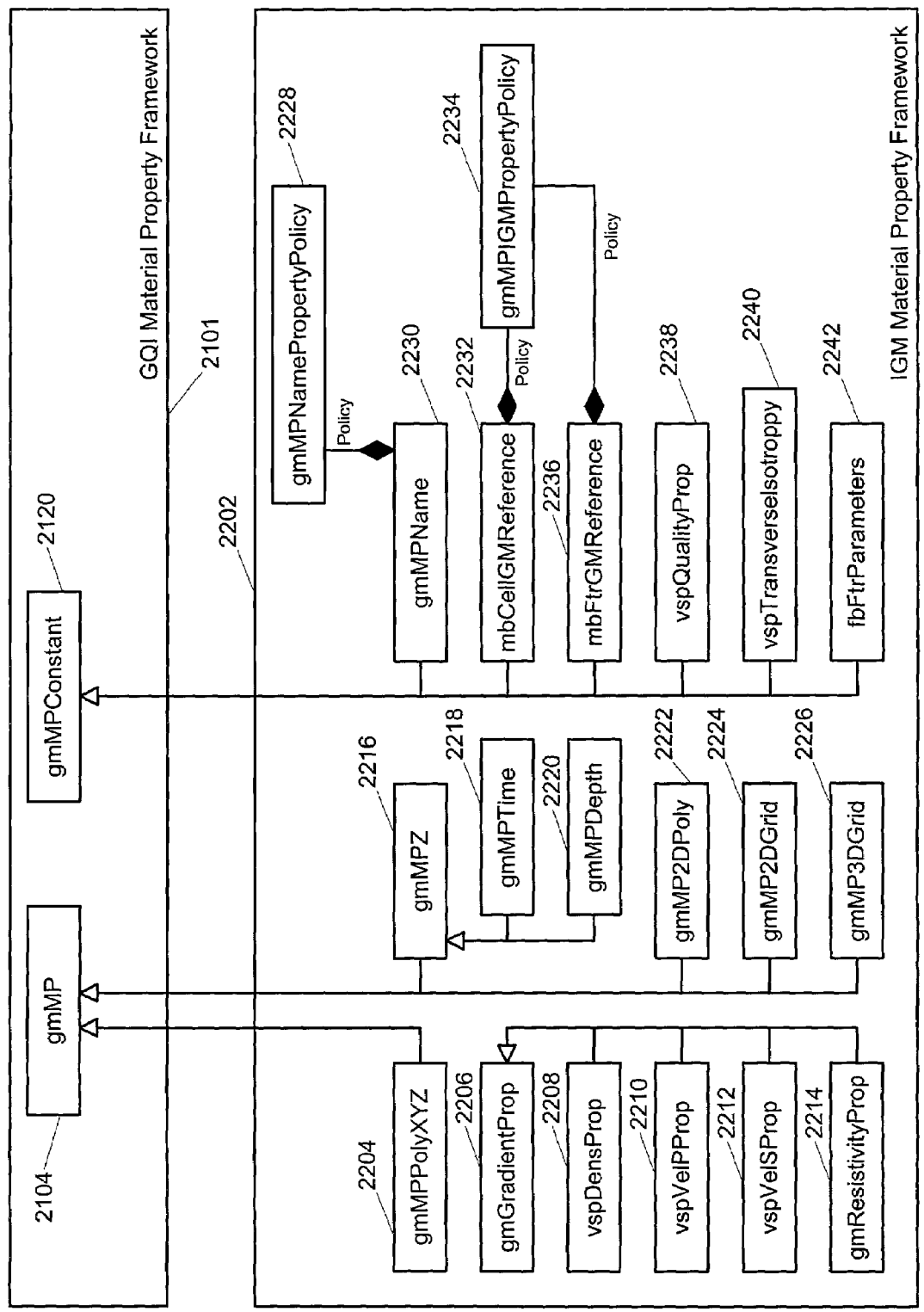
FIG. 22 is a block diagram illustrating the relationships of various objects of the present invention.

FIG. 22 illustrates the interrelationship between the GQI Material Property Framework 2022 and the IGM Material Property Framework 2018. The IGM Material Property Framework 2018 includes, among other things, the gmMPNamePropertyPolicy object 2228, which has a composition policy relationship with the gmMPName object 2230. The gmMPIGMPropertyPolicy object 2234 has two separate composition policy relationships with the mbCellGMReference object 2232 and the mbFtrGMReference object 2236. The gmMPName object 2230, the mbCellGMReference object 2232, the mbFtrGMReference object 2236, as well as the vspQualityProp object 2238, the vspTransverseIsotroppy object 2240 and the fbFtrParameters object 2242, all have an IsA relationship with the gmMPConstant object 2120, as illustrated in FIG. 22. There is another subset of objects, specifically the gmMPZ object 2216, as well as the gmMPTime object 2218 and the gmMPDepth object 2220. The latter two objects have an IsA relationship with the former object, namely gmMPZ 2216. Also in the subset are the gmMP2DPoly object 2222, the gmMP2DGrid object 2224 and the gmMP3DGrid object 2226. The gmMPZ object 2216, as well as the gmMP2DPoly object 2222 and the gmMP2DGrid object 2224 and the gmMP3DGrid object 2226, all have a IsA relationships with the gmMP object 2104, as illustrated in FIG. 22. There is a final subset of objects contained with the IGM Material Property Framework 2018, namely the gmMPPolyXYZ object 2204, that has an IsA relationship with the gmMP object 2104 of the GQI Material Property Framework 2022. Finally, there are four objects which have an IsA relationship with the gmGradientProp object 2206, namely the vspDensProp object 2208, the vspVelPProp object 2210, the vspVelSProp object 2212, and the gmResistivityProp object 2214.

Figure 23:
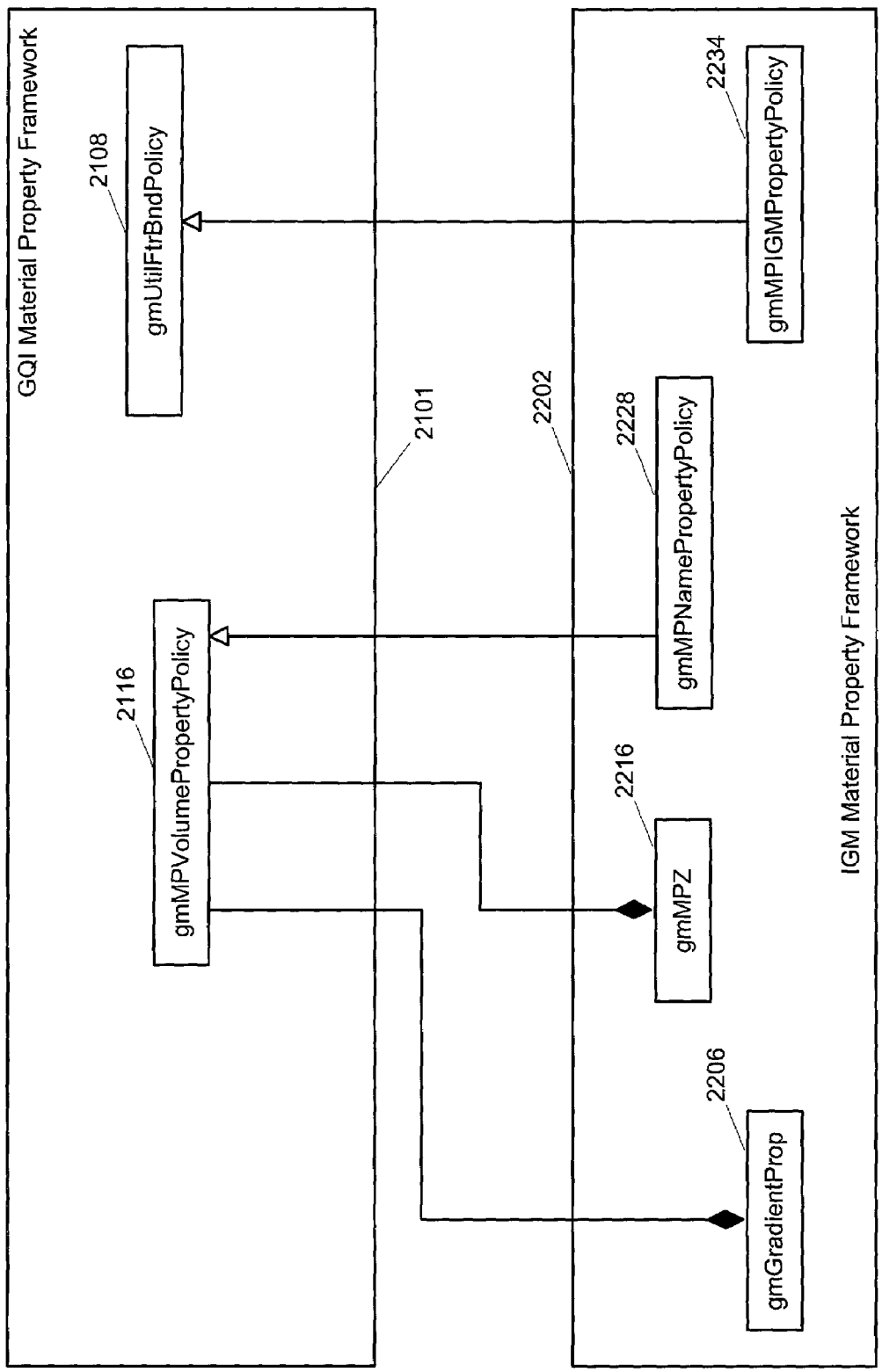
FIG. 23 is a block diagram illustrating the relationships of various objects of the present invention.

FIG. 23 illustrates relationships among the various objects within the GQI Material Property Framework 2022 and the IGM Material Property Framework 2018. Specifically, there is the gmUtilFtrBndPolicy object 2108, and the gmMPIGMPropertyPolicy object 2234, the latter of which has an IsA relationship with the gmUtilFtrBndPolicy object 2108. Within the GQI Material Property Framework 2022 is the gmMPVolumePropertyPolicy object 2116. The gmNMPNamePropertyPolicy object 2228 of the IGM Material Property Framework 2018 has an IsA relationship with the gmMPVolumePropertyPolicy object 2116, as illustrated in FIG. 23. Similarly, the gmMPVolumePropertyPolicy object 2116 has a composition relationship with the gmMPZ object 2216 and the gmGradientProp object 2206, as illustrated in FIG. 23.

Figure 24:
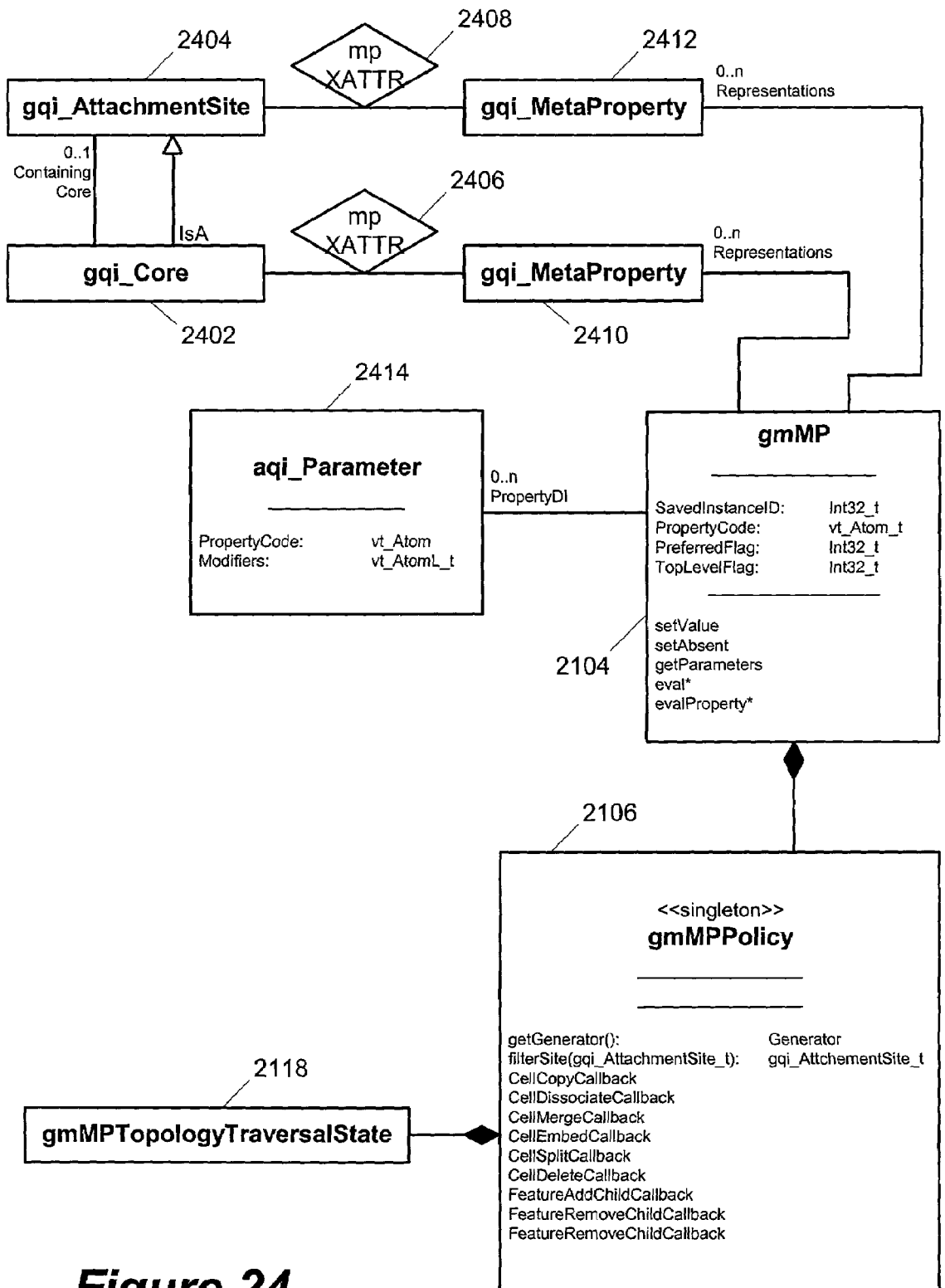
FIG. 24 is a block diagram illustrating the relationships of various objects of the present invention.

FIG. 24 illustrates an arrangement of objects of the present invention to facilitate the computation and display of data, preferably of seismic data. FIG. 24 illustrates the gqi_AttachmentSite object 2204 which has an IsA relationship with the gqi_Core object 2018. There is an mp XAttr object 2408 and 2406 for both the gqi_AttachmentSite object 2204, and the gqi_Core object 2402, respectively, as illustrated in FIG. 24. The gqi_AttachmentSite object 2204 has an operative relationship with the gqi_MetaProperty object 2412. Similarly, the gqi_Core object 2402 has an operative relationship with the gqi_MetaProperty object 2410. The gmMP object 2104 has 0 . . . n representations of operative relationships with both the gqi_MetaProperty 2412 and the gqi_MetaProperty 2410, as illustrated in FIG. 24. The aqi_Parameter object 2414 has 0. . . n operative relationship (PropertyDI) with the gmMP object 2104, as illustrated in FIG. 24. The gmMPPolicy object 2106 has a composition relationship with the gmMP object 2104. Finally, the gmMPTopologyTraversalState object 2416 has an operative relationship with the gmMPPolicy object 2106.

Referring to FIGS. 21 and 22, the material property framework classes may be grouped into four categories. The system classes (2104, 2106, 2108, 2110, 2112, 2114, 2118, 2122, 2124, 2126, 2128, 2130, and 2132 of FIG. 21) support the operation of the GQI (e.g., point set preservation, feature boundary tracking). The IGM classes (2232, 2234, and 2236 of FIG. 22) (e.g., feature back pointers) must be isolated from the system classes because they have dependencies on the IGM. The system classes are strictly limited to internal use and should not be derived from or instantiated by applications. The application support property classes (2120, 2204, 2206, 2216, and 2228 of FIGS. 21 and 22) implement the basic mechanisms required by applications (and system components) for attachment, invariant maintenance, and evaluation. They may be derived from and, in some cases, used directly by applications. It is preferable that the system classes also be derived from these application support classes. Finally, the fourth set of classes, the application classes (2208, 2210, 2212, 2214, 2218, 2220, 2222, 2224, 2226, 2230, 2238, 2240, and 2242 of FIG. 22) are intended to be used by applications for the direct representation of material properties.

ABSTRACT BASE CLASSES

The gmMP class 2104 of FIGS. 21 and 22 define the basic behavior of the material property representation classes. It directly supports the following capabilities:
  read/write of the mp_class instances, including tracking of multiple references to the same instance during read/write, value type scan/print/pack/unpack;
  maintain a reference to an attachment policy (see below) which provides the methods for Shapes editing event callbacks;
  instance methods for property evaluation by return type: evalDouble, evalPtr, evalString, evalOnPolyLine, evalMinMax;
  class methods for property evaluation by property name: evalPropertyDouble, evalPropertyPtr, evalPropertyString, evalPropertyMinMax;
  miscellaneous methods to lookup a gmMP derived class instance: by evaluator class and site, by site and property DI, by site, property code, (and optionally, property classname); and
  default construction of the Property DI used to index property attachments.

The gmMP base class 2104 also provides the data structures used by the above methods to manage all instances of the derived classes and to support the necessary lookup capabilities.

The gmMPPolicy abstract base class 2106 implements the following behaviors:
  maintains a reference to a topology traversal generator which enumerates the subcells to which a material property conforming to a given policy is to be propagated;
  Shapes editing event handlers and dummy virtual instance methods invoked by those event handlers. In the redesigned system, all possible callbacks must be supported. In the previous design, only the following were supported at the gmMPPolicy level: CellCopyCallback, CellDissociateCallback, CellSplitCallback, CellEmbedCallback, CellMergeCallback, CellDeleteCallback, FeatureAddChildCallback, FeatureRemoveChildCallback, FeatureReplaceChildCallback;
  The gmMPPolicy classes are implemented as singletons, which means that a class method is provided to obtain or create the one instance.

The gm_MPTopologyTraversalState 2118 of FIG. 21 implements several generators for different property propagation policies and behaves like an iterator to conduct the traversal while maintaining the state of a traversal. The generators that are supported include:
  generateNone: the dummy generator;
  generateHereOnly: the head of the list, no successors;
  generateHereAndChildren: Return the head of the open list; successors are the children of the next site if the next site is a core or feature, or subordinate bridges if the next site is a 3-cell;
  generateHereAndChildrenNoSubs: Return the head of the open list; successors are the children of the next site if the next site is any kind of group; no subordinates are generated;
  generateChildrenOf3Cell: Traverse only the subbridges and subordinate 2-cells of a 3-cell. Exclude the 3-cell itself;
  generateHereAndPartialBridges: Traverse the topology from the starting cell, down into one level of partial cell bridges. If reference_cell is NULL, then we are traversing an existing hierarchy. If reference_cell is not NULL, then we create partial bridges whose orientation matches those of reference_cell's partial bridges; and generateSupBridgesOf2Cell: Traverse the sup bridges of the 2-cell, if reference cell is given, find or generate partial bridges matching orientation of those on reference cell.

Material Property Representation Scheme

A Shapes attribute, designated "mp XATTR" 2408 and 2406 of FIG. 24 establishes the mapping between a Shapes entity gqi_AttachmentSite 2404 and the corresponding gqi_MetaProperty instance 2412. As can be seen from FIG. 24, the earlier C-structure based scheme has been replaced with direct reference to gmMP instances 2104.

In the preferred embodiment of the present invention, the core no longer manages event handlers. In prior art practice, it was determined that the event handlers were not independent. Instead, the event handlers clustered into a few sets of related handlers. According to the present invention, the prior art event handlers are now represented by gmMPPolicy instances 2106 (see FIGS. 21 and 24). Because the gmMPPolicy 2106 has no persistent state (the traversal state must be multiply-instantiated, if re-entrant traversal were to be supported), a singleton pattern is used to minimize the number of event handler virtual function tables.

The evaluators for the present invention are implemented as virtual functions in the gmMP 2104 (e.g., sub functions) and classes derived from gmMP 2104. A pattern similar to the singleton gmMPPolicy 2106 may be used to represent the evaluators for gmMP 2104 derived classes as the number of evaluators grows. However, the gmMP 2104 instances are shared by each attachment site to which a particular "property instance" is propagated.

The design of the objects of the present invention isolate the two behaviors mentioned above into two new pairs of classes:

Point Set Preservation gmSysPSPProperty 2124 carries the attachment semantics for point set preservation ("PSP"). The top level attachment site for gmSysPSPProperty 2124 is the model core itself. If more than one core exists, multiple PropertyDI's are generated and each core is considered to have a separate attachment. There is no other persistent state for this property.

gmSysPSPPolicy 2112 of FIG. 21 implements the propagation policy and edit callbacks for PSP.

Rules gmSysRules 2122 of FIG. 21 carry the attachment semantics for "Core" and "Feature" attached rules sets. The state of these property instances consists of the actual rule attachments and their firing state. The state of rules (which framework rules are attached and the rule violations) are managed by evaluation operations on the gmSysRules property instances 2122. Firing rule resolvers are distinct operations implemented only by the gmSysRules class 2122.

gmSysRulePolicy 2114 implements the propagation policy and edit callbacks for the rules, including firing the rule detectors.

Property DI and Attachment Semantics

The Property (Parameter) data item provides very specific user-visible semantics as illustrated in the following example. A property of specified Property_Code, Name, Modifiers (and other attributes supporting Log Curve Naming convention) have been attached by a user (or an application acting on behalf of the user). These attributes permit user discrimination among multiple similar properties on a given site.

A gmMP data member 2104 having a parameter called TopLevelSite stores the original site to which a top level attachment is made. If an attribute of a gmMP instance 2104 (e.g., default, or value) is modified, one must create a copy of the gmMP instance 2104 if the site associated with the modification is not the top level site.

The following policy is established for use of Property (Parameter) data item and attachment sites:

1. Every top level assignment of a property to a site (e.g., to a volume) is associated with a unique (among other top level assignments) Property DI and gmMP subclass instance 2104.
2. Every site to which the gmMPPolicy class 2106 propagates the assignment (e.g., bridges between a volume and bounding 2-cells) receives the same Property DI and the same gmMP instance 2104. It is possible that a given policy can cause multiple property instances of the same code to be attached to the same site by virtue of propagation from two directions. Multiple property instances are supported so this is not a problem.
3. An application may attach properties to a subcell of an attachment site which already has a property of the same code attached and propagated to said subcell. The propagated attachments are not considered top level, but the explicitly attached property instance is a top level attachment, and a new Property DI is generated.
4. Only top level attachments can be deleted. It is the responsibility of the property policy class to propagate the deletion just as it propagates attachment.

Finite State Machine

Figure 19:
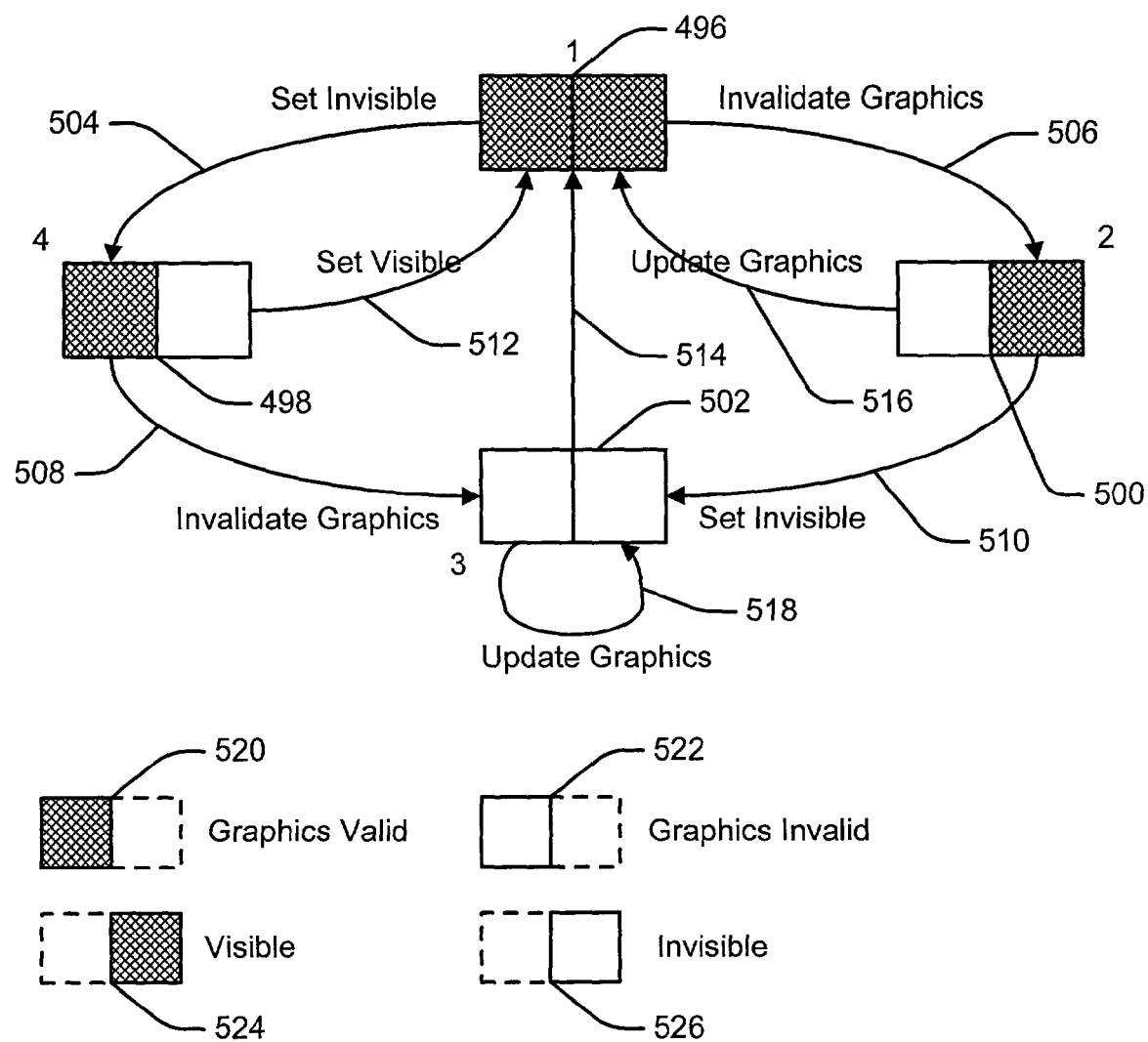
FIG. 19 is a state diagram of the present invention.

FIG. 19 illustrates the finite state machine of the present invention. Specifically, there is a State 1 illustrated by box 496, State 2 illustrated by box 500, State 3 illustrated by box 502, and State 4 illustrated by box 498 of FIG. 19. Transition from State 1 to State 4 is by setting the object as invisible in operation 504. Transition from State 1 to State 2 is accomplished by invalidating graphics in operation 506. Transition from State 2 to State 3 is accomplished by setting the object as invisible in operation 510. Transition from State 4 to State 3 is accomplished by invalidating the graphics in operation 508. Transition from State 4 to State 1 is accomplished by setting the graphics object as visible in operation 512. Transition from State 2 to State 1 is accomplished by updating the graphics in operation 516. Finally, operation 514 both updates and validates the graphics and sets the object as visible to transition from State 3 to State 1 as illustrated in FIG. 19.

Callback Scheme

Figure 26:
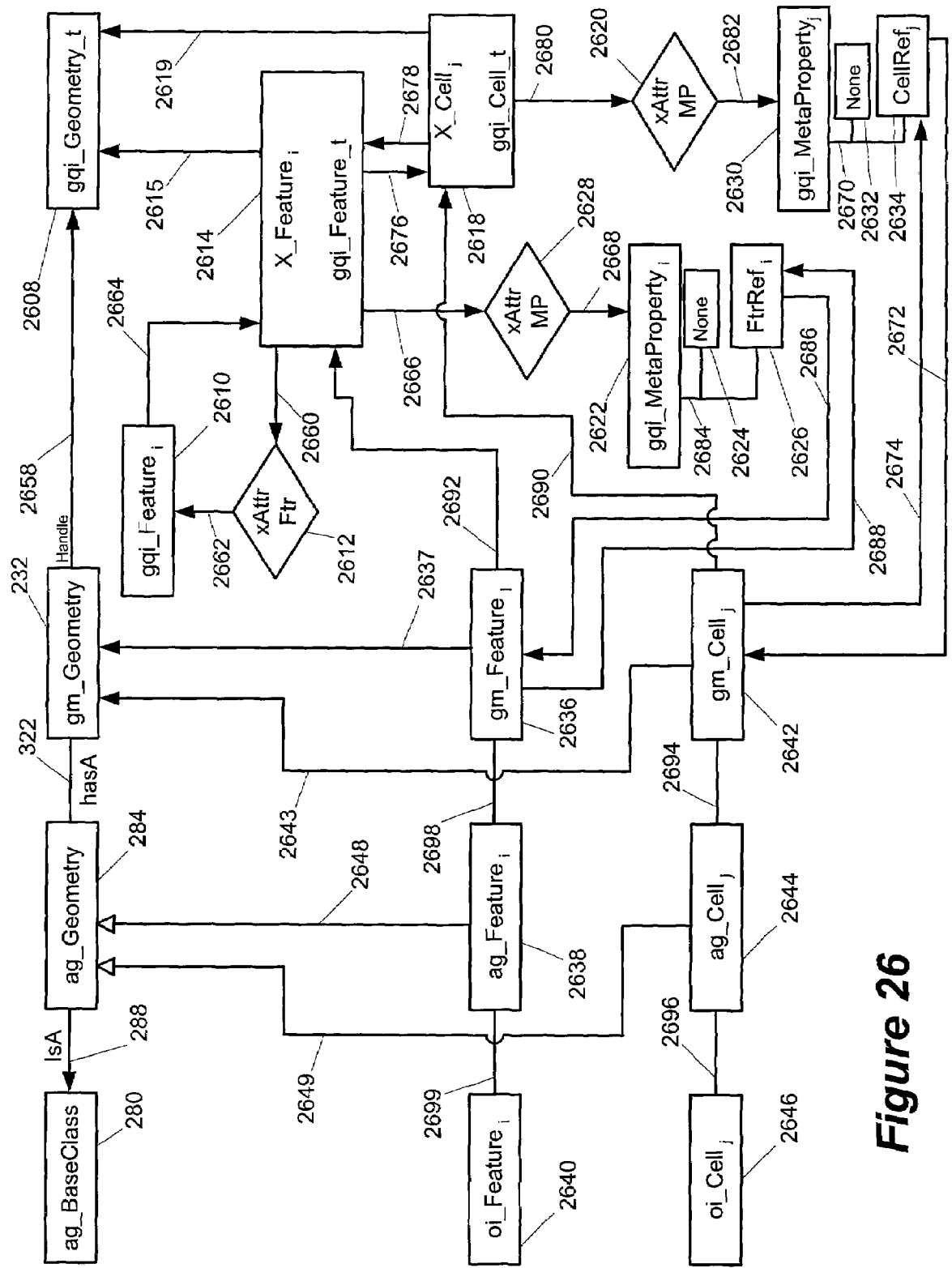
FIG. 26 is a block diagram illustrating the relationships of various objects of the present invention.

FIG. 26 illustrates the callback scheme of the present invention. The arrangement of the objects in FIG. 26 illustrates the callback aspects of the present invention.

As illustrated in FIG. 26, there are three main sets of objects on the left and middle portions of FIG. 26. As mentioned above, the objects cover three general aspects: geometry, features, and cells. As a matter of notation convention an acronym for the general category appears before the specific aspect of the object. For example, "ag" stands for aggregate; "gm" stands for geometric modeling; "oi" stands for OPEN INVENTOR, a graphics engine; gqi stands for geometry query interface; and "X" stands for XOX—Shapes, the geometry engine.

Referring to FIG. 26, first, there is the ag_BaseClass 280 (see FIG. 11) that has an IsA relationship 288 with the ag_Geometry object 284 as illustrated in FIG. 26. The gm_Geometry object 232 is in a hasA relationship 322 with the ag_Geometry object 284 and has another relationship 2658 with the gqi_Geometry_t object 2608.

An instance of the aggregate feature object ag_Feature$_i$ 2638 and an aggregate cell object ag_Cell$_i$ 2644 are associated with the aggregate geometry object ag_Geometry 284 through IsA relationships 2648 and 2649, respectively, as illustrated in FIG. 26. An open inventor feature object instance oi_Feature$_i$ 2640 is operatively related to the ag_Feature$_i$ through association 2699. Similarly, the open inventor cell object instance oi_Cell$_i$ 2646 is operatively connected to ag_Cell$_i$ 2644 via association 2696.

The geometric modeling object instances gm_Feature$_i$ 2636 and gm_Cell$_j$ 2642 are operatively connected to ag_Feature$_i$ 2698 and ag_Cell$_j$ 2644 via associations 2698 and 2694, respectively. In addition, the gm_Feature$_i$ object 2636 has a relationship 2637 with the gm_Geometry object 232. The gm_Cell$_j$ object similarly has a relationship 2643 with the gm_Geometry object 232, as illustrated in FIG. 26.

An X_Feature$_i$ object 2614 is provided with the present invention as illustrated in FIG. 26. The X_Feature$_i$ object 2614 has a relationship 2692 with the gm_Feature$_i$ object 2636. The X_Features object 2614 has a relationship 2660 with the xAttrFtr object 2612 which, in turn, has a relationship 2662 with the gqi_Feature$_i$ object 2610. The gqi_Feature$_i$ object 2610, in turn, has a relationship 2664 with the X_Feature$_i$ object 2614. The X_Cell$_i$ object 2618 has a relationship 2678 with the X_Feature$_i$ object 2614 (and the X_Feature$_i$ object 2614 has a relationship 2676 with the X_Cell$_i$ object 2618) as illustrated in FIG. 26.

The X_Feature$_i$ object 2614 has an association 2615 with the gqi_Geometry_t object 2608 as illustrated in FIG. 26. The X_Feature$_i$ object 2614 also has a relationship 2666 with the xAttrMP object 2628 which, in turn, has a relationship 2668 with a first gqi_MetaProperty$_j$ instance object 2622 The first instance of the gqi_MetaProperty$_i$ object 2622 is for features and can have a set of objects in association 2684 with it, such as object 2624 and one or more instances of the FtrRef$_i$ object 2626 as illustrated in FIG. 26. The FtrRef$_i$ object 2626 facilitates the callback functionality of the present invention through relationships 2686 and 2688 with the gm_Feature$_i$ object 2636 as illustrated in FIG. 26.

The cell objects have a parallel instance of the gqi_MetaProperty object, namely gqi_MetaProperty$_j$ object 2630. In this aspect of the present invention, X_Cell$_j$ object 2618 has a relationship 2680 with the xAttrMP object 2620. The xAttrMP object 2620, in turn, has a relationship 2682 with the second instance of the gqi_MetaProperty$_j$ object 2630 as illustrated in FIG. 26. As with the first instance of the gqi_MetaProperty$_i$ 2622, the second gqi_MetaProperty$_j$ object 2630 has an association 2670 with various objects, such as object 2632 and CellRef$_j$ object 2634. The callback operations of the present invention (for cells) are facilitated by relationships 2672 and 2674 with the gm_Cell$_j$ object 2642. As with the X_Feature$_i$ object 2614, the X_Cell$_j$ object 2618 has a relationship 2619 with the gqi_Geometry_t object 2608 as illustrated in FIG. 26. Finally, the X_Cell$_j$ object 2618 shares relationship 2678 and relationship 2676 with the X_Feature$_i$ object 2614 as illustrated in FIG. 26.

OPERATION OF THE PRESENT INVENTION

The present invention can be described as a method for interactively editing a model that is implemented on a computer comprising a processor, a data storage system, at least one input device and at least one output device, including, but not limited to, a computer monitor, storage device, or print-out. The model is preferably stored on a computer-readable media. The model itself has at least a first surface, although many surfaces are typically modeled.

EXAMPLE: Attach PSP Property

A general indication of the capabilities and flexibility of the structure of the present invention will be evident from the following example.

Figure 25:
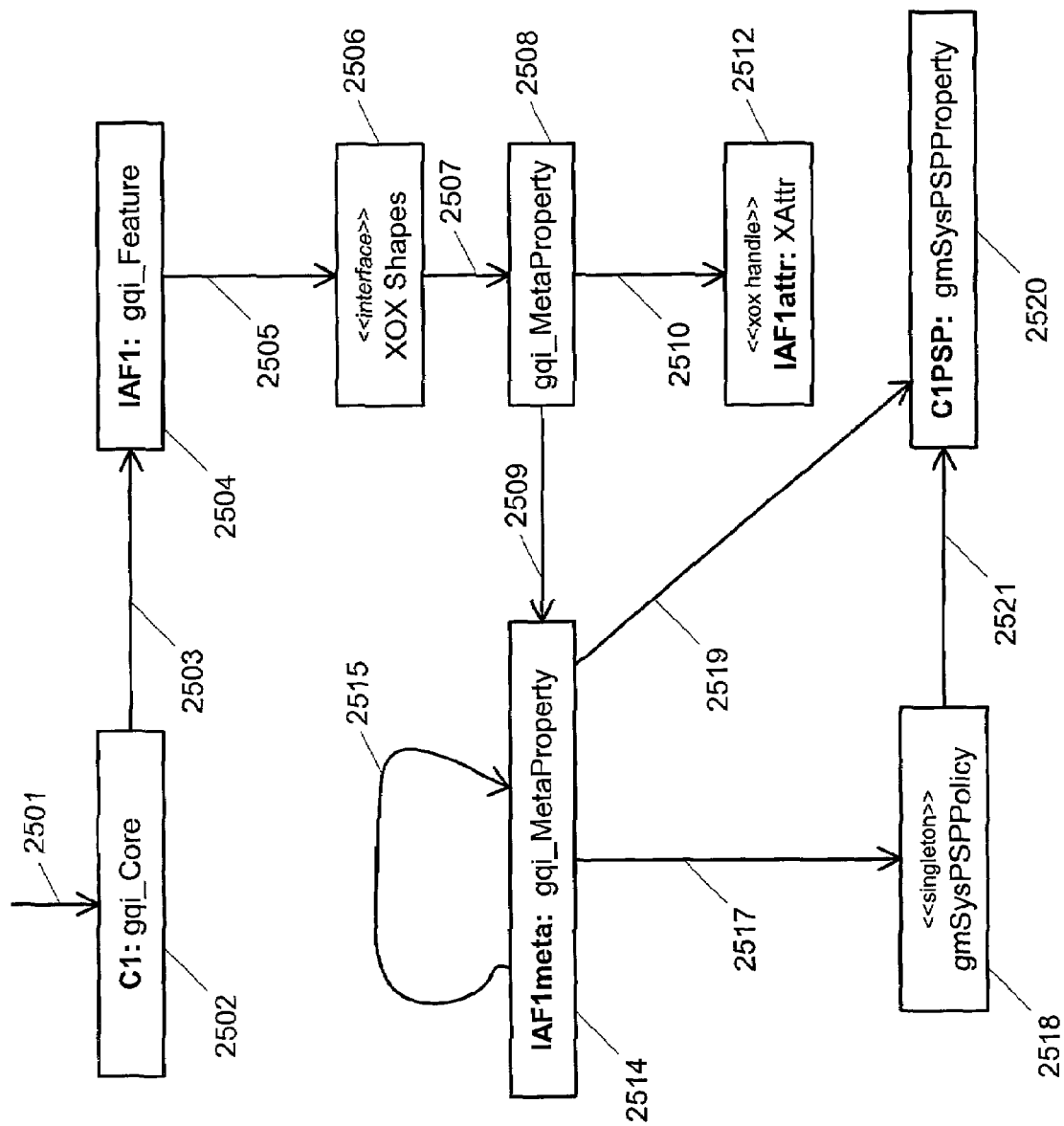
FIG. 25 is a block diagram illustrating the relationships of various objects of the present invention.

FIG. 25 illustrates the addition of core inactive features. As illustrated in FIG. 25, a horizon feature (called "H1") 2501 in the "unregistered" state is added to the unclassified features of model core C1 (gqi_Core object) 2502. It is desirable to model the behavior of the GQI as the gmSysPSPProperty 2520 is attached to the feature and propagated to the children and their subcells. Thus, an add child method 2503 is implemented onto gqi_Feature 2504 (the instance of which is termed "IAF1" in FIG. 25). The active and inactive features have a PSP property attached, so the add child method 2503 will evoke an add child event, which in turn causes the attachment of Hi. Note, the attachment of the PSP property occurs as a consequence of the add child event because the core's active and inactive features carry the PSP property.

From the gqi_Feature object 2504, a group add child method 2505 is invoked to affect the XOX Shapes object 2506 as illustrated in FIG. 25. The XOX Shapes object 2506 then invokes a class group add child callback method 2507, which has as its parameters IAF1, H1, and an IAF1 attribute, onto the gqi_metaProperty object 2412 as illustrated in FIG. 25. The gqi_MetaProperty object 2412 also invokes an attribute get pointer value method 2510, which takes as a parameter a v1Attr variable, onto a XOX handle object 2512, the instantiation of which is labeled IAF1attr. Thereafter, an add child callback method 2509 is invoked by the gqi_MetaProperty object 2412 onto a gqi_MetaProperty instance called IAF1meta 2514 as illustrated in FIG. 25. The add child callback method 2509 takes as its parameters IAF1, H1, and the IAF1 attribute. The IAF1meta instance of the gqi_MetaProperty 2412 invokes two methods. First, a get policy method 2519 is invoked on the C1PSP instance of the gmSysPSPProperty object 2520. Second, an add child callback method, having IAF1, Hi, and the IAF1 attribute as parameters, is invoked on the gmSysPSPPolicy object 2518 as illustrated in FIG. 25. Finally, an attach to method 2521 is invoked by the gmSysPSPPolicy object 2518 onto the C1PSP instance of the gmSysPSPProperty object 2520.

OTHER METHOD DESCRIPTIONS

A more generalized description of the methods of the present invention, in contrast to the specific example above, are illustrated in FIGS. 27–40. The specific steps illustrated in those Figures are described in the accompanying description.

Figure 27:
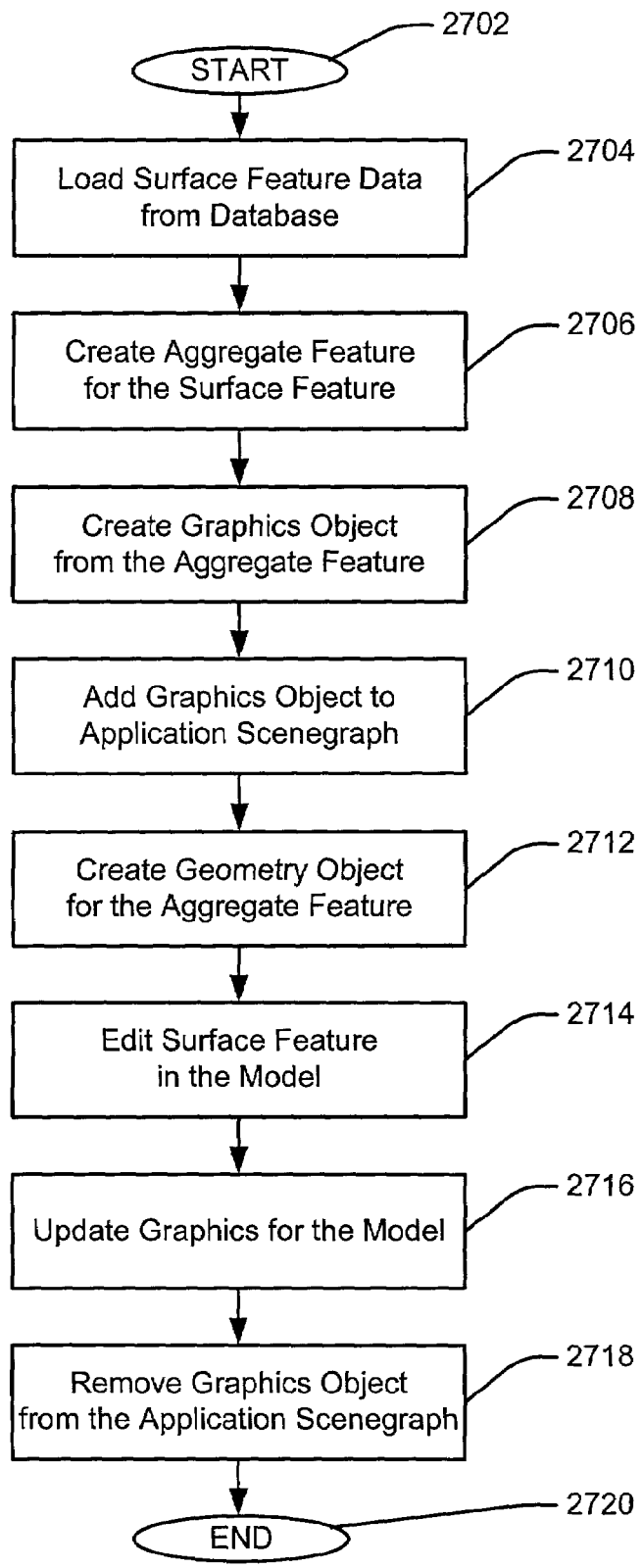
FIGS. 27–40 illustrate various methods of the present invention.

According to FIG. 27, the method begins generally at step 2702. The method continues in step 2704 by loading data about the first surface feature from a database that is stored in the data storage system into memory (random access memory or system or system memory) of a computer system. Next, in step 2706, an aggregate feature is created for the first surface feature. This enables the creation of a first graphics object from the aggregate feature, step 2708. Thereafter, the first graphic object is added to the application scenegraph, step 2710. Next, in step 2712, a geometry object is created for the aggregate feature. The first surface feature in the model is then edited as desired, step 2714. Once editing is complete (e.g., the user opts out of edit-mode, or a requisite period of time elapses), the graphics for the model are selectively updated, step 2716. The selective update relieves the various devices from recalculating and displaying all updates and changes. Instead, only those updates that affect what the user experiences are updated. Finally, the first graphics object of the first surface feature is removed from the application scenegraph, step 2718.

Editing and Updating

Figure 28A:
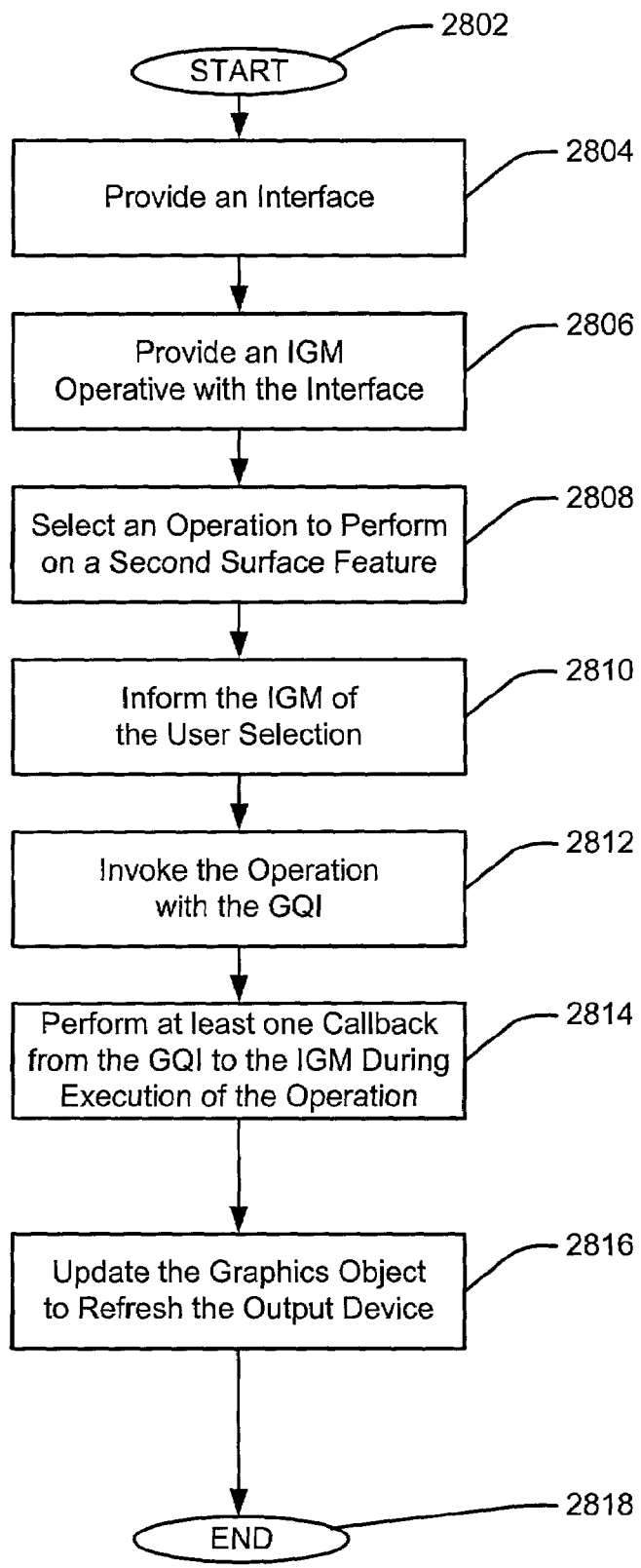

The process of editing itself is composed of several steps. Referring to FIG. 28*a*, first, one must provide an interface, step 2804. Next, in step 2806, an IGM that is operative with the interface must also be provided. It is helpful to include a GQI that is operative with the IGM. This enables the user, through the interface, to select an operation to perform on a second surface feature, step 2808. The interface is designed to inform the IGM of the user's selection, step 2810. The operation itself is invoked with the GQI, step 2812. During the editing process, step 2814, it is necessary to perform at least one callback from the GQI to the IGM during execution of the operation. The callback is used to update the graphics object of the model to refresh the output device. Editing can be accomplished via irregular space partitioning, although other techniques of editing are possible with the present invention. Once the editing is complete, the updating of the graphics can commence, typically by creating the graphics object, step 2816.

Figure 28B:
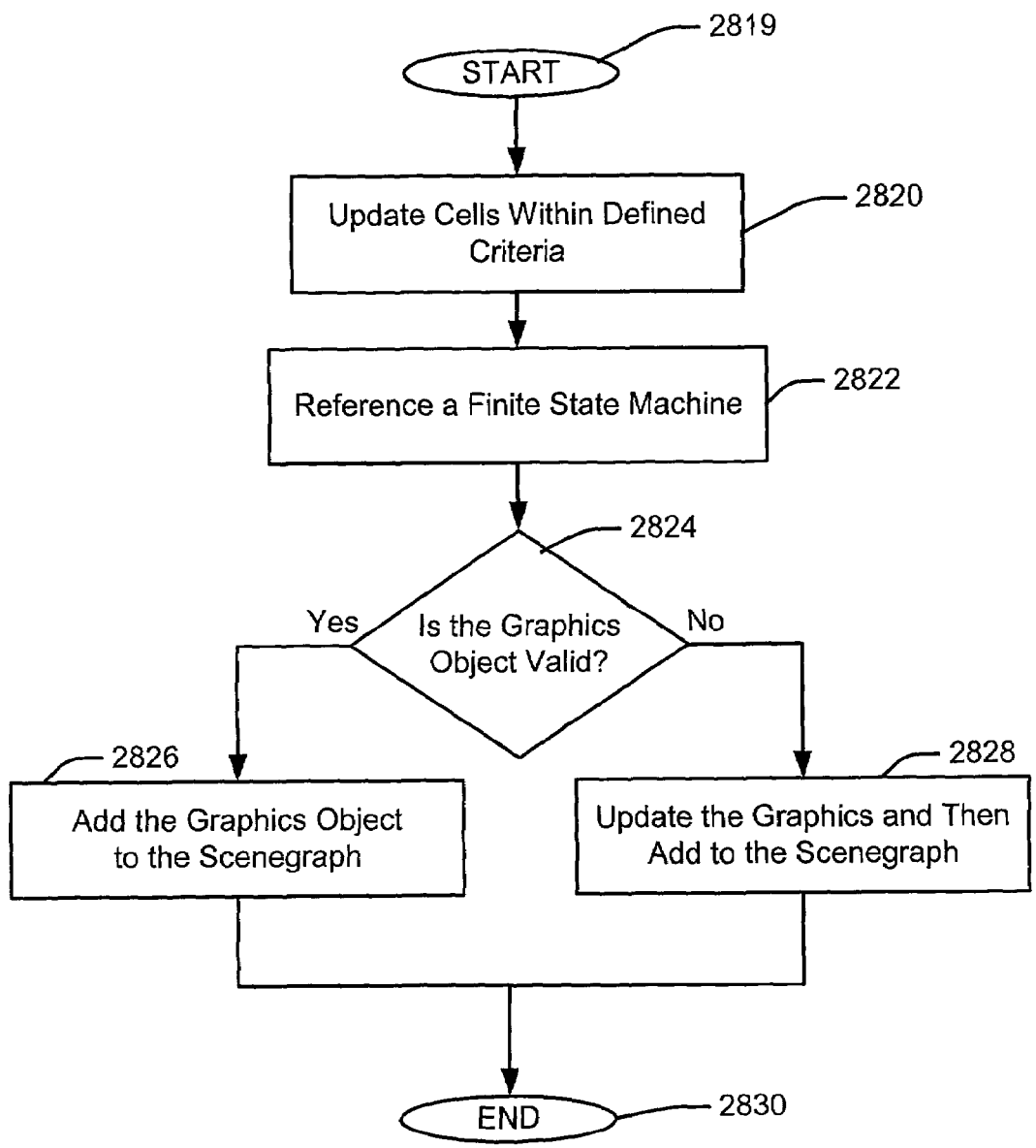

As illustrated in FIG. 28*b*, the present invention has a special feature wherein the step of updating 2816 includes updating graphics only those cells that have changed according to a defined criteria such as geometrical and/or topological, step 2820. The updating step may also include the referencing of a visibility finite state machine, step 2822. The visibility finite state machine aids in managing of the graphics object's updating operations and the graphics object's visibility updating operations. Use of the visibility finite state machine enables the updating of only those graphics objects that are designated as visible (to the user). The visibility finite state machine can be used to designate a graphics object as visible, and also to check on the validity of the graphics object. If the graphics object is valid, step 2824, then the graphics object can be added to the scenegraph, step 2826. Otherwise, the graphics object can be updated and then added to the scenegraph, step 2828 as illustrated in FIG. 28*b*.

Figure 28C:
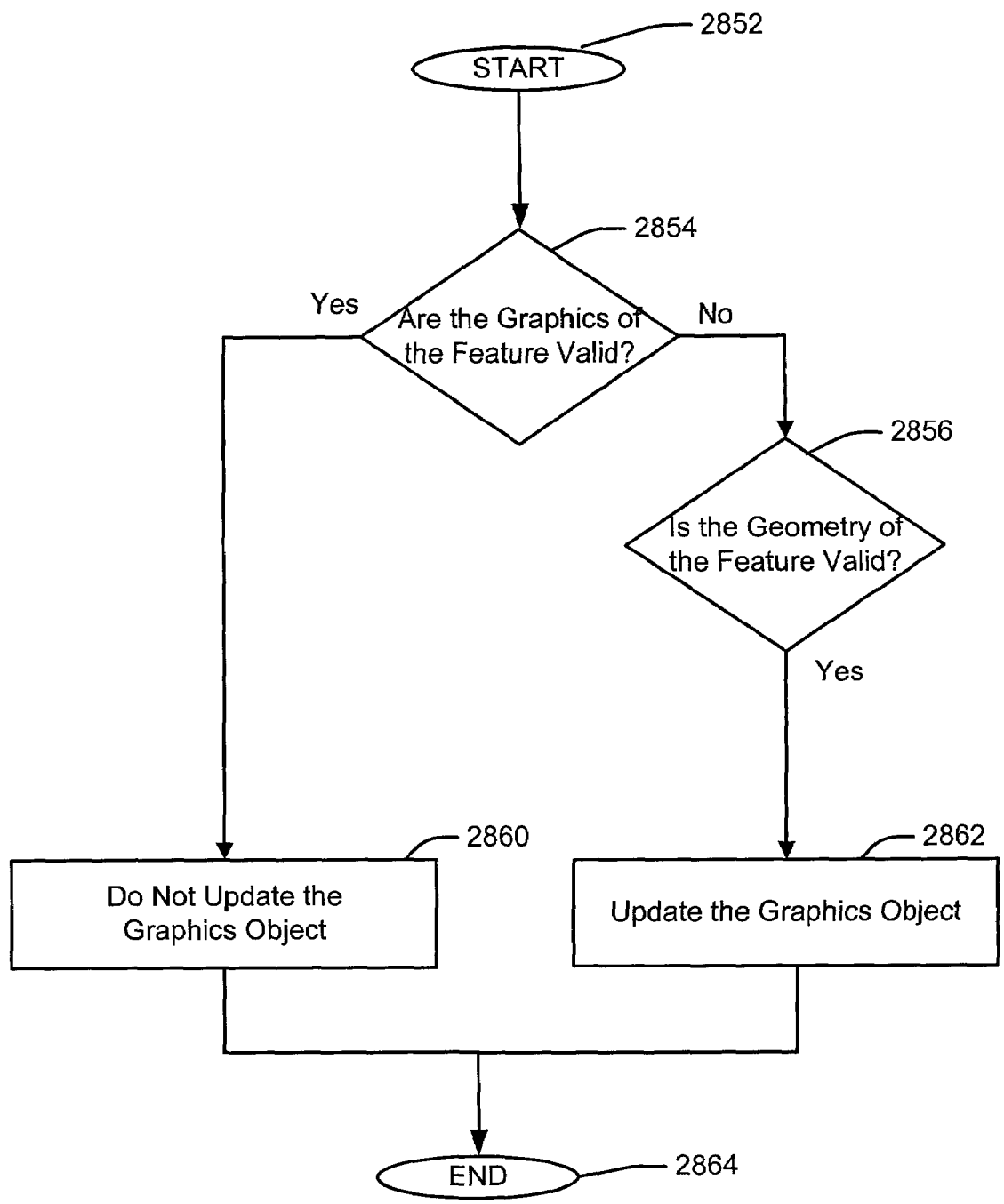

The process of updating can encompass several steps. For example, updating may include checking the state of each feature in the scenegraph, as illustrated in steps 2854–2856 of FIG. 28*c*. Generally, if the graphics of the feature are valid, step 2854, then the feature's graphics object is not updated, step 2860. However, if the feature's graphics are invalid, step 2854, and the geometry is valid, step 2856, then the graphics object of the feature is updated, step 2862 as illustrated in FIG. 28*c*.

Figure 28D:
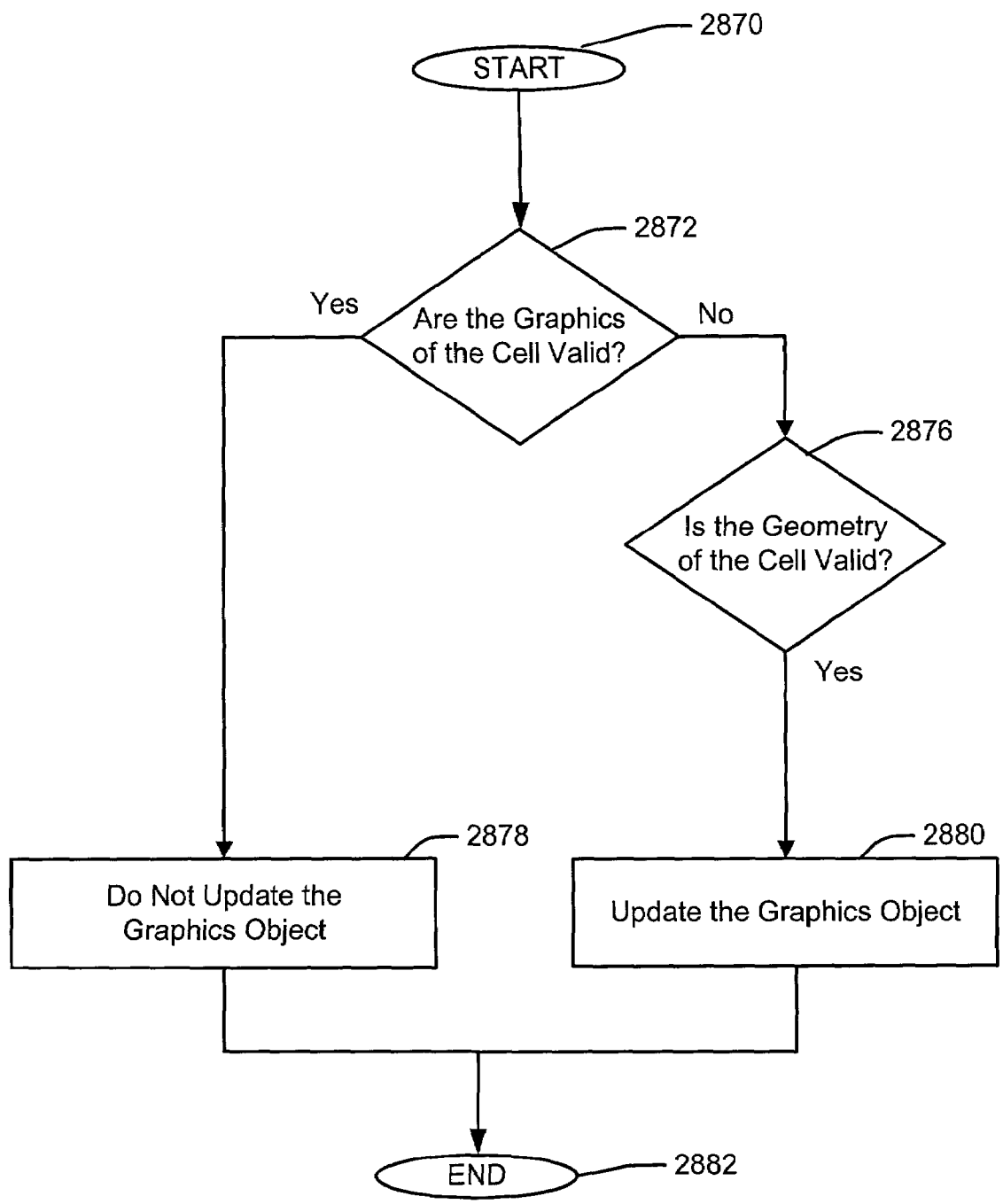

Another form of updating can include checking the state of each cell in the scenegraph, as illustrated in FIG. 28*d*. In this scenario, if the graphics for the cell are valid, step 2872, then the graphics object of the cell is not updated, step 2878. If the graphics of the cell are invalid, step 2872, and the geometry for the cell is valid, step 2876, then graphics object of the cell is updated, step 2880.

The method of the present invention may also encompass those situations where a second surface feature is not contained within the model, although the second feature can, of course, be contained within the model.

Creating Graphics

Figure 29:
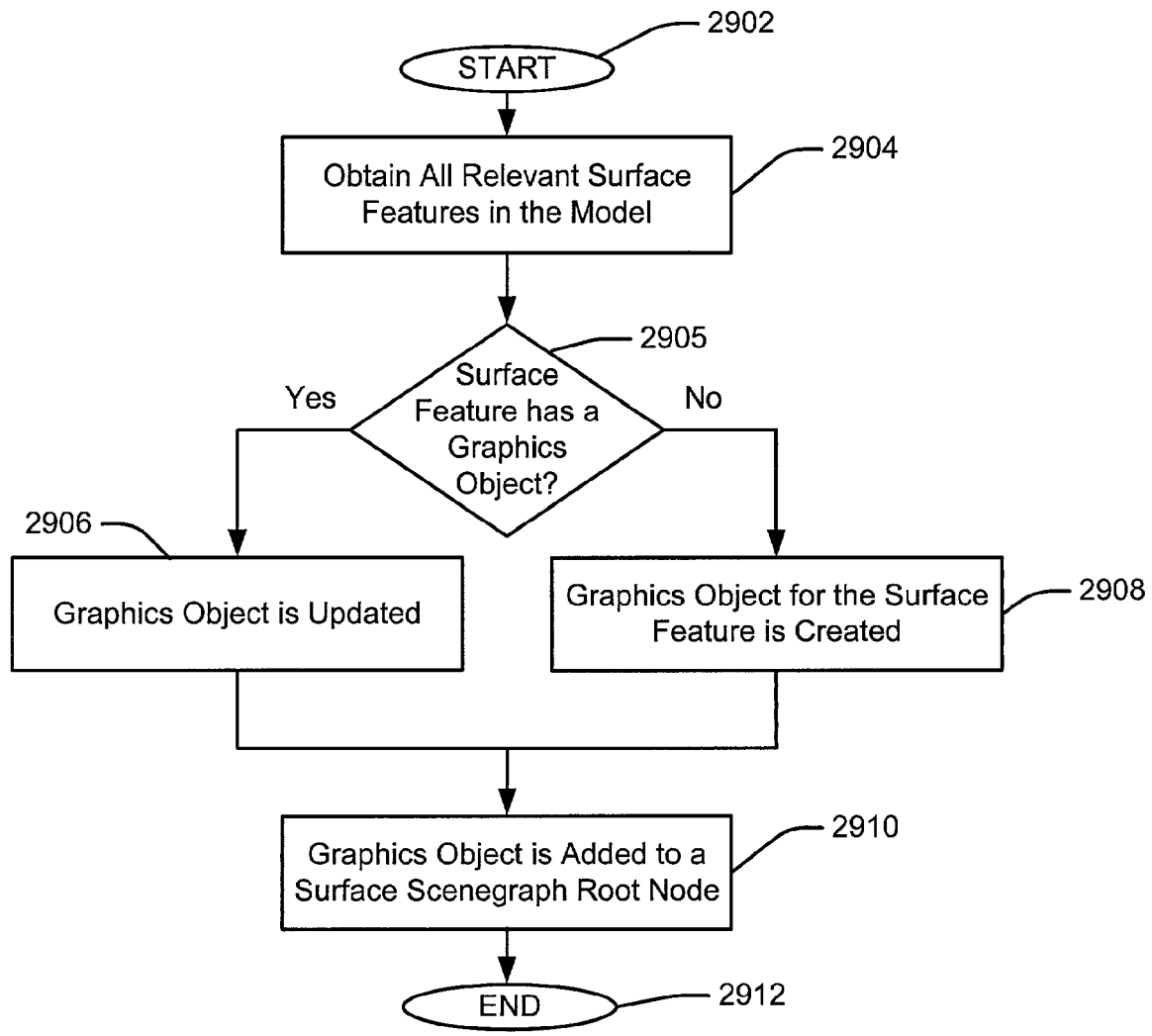

The method of the present invention also involves the creation of graphics for various entities, such as an aggregate feature, as illustrated in FIG. 29. Typically, this process involves obtaining all relevant surface features in the model, step 2904. Then, for each of the relevant surface features, if that surface feature has a graphics object, step 2905, then that graphics object is updated, step 2906. Otherwise, a graphics object for the surface feature is created, step 2908. Afterward, the graphics object for the surface feature is added to a surface scenegraph root node, step 2910, and the method of FIG. 29 ends generally at step 2912.

Figure 30:
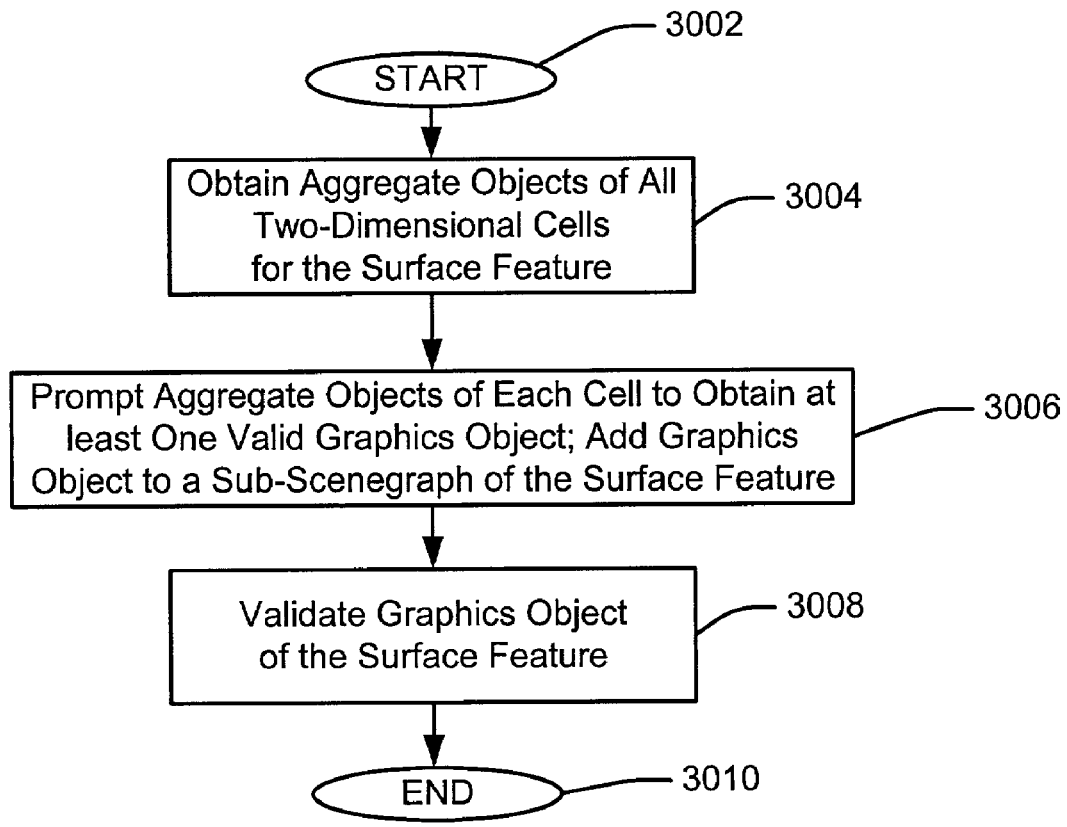

In addition to the steps outlined in the preceding paragraph, other steps may optionally be accomplished, as illustrated in FIG. 30. For example, the aggregate objects of all two-dimensional cells for the surface feature may be obtained, step 3004. Next, the aggregate objects of each of the cells can be prompted to obtain at least one valid graphics object and to add that graphics object to a sub-scenegraph of the surface feature, step 3006. Once that is completed, the graphics object of the surface feature can be validated, step 3008, and the method ends generally at step 3010.

Figure 31:
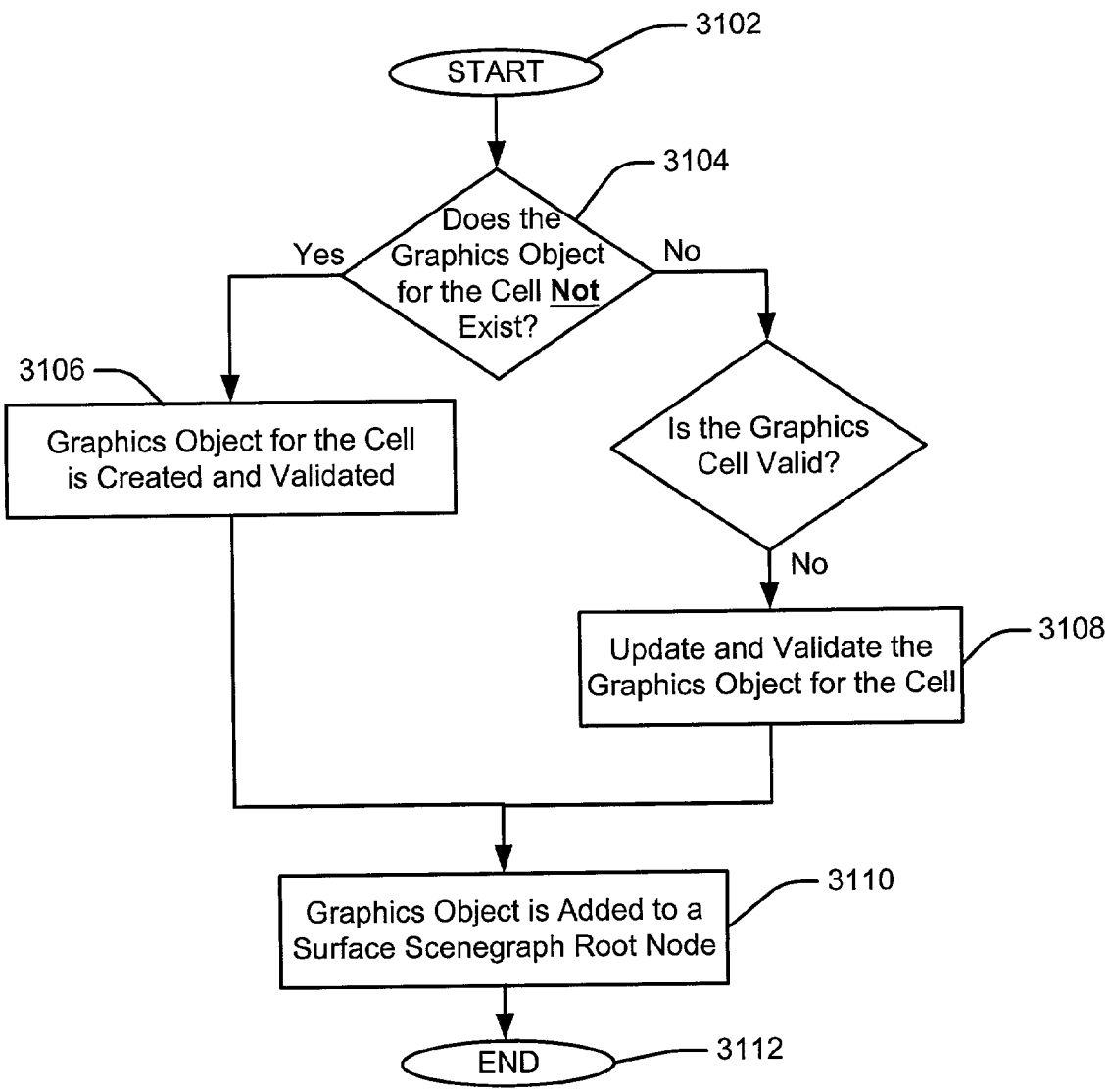

Still more steps may be taken for the method outlined immediately above, as illustrated in FIG. 31. For example, the step of obtaining valid graphics object for a cell can include a check to determine if the graphics object for the cell does not exist, step 3104. If the graphics object doesn't exist, then the graphics object for the cell is created and validated, step 3106. If the graphics object for the cell does exist but is not valid, then the graphics object for the cell is updated and validated, step 3108.

Figure 32:
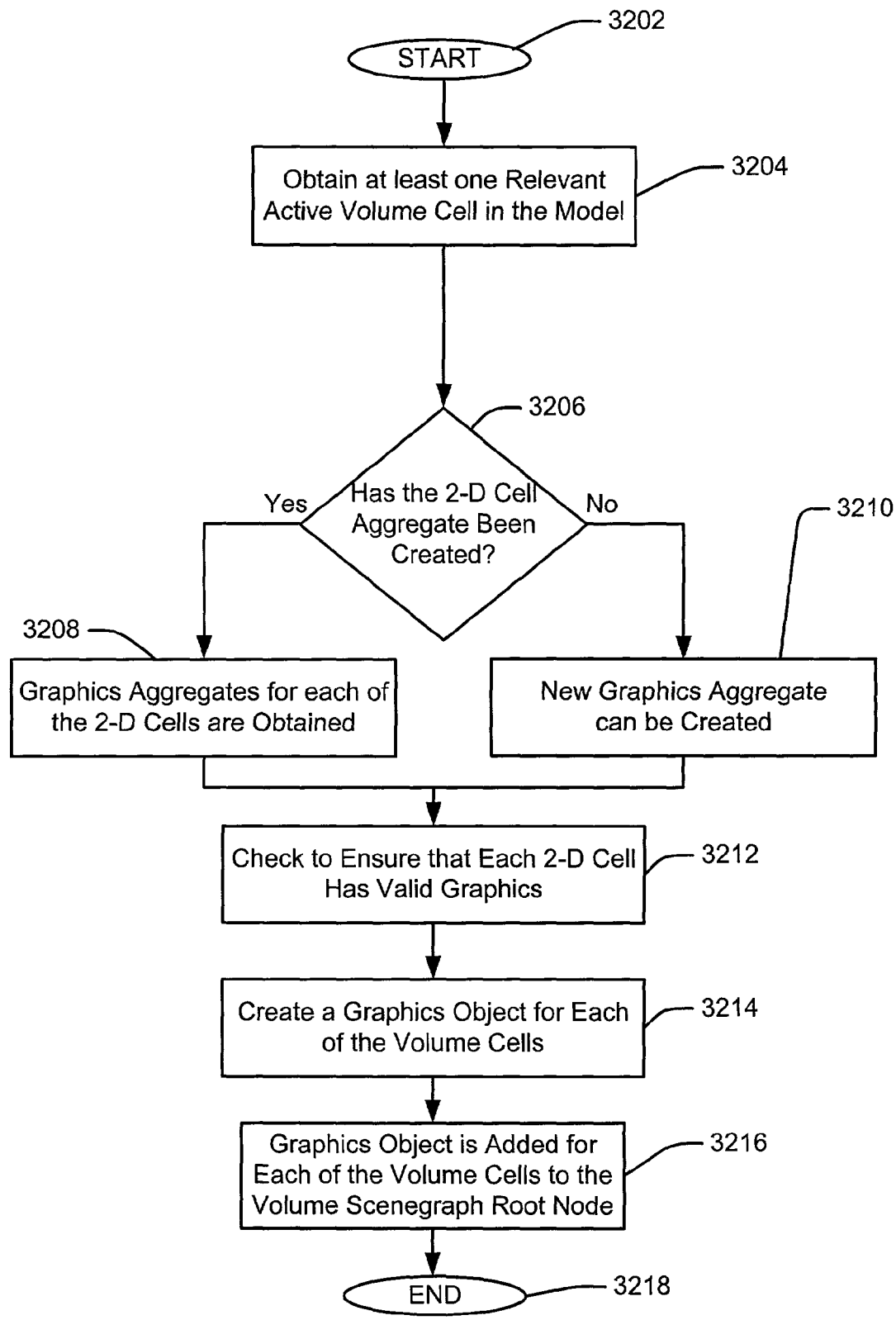

Alternatively, the method of the present invention for creating graphics may also include creating graphics for at least one volume cell from the model, as illustrated in FIG. 32. This alternative method includes obtaining at least one relevant active volume cell in the model, step 3204. Once obtained, a check can be made to ensure that the graphics objects of all of the two-dimensional cells of each volume cell have been created, step 3206. Then, for each of the two-dimensional cells, aggregates can be obtained, step 3208. A new aggregate can be created if the two-dimensional cell aggregate does not exist, step 3210. Then each two-dimensional cell is checked to ensure that it has valid graphics, step 3212. Thereafter, a graphics object can be created for each of the volume cells, step 3214. Then, for each volume cell, the graphics content of each two-dimensional cells of the volume cell is added to the sub-scenegraph of the graphics object of the volume cell, step 3214. Finally, the graphics object is added for each of the volume cells to the volume scenegraph root node, step 3216. Additionally, an instantiation of a graphics content, without color material, that graphically represents a two-dimensional cell can be shared by at least one scenegraph containing a graphics object of a surface feature that has the two-dimensional cell as a child, as well as at least one of the scenegraphs that contains graphics objects of either one volume cell or two volume cells that have the two-dimensional cell as part of their boundaries.

Callbacks

The present invention makes extensive use of callback within the object framework. For instance, a callback can cause a change of state for the aggregate feature. Preferably, the aggregate features element is a consistency finite state machine, so that the callback is facilitated efficiently. It is also preferable that the consistency finite state machine manages the consistency between the geometry and the graphics. Callbacks are also useful for invalidating the graphics object for the aggregate feature and for validating the geometry of the aggregate feature. For example, if the callback is for a volume object, then a specific callback is used for the volume feature. Otherwise an edit callback for a surface feature is performed.

A callback can be performed in a number of ways. Generally, however, the callback is accomplished with a set of one or more objects. Generally, that set of objects includes a first geometry modeler feature object; a changed geometry object that is contained in the geometry modeler feature object; a first meta-property attribute object that is operatively associated with the changed geometry object; a first meta-property object that is associated with the first meta-property attribute; a second meta-property attribute object that is associated with the geometry modeler feature object; and a second meta-property object associated with the second meta-property attribute object.

The first meta-property object itself has a set of objects, such as a point set preservation property object; a point set preservation property policy object; a cell back pointer property object; an aggregate back pointer property policy object; a geometry cell object associated with the callback pointer object; an aggregate cell object associated with the geometry cell object; and a display cell graphics object associated with the aggregate cell object.

The second meta-property attribute object itself has a set of objects, includes a second point set preservation property object; a second point set preservation property policy object; a feature back pointer property object; a second aggregate back pointer property policy object; a geometry feature object associated with the feature back pointer property object; an aggregate feature object associated with the geometry feature object; and a display feature graphics object associated with the aggegate feature object.

Figure 33:
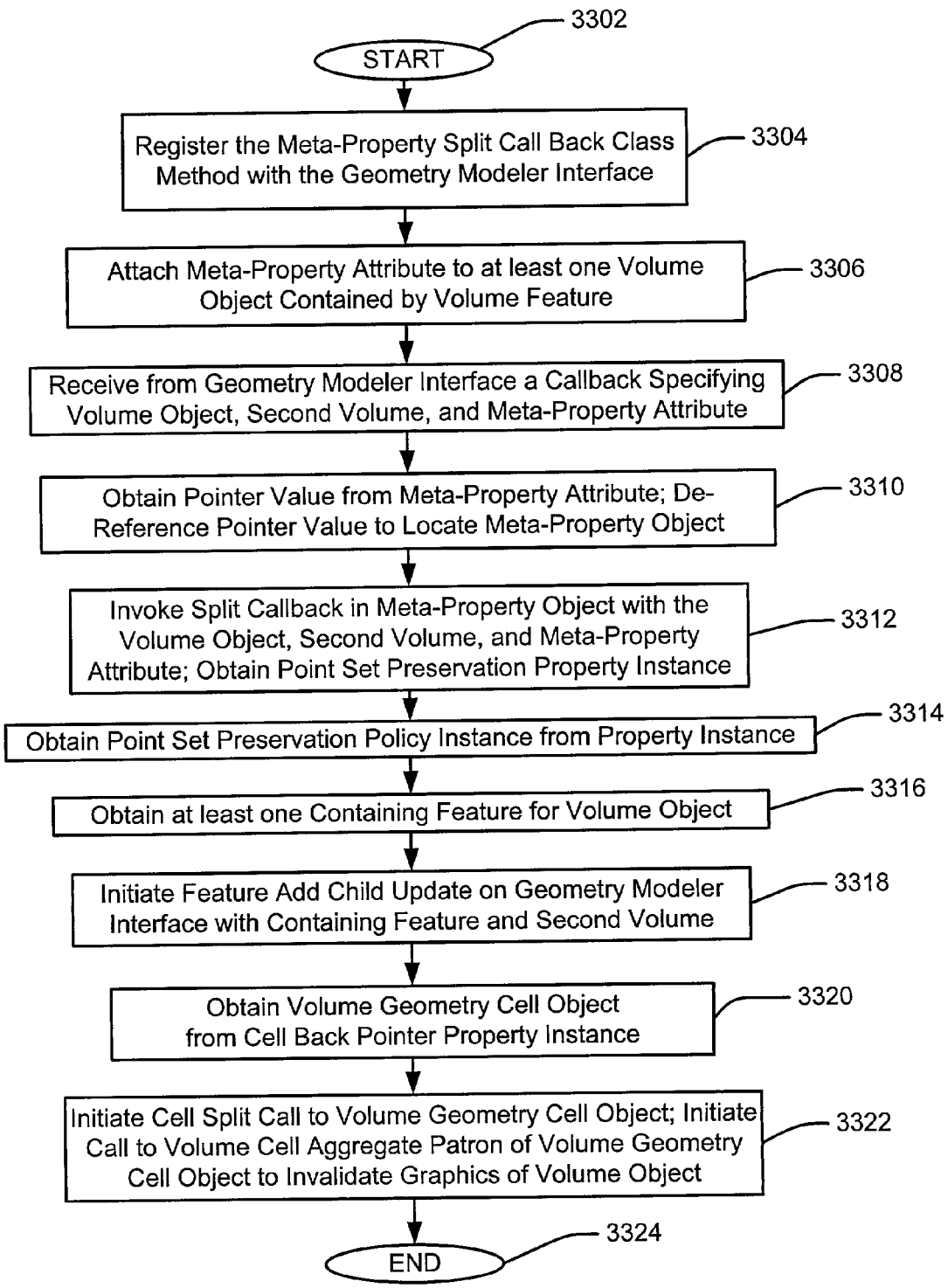

Callbacks according to the present invention can come in a variety of configurations and circumstances. For example, FIG. 33 illustrates edit callbacks for a volume feature which includes registering the meta-property split callback class method with the geometry modeler interface, step 3304. The geometry modeler interface is intended to be invoked when a volume split event occurs. Thereafter, in step 3306, a first meta-property attribute is attached to at least one volume object that is contained by the volume feature. Then, in step 3308, a callback is received from the geometry modeler interface that specifies a first volume object, a second volume affected by a change to the first volume object and the first meta-property attribute. A pointer value is then obtained from the first meta-property attribute which then allows the de-referencing of the pointer value to locate a first meta-property object, step 3310. A split callback is invoked in the first meta-property object with the first meta-property attribute, the first volume object and the second volume object. This last step itself encompasses obtaining a first point set preservation property instance, step 3312, and a first point set preservation policy instance from the property instance, step 3314, as well as initiating a first split callback to the point set preservation policy instance with the point set preservation property instance, the first volume object and the second volume object. This last sub-step itself includes obtaining at least one containing feature for the first volume object, step 3316, and initiating a feature add child update on the geometry modeler interface with the containing feature and the second volume object, step 3318. Then, a cell back pointer property instance is obtained so that an aggregate back pointer property policy instance can be obtained from the cell back pointer property instance whereupon a second split callback is initiated to the aggregate back pointer property policy instance with the cell back pointer property instance. The latter callback itself includes obtaining a volume geometry cell object, step 3320, from the cell back pointer property instance and initiating a cell split call to the volume geometry cell object. The latter sub-step may encompass initiating a call to the volume cell aggregate patron of the volume geometry cell object to invalidate the graphics of the first volume, step 3322.

Figure 34:
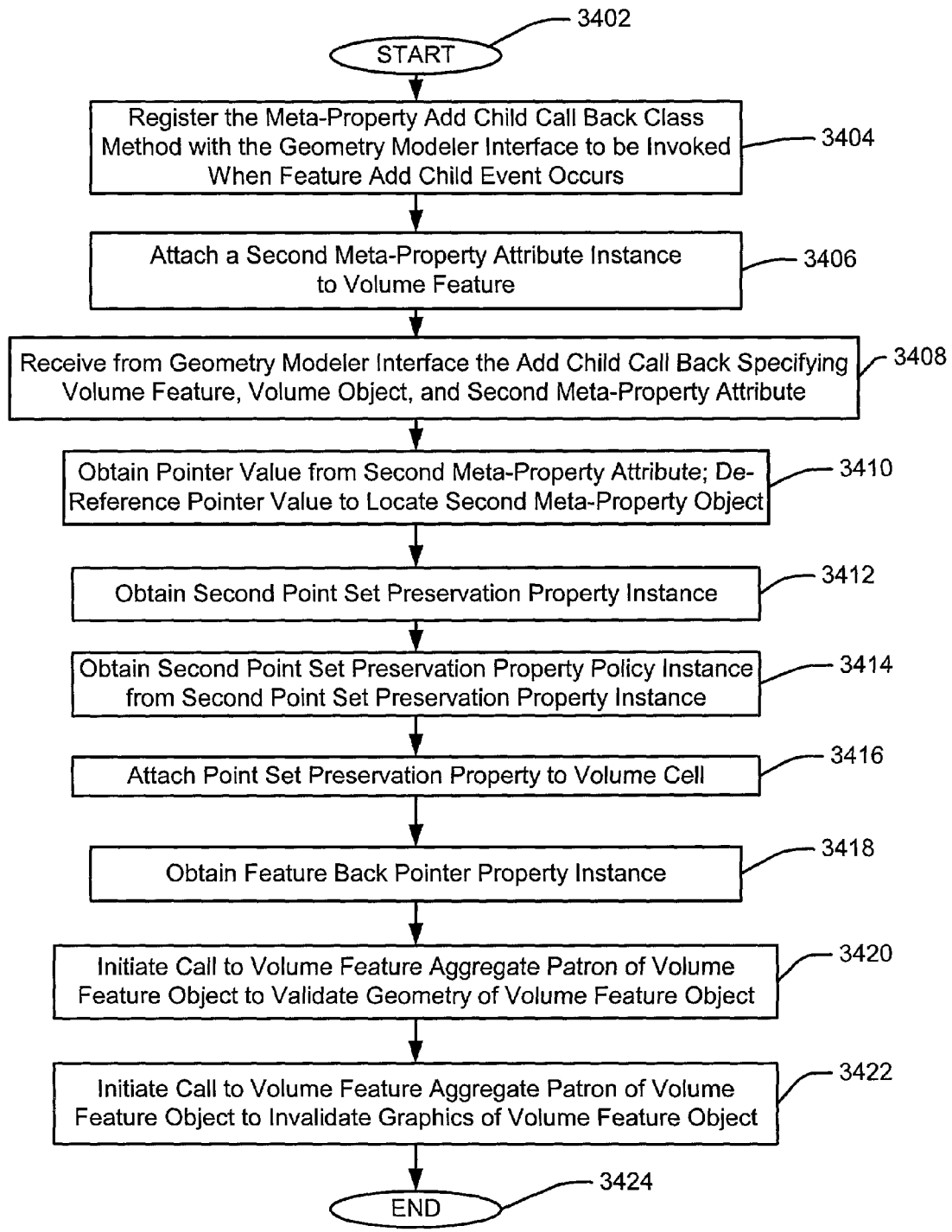
Figure 35:
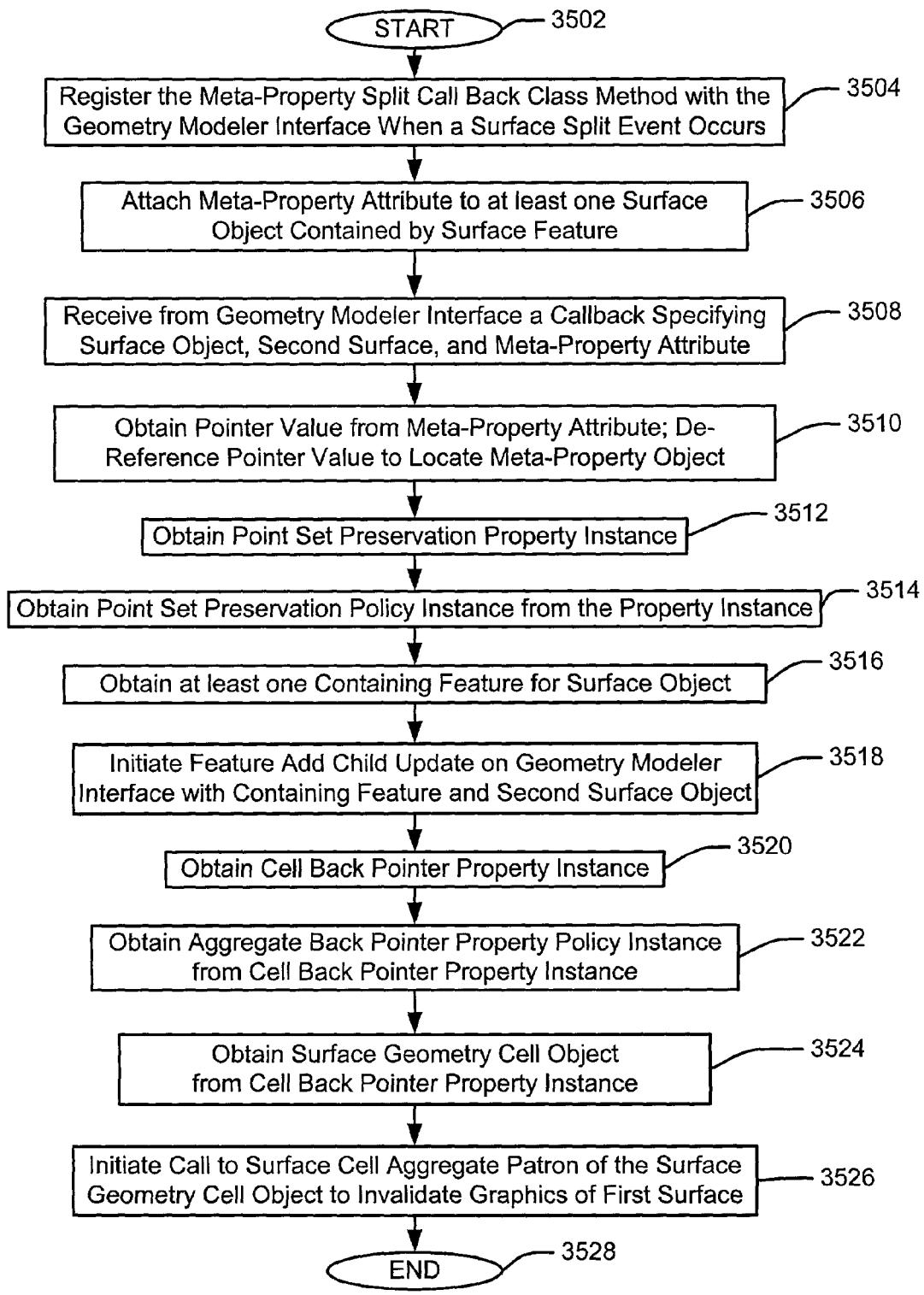

FIG. 34 illustrates performing a feature add child callback for a volume feature including registering the meta-property add child callback class method with the geometry modeler interface that is to be invoked when a feature add child event occurs, step 3404. This can include attaching a second meta-property attribute instance to the volume feature, step 3406; and receiving, from the geometry modeler interface, the add child callback specifying the volume feature, a volume object and the second meta-property attribute, step 3408. Next, in step 3410, a pointer value from the second meta-property attribute is obtained and then the pointer value is de-referenced to locate a second meta-property object. The add child callback is invoked in the second meta-property object. The latter step includes obtaining a second point set preservation property instance, step 3412; obtaining a second point set preservation property policy instance from the second point set preservation property instance, step 3414; and initiating the add child callback method of the second point set policy object with the volume feature and the volume geometry object. That latter sub-step itself includes attaching the point set preservation property to the volume cell, step 3416; obtaining a feature back pointer property instance, step 3418; and obtaining a second aggregate back pointer property policy instance from the feature back pointer property instance; and initiating the add child callback method of the second aggregate back pointer property policy instance with the volume feature, the volume geometry object and the volume feature back pointer property. The latter sub-step itself includes initiating an add child notify method call to the volume feature geometry object identified by the feature back pointer property instance. This latter sub-step itself includes initiating a call to the volume feature aggregate patron of the volume feature object in order to validate the geometry of the volume feature object, step 3420; and initiating a call to the volume feature aggregate patron of the volume feature object in order to invalidate the graphics of the volume feature object, step 3422.

Yet another aspect of the method of the present invention involves performing an edit callback for a surface feature. This aspect of the method includes registering the meta-property split callback class method with the geometry modeler interface to be invoked when a surface split event occurs, step 3504; attaching a first meta-property attribute to at least one surface object contained by the surface feature, step 3506; receiving from the geometry modeler interface a callback specifying a first surface object, a second surface affected by a change to the first surface and the first meta-property attribute, step 3508; obtaining a pointer value from the first meta-property attribute and de-referencing the pointer value to locate a first meta-property object, step 3510; invoking a split callback in the first meta-property object with the first surface object, the second surface object and the first meta-property attribute, itself. The latter step includes obtaining a first point set preservation property instance, step 3512; obtaining a first point set preservation policy instance from the property instance, step 3514; and initiating a first split callback to the point set preservation policy instance with the point set preservation property instance, the first surface object and the second surface object. The latter sub-step itself includes obtaining at least one containing feature for the first surface object, step 3516; and initiating a feature add child update on the geometry modeler interface with the containing feature and the second surface object, step 3518; obtaining a cell back pointer property instance, step 3520; obtaining an aggregate back pointer property policy instance from the cell back pointer property instance, step 3522; and initiating a second split callback to the aggregate back pointer property policy instance with the cell back pointer property instance. The latter sub-step itself includes obtaining a surface geometry cell object from the cell back pointer property instance, step 3524; and initiating a cell split call to the surface geometry cell object. This latter sub-step includes initiating a call to the surface cell aggregate patron of the surface geometry cell object to invalidate the graphics of the first surface, step 3526.

Figure 36:
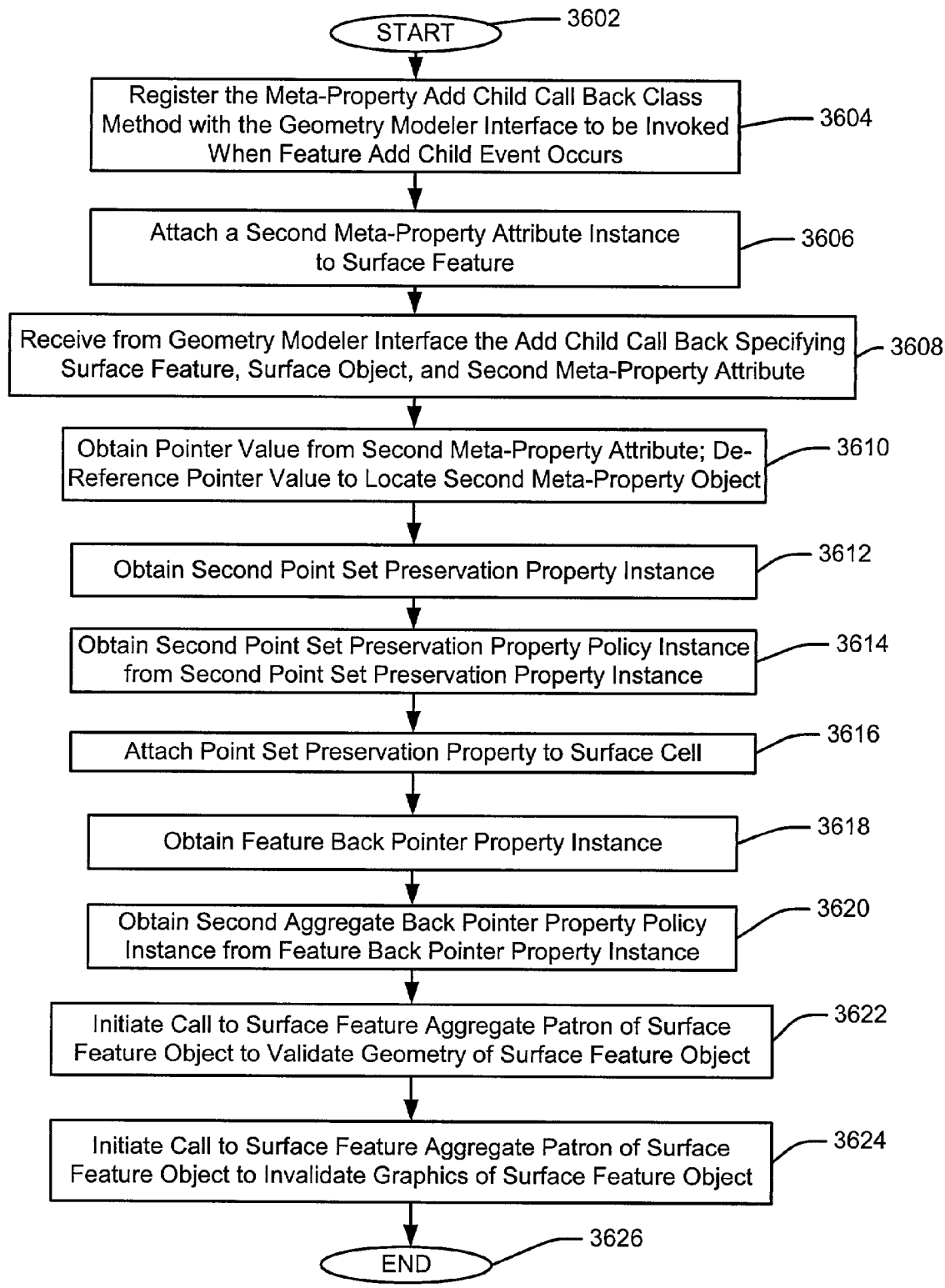

FIG. 36 illustrates the steps of performing a feature add callback (mentioned in the preceding paragraph) includes the steps of registering the meta-property add child callback class method with the geometry modeler interface that is to be invoked when a feature add child event occurs, step 3604; attaching a second meta-property attribute instance to the surface feature, step 3606; receiving from the geometry modeler interface the add child callback specifying the surface feature, a surface object and the second meta-property attribute, step 3608; obtaining a pointer value from the second meta-property attribute and de-referencing the pointer value to locate a second meta-property object, step 3610; and invoking the add child callback in the second meta-property object. This latter sub-step itself includes obtaining a second point set preservation property instance, step 3612; obtaining a second point set preservation property policy instance from the second point set preservation property instance, step 3614; and initiating the add child callback method of the second point set policy object with the surface feature and the surface geometry object. This latter sub-step itself includes attaching the point set preservation property to the surface cell, step 3616; obtaining a feature back pointer property instance, step 3618; obtaining a second aggregate back pointer property policy instance from the feature back pointer property instance, step 3620; and initiating the add child callback method of the second aggregate back pointer property policy instance with the surface feature, the surface geometry object and the surface feature back pointer property. This latter sub-step itself includes initiating an add child notify call to the surface feature geometry object identified by the feature back pointer property instance. This latter sub-step itself includes initiating a call to the surface feature aggregate patron of the surface feature object to validate the geometry of the surface feature object, step 3622; and initiating a call to the surface feature aggregate patron of the surface feature object to invalidate the graphics of the surface feature object, step 3624.

Callbacks can have a number of effects on various objects of the present invention. For instance, performing the callback may cause a change of state for a cell. The change of state of the cell can be recorded in a consistency finite state machine.

Figure 37:
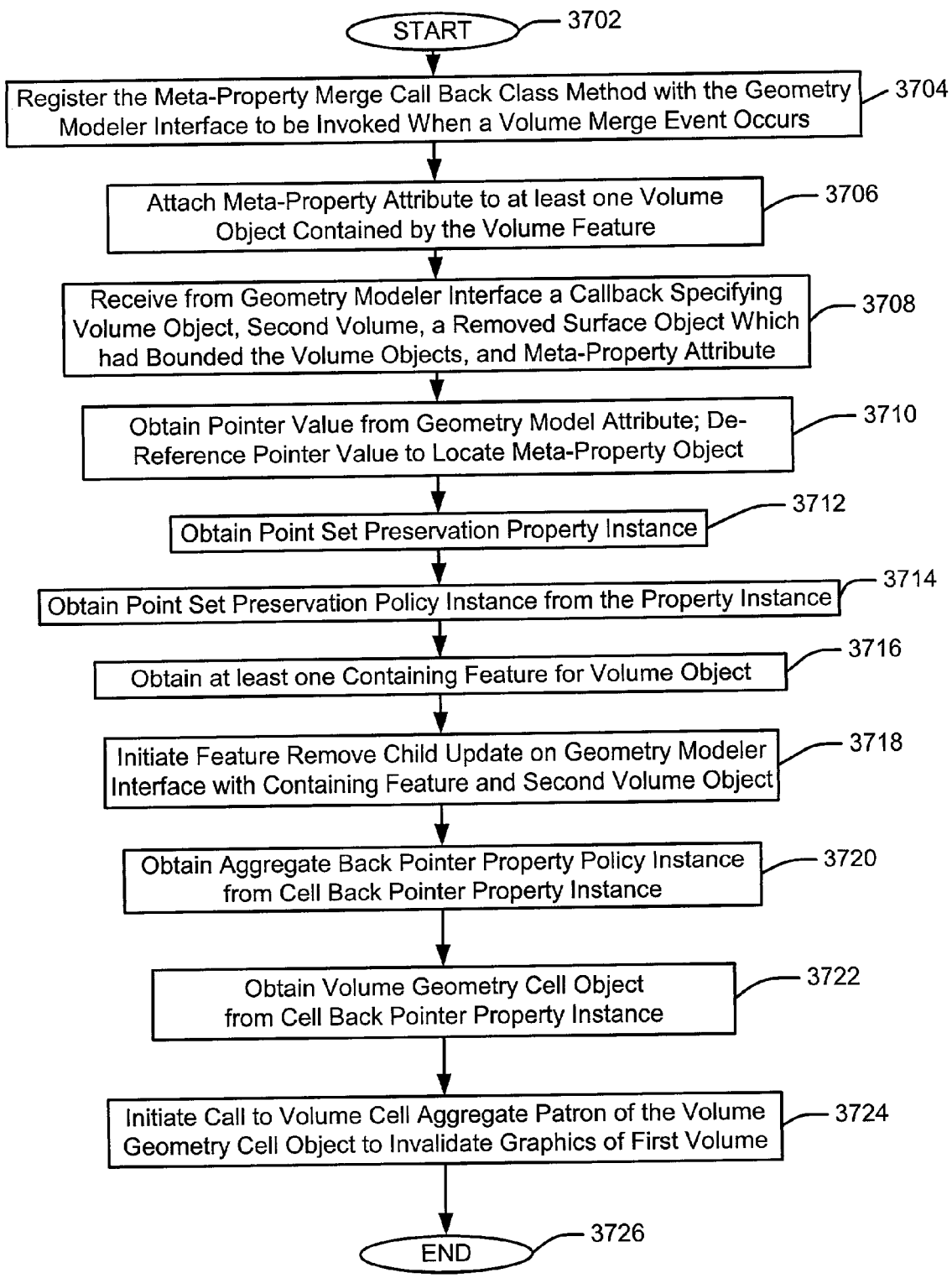

Another aspect of the method of the present invention is the performing of an edit callback for a volume feature, as illustrated in FIG. 37. That aspect of the method of the present invention includes registering the meta-property merge callback class method with the geometry modeler interface to be invoked when a volume merge event occurs, step 3704; attaching a first meta-property attribute to at least one volume object contained by the volume feature, step 3706; receiving from the geometry modeler interface a callback specifying a first volume object, a second volume object, a surface object which formerly bounded the first and second volume objects and which has been removed from the model, and a meta-property attribute, step 3708; obtaining a pointer value from the geometry model attribute and de-referencing the pointer value to locate a first meta-property object, step 3710; and invoking a merge callback in the first meta-property object. The latter sub-step itself includes obtaining a first point set preservation property instance, step 3712; obtaining a first point set preservation policy instance from the property instance, step 3714; and initiating a first merge callback to the point set preservation policy instance with the point set preservation property instance, the first volume object, the second volume object, and the surface object. That latter sub-step itself includes obtaining at least one containing feature for the first volume object, step 3716; and initiating a feature remove child update on the geometry modeler interface with the containing feature and the second volume object, step 3718; a cell back pointer property instance is then obtained in step 3719. Next, in step 3720, an aggregate back pointer property policy instance is obtained from the cell back pointer property instance; and a second merge callback is initiated to the aggregate back pointer property policy instance with the cell back pointer property instance, the first volume object, the second volume object, and the surface object. The latter sub-step itself includes obtaining a volume geometry cell object from the cell back pointer property instance, step 3722, and initiating a cell merge call to the volume geometry cell object. That latter sub-step itself includes initiating a call to the volume cell aggregate patron of the volume geometry cell object to invalidate the graphics of the first volume, step 3724.

Figure 38:
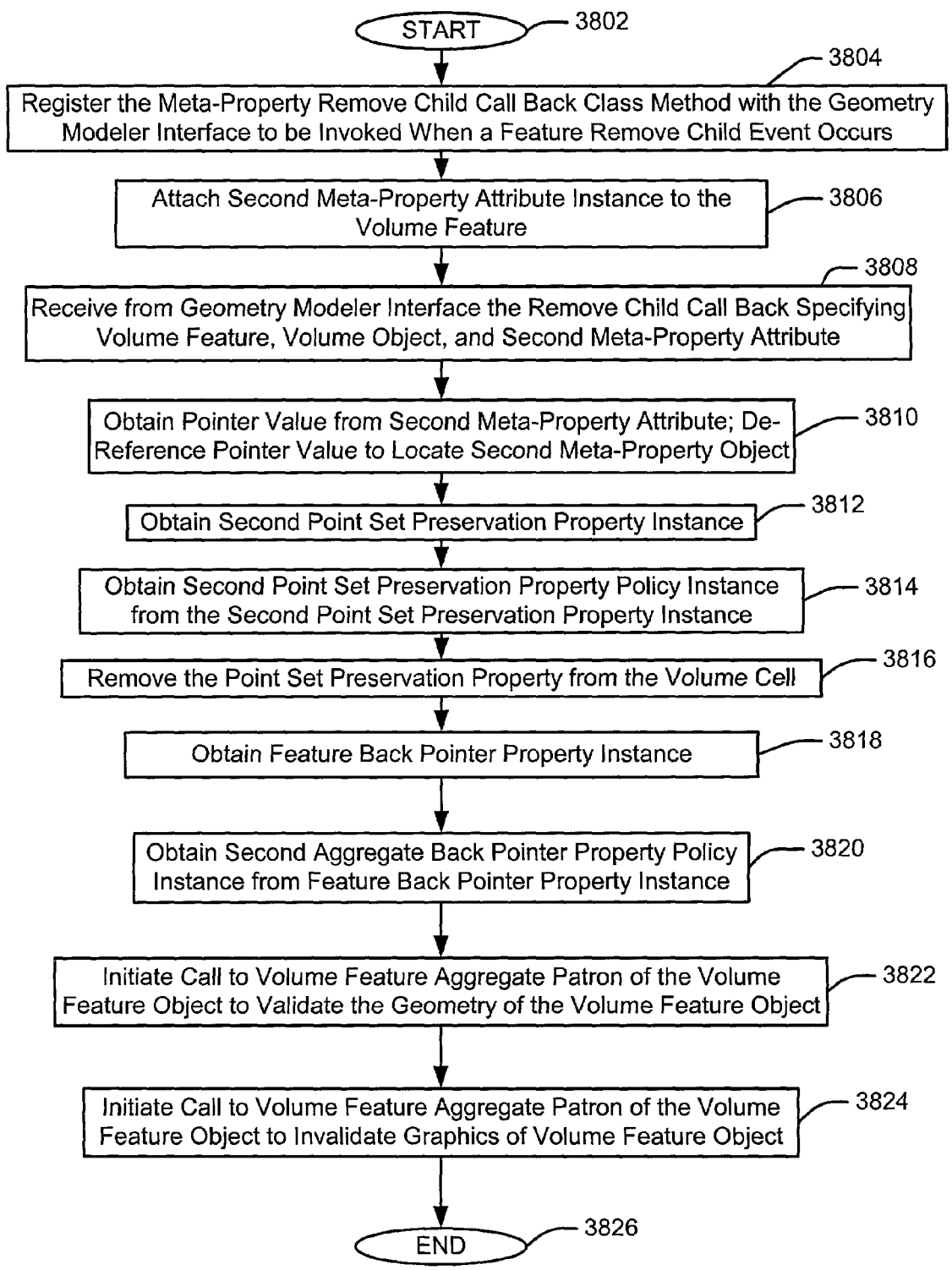

FIG. 38 illustrates a method for performing an edit callback on a volume feature itself optionally has a removal of the child edit callback. This sub-method includes registering the meta-property remove child callback class method with the geometry modeler interface to be invoked when a feature remove child event occurs, step 3804; attaching a second meta-property attribute instance to the volume feature, step 3806; receiving from the geometry modeler interface the remove child callback specifying the volume feature, a volume object and the second meta-property attribute, step 3808; obtaining a pointer value from the second meta-property attribute and de-referencing the pointer value to locate a second meta-property object, step 3810; and invoking the remove child callback in the second meta-property object. The latter sub-step includes obtaining a second point set preservation property instance, step 3812; obtaining a second point set preservation property policy instance from the second point set preservation property instance, step 3814; initiating the remove child callback method of the second point set policy object with the volume feature and the volume geometry object. The latter sub-step includes removing the point set preservation property from the volume cell, step 3816; obtaining a feature back pointer property instance, step 3818; obtaining a second aggregate back pointer property policy instance from the feature back pointer property instance, step 3820; and initiating the remove child callback method of the second aggregate back pointer property policy instance with the volume feature, the volume geometry object and the volume feature back pointer property. The latter sub-step includes initiating a remove child notify call to the volume feature geometry object identified by the feature back pointer property instance. That latter sub-step includes initiating a call to the volume feature aggregate patron of the volume feature object to validate the geometry of the volume feature object, step 3822; and initiating a call to the volume feature aggregate patron of the volume feature object to invalidate the graphics of the volume feature object, step 3824.

Figure 39:
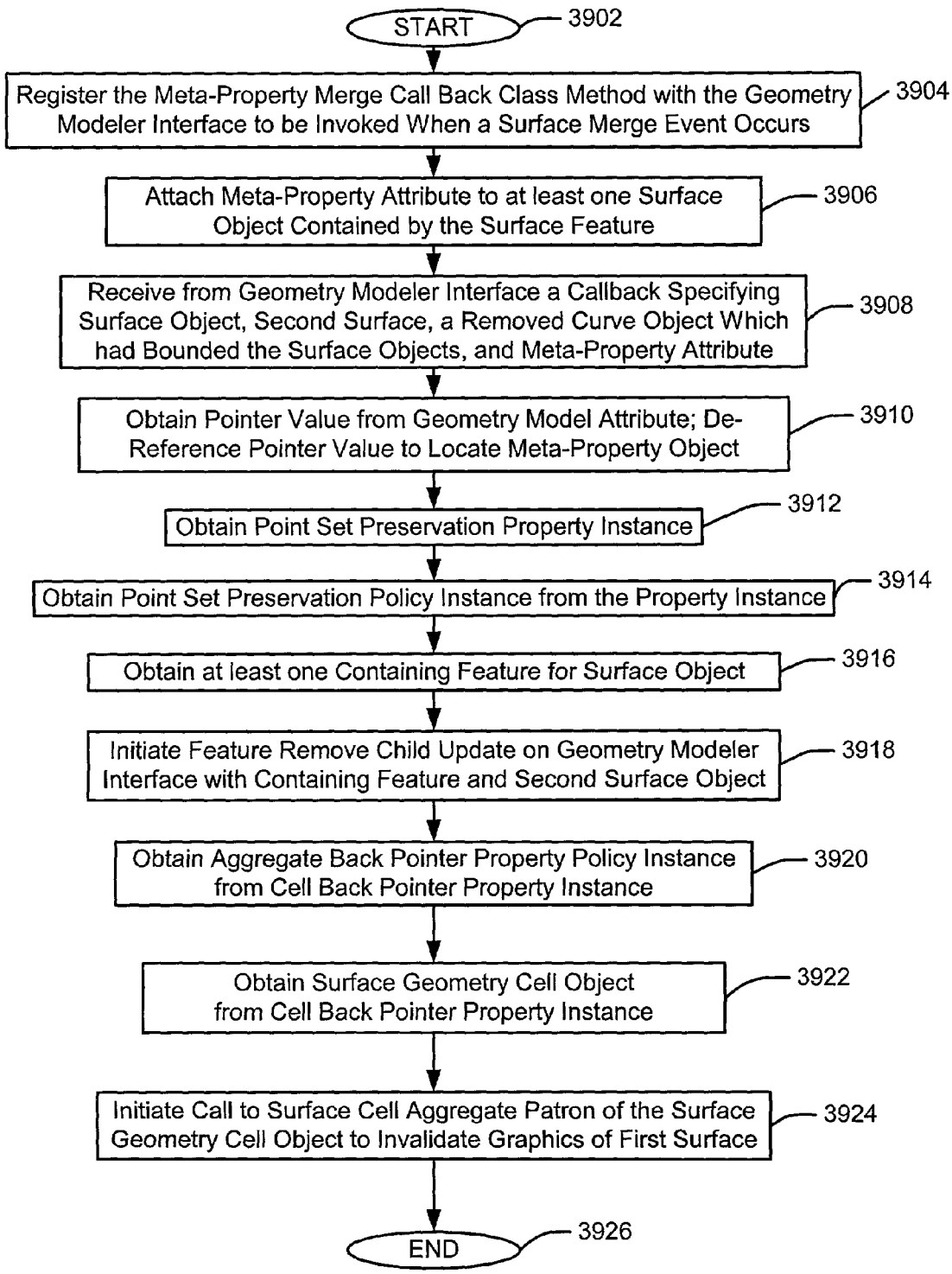

FIG. 39 illustrates the performing of an edit callback on a surface volume is similar to the same method for the volume feature (described above). Specifically, the step of performing an edit callback for a surface feature includes registering the meta-property merge callback class method with the geometry modeler interface to be invoked when a surface merge event occurs, step 3904; attaching a first meta-property attribute to at least one surface object contained by the surface feature, step 3906; receiving from the geometry modeler interface a callback specifying a first surface object, a second surface object, and a curve object which formerly bounded the first and second surfaces and which has been removed from the model and a meta-property attribute, step 3908; obtaining a pointer value from the geometry model attribute and de-referencing the pointer value to locate a first meta-property object, step 3910; and invoking a merge callback in the first meta-property object. The latter sub-step includes obtaining a first point set preservation property instance, step 3912; obtaining a first point set preservation policy instance from the property instance, step 3914; and initiating a first merge callback to the point set preservation policy instance with the point set preservation property instance, the first surface object, the second surface object, and the curve object. The latter sub-step includes obtaining at least one containing feature for the first surface object, step 3916; and initiating a feature remove child update on the geometry modeler interface with the containing feature and the second surface object, step 3918; obtaining a cell back pointer property instance; obtaining an aggregate back pointer property policy instance from the cell back pointer property instance, step 3920; and initiating a second merge callback to the aggregate back pointer property policy instance with the cell back pointer property instance, the first surface object, the second surface object, and the curve object. The latter sub-step includes obtaining a surface geometry cell object from the cell back pointer property instance, step 3922; and initiating a cell merge call to the surface geometry cell object. The latter sub-step itself includes initiating a call to the surface cell aggregate patron of the surface geometry cell object to invalidate the graphics of the first surface, step 3924.

Figure 40:
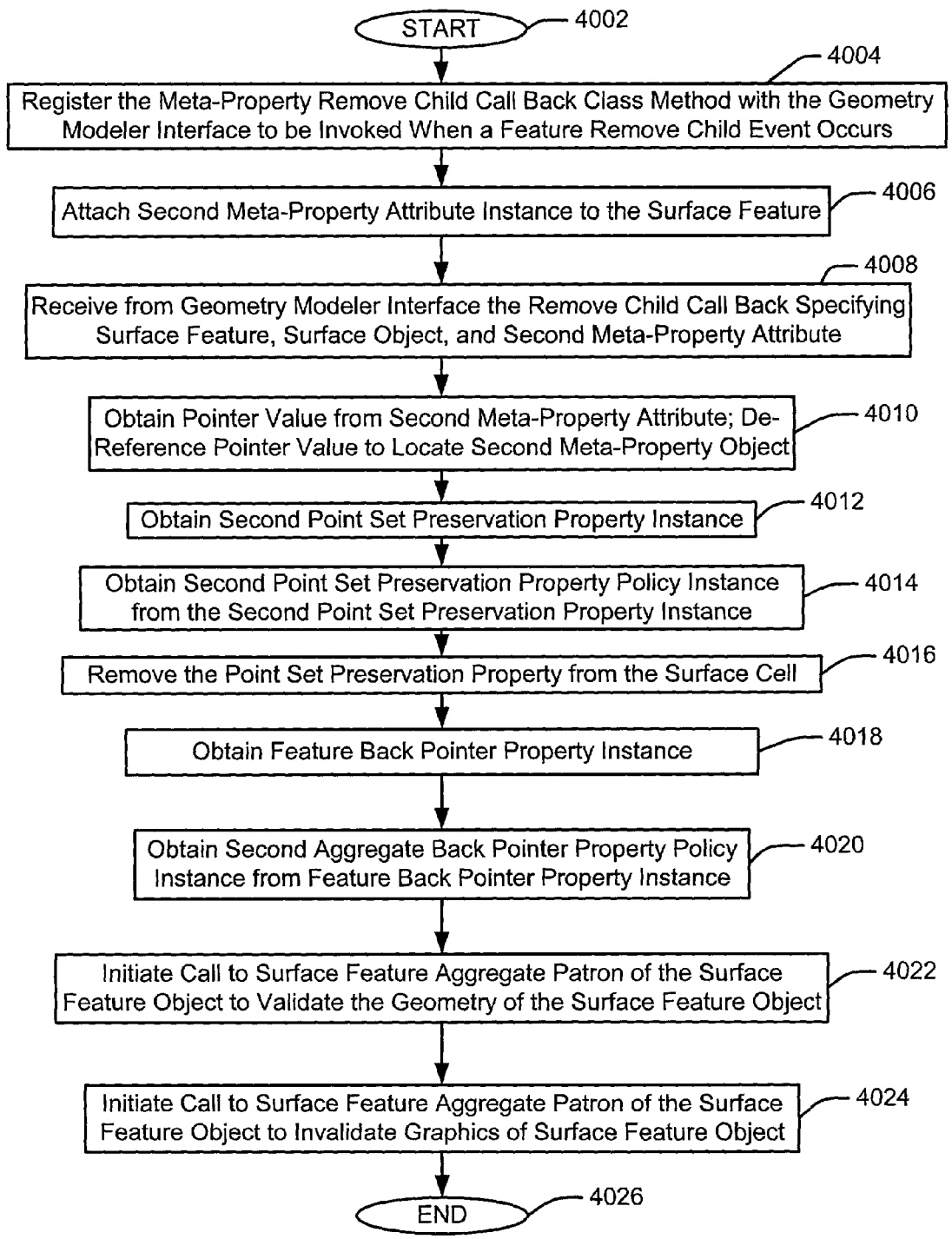

Finally, FIG. 40 illustrates the step of performing a feature remove callback for a surface feature where a method includes registering the meta-property remove child callback class method with the geometry modeler interface to be invoked when a feature remove child event occurs, step 4004; attaching a second meta-property attribute instance to the surface feature, step 4006; receiving from the geometry modeler interface the remove child callback specifying the surface feature, a surface object and the second meta-property attribute, step 4008; obtaining a pointer value form the second meta-property attribute and de-referencing the pointer value to locate a second meta-property object, step 4010; and invoking the remove child callback in the second meta-property object with the second meta-property attribute, the surface feature and the surface geometry object. The latter sub-step includes obtaining a second point set preservation property instance, step 4012; obtaining a second point set preservation property policy instance from the second point set preservation property instance, step 4014; and initiating the remove child callback method of the second point set policy object with the surface feature and the surface geometry object. The latter sub-step itself includes removing the point set preservation property from the surface cell, step 4016; obtaining a feature back pointer property instance, step 4018; obtaining a second aggregate back pointer property policy instance from the feature back pointer property instance, step 4020; and initiating the remove child callback method of the second aggregate back pointer property policy instance with the surface feature, the surface geometry object and the surface feature back pointer property. The latter sub-step itself includes initiating an remove child notify call to the surface feature geometry object identified by the feature back pointer property instance. That latter sub-step itself includes initiating a call to the surface feature aggregate patron of the surface feature object to validate the geometry of the surface feature object, step 4022; and initiating a call to the surface feature aggregate patron of the surface feature object to invalidate the graphics of the surface feature object, step 4024.

The present invention, therefor, is well adapted to carry out the objects and attain both the ends and the advantages mentioned, as well as other benefits inherent therein. While the present invention has been depicted, described, and is defined by reference to particular embodiments of the invention, such references do not imply a limitation on the invention, and no such limitation is to be inferred. The invention is capable of considerable modification, alternation, alteration, and equivalents in form and/or function, as will occur to those of ordinary skill in the pertinent arts. The depicted and described embodiments of the invention are exemplary only, and are not exhaustive of the scope of the invention. Consequently, the invention is intended to be limited only by the spirit and scope of the appended claims, giving full cognizance to equivalents in all respects.

What is claimed is:

1. A method for interactively editing a model comprising a first surface feature, the method being implemented on a computer comprising a processor, a data storage system, at least one input device and at least one output device, the computer further having memory including random access memory, the model being stored on a computer-readable media, the method comprising:
   creating a scenegraph;
   loading data of the first surface feature from a database stored in the data storage system into memory of the computer;
   creating an aggregate feature for the first surface feature;
   creating a first graphics object from the aggregate feature;
   adding the first graphic object to the scenegraph;
   creating a geometry object for the aggregate feature;
   editing the first surface feature in the model;
   selectively updating the graphics for the model; and
   removing the first graphics object of the first surface feature from the scenegraph.

2. A method as in claim 1 wherein the in the loading step, the first surface feature from a database stored in the data storage system into the random access memory of the computer.

3. A method as in claim 1 wherein the in the loading step, the first surface feature from a database stored in the data storage system into memory of the computer other than the random access memory.

4. The method of claim 1, wherein said step of editing comprises:
providing an interface;
providing an IGM operative with said interface;
providing a GQI operative with the IGM;
through the interface, selecting an operation to perform on a second surface feature, the interface being constructed and arranged to inform the IGM of the selection;
invoking the operation with the GQI;
performing at least one callback from the GQI to the IGM during execution of the operation; and
updating the graphics object of the model to refresh the output device.

5. The method of claim 1, wherein the step of editing is accomplished via irregular space partitioning.

6. The method of claim 1, wherein the step of updating the graphics object includes creating the graphics object.

7. The method of claim 4, wherein the step of performing the callback causes a change of state for the aggregate feature.

8. The method of claim 7, wherein the change of state for the aggregate feature is in a consistency finite state machine.

9. The method of claim 8, wherein the consistency finite state machine manages consistency between geometry and graphics.

10. The method of claim 7, wherein the step of performing the callback includes invalidating the graphics object for the aggregate feature.

11. The method of claim 7, wherein the step of performing the callback includes validating the geometry of the aggregate feature.

12. The method of claim 7, wherein the step of performing the callback includes providing a set of objects comprising:
a first geometry modeler feature object;
a changed geometry object contained in the geometry modeler feature object;
a first meta-property attribute object operatively associated with the changed geometry object;
a first meta-property object associated with the first meta-property attribute object, the first meta-property object having:
a point set preservation property object;
a point set preservation property policy object;
a cell back pointer property object;
an aggregate back pointer property policy object;
a geometry cell object associated with the cell back pointer object; an aggregate cell object associated with the geometry cell object; and
a display cell graphics object associated with the aggregate cell object;
a second meta-property attribute object associated with the geometry modeler feature object; and
a second meta-property object associated with the second meta-property attribute object, the second meta-property object having:
a second point set preservation property object;
a second point set preservation property policy object;
a feature back pointer property object;
a second aggregate back pointer property policy object;
a geometry feature object associated with the feature back pointer property object;
an aggregate feature object associated with the geometry feature object; and
a display feature graphics object associated with the aggregate feature object.

13. The method of claim 12, wherein the step of performing the callback includes:
if the callback is for a volume object, then performing an edit callback for a volume feature; otherwise performing an edit callback for a surface feature.

14. The method of claim 1, wherein the step of updating includes updating graphics for only those cells that have changed geometrically.

15. The method of claim 1, wherein the step of updating includes updating graphics for only those features that have changed topologically.

16. The method of claim 1, wherein the step of creating graphics for at least one aggregate feature from the model comprises:
obtaining all relevant surface features in the model;
for each of the relevant surface features:
if the surface feature has a graphics object, then updating the graphics object for the surface feature, otherwise creating a graphics object for the surface feature; and
adding the graphics object for the surface feature to a surface scenegraph root node.

17. The method of claim 16, wherein the step of creating the graphics object comprises:
obtaining aggregate objects of all two-dimensional cells for the surface feature;
prompting the aggregate objects of each of the cells to obtain at least one valid graphics object and to add the graphics object to a sub-scenegraph of the surface feature; and
validating the graphics object of the surface feature.

18. The method of claim 17, wherein the step of obtaining valid graphics object for a cell comprises:
if the graphics object for the cell does not exist, then creating the graphics object for the cell and validating the graphics; and
if the graphics object for the cell exists and is not valid, then updating the graphics object for the cell and validating the graphics.

19. The method of claim 1, wherein the step of updating the graphics object includes referencing a visibility finite state machine.

20. The method of claim 19, wherein the visibility finite state machine manages the updating of the graphics objects and the updating of the visibility of the graphics objects.

21. The method of claim 20, wherein the visibility finite state machine enables the update of only those graphics of objects that are designated as visible.

22. The method of claim 20, wherein the step of updating includes:
designating a graphics object as visible;
checking the validity of the graphics object;
if the graphics object is valid, then adding the graphics object to the scenegraph, otherwise, updating the graphics object and then adding the graphics object to the scenegraph.

23. The method of claim 1, wherein the step of creating graphics for at least one volume cell from the model comprises:
obtaining at least one relevant active volume cell in the model;
ensuring that graphics objects of all two-dimensional cells of each volume cell have been created;
for each of the two-dimensional cells, obtaining the aggregates and create a new aggregate if the two-dimensional cell aggregate does not exist;

ensuring that each two-dimensional cell has valid graphics;

creating a graphics object for each of the at least one volume cell;

for each volume cell, adding the graphics content of each two-dimensional cells of the volume cell to the sub-scenegraph of the graphics object of the volume cell; and adding the graphics object for each volume cell to the volume scenegraph root node.

24. The method of claim 23, wherein an instantiation of a graphics content, of a two-dimensional cell is shared by at least one scenegraph containing a graphics object of a surface feature that has the two-dimensional cell as a child, and at least one of the scenegraphs that contains graphics objects of either one volume cell or two volume cells that have the two-dimensional cell as part of their boundaries.

25. The method of claim 8, wherein the step of updating includes:
checking the state of each feature in the scenegraph;
if the graphics is valid or if the geometry is invalid for the feature, then not updating the graphics object of the feature;
if the geometry is valid and the graphics are invalid, then updating the graphics object of the feature.

26. The method of claim 8, wherein the step of updating includes:
checking the state of each cell in the scenegraph;
if the graphics is valid or if the geometry is invalid for the cell, then not updating the graphics object of the cell;
if the geometry is valid and the graphics is invalid, then updating the graphics object of the cell.

27. The method of claim 13, wherein the step of performing an edit callback for a volume feature comprises:
registering the meta-property split callback class method with the geometry modeler interface, the geometry modeler interface constructed and arranged to be invoked when a volume split event occurs;
attaching a first meta-property attribute to at least one volume object contained by the volume feature;
receiving, from the geometry modeler interface, a callback specifying a first volume object, a second volume affected by a change to the first volume object and the first meta-property attribute;
obtaining a pointer value from the first meta-property attribute and de-referencing the pointer value to locate a first meta-property object;
invoking a split callback in the first meta-property object with the first meta-property attribute, the first volume object and the second volume object, comprising:
obtaining a first point set preservation property instance;
obtaining a first point set preservation policy instance from the property instance;
initiating a first split callback to the point set preservation policy instance with the point set preservation property instance, the first volume object and the second volume object comprising:
obtaining at least one containing feature for the first volume object; and
initiating a feature add child update on the geometry modeler interface with the containing feature and the second volume object;
obtaining a cell back pointer property instance; and
obtaining an aggregate back pointer property policy instance from the cell back pointer property instance; and initiating a second split callback to the aggregate back pointer property policy instance with the cell back pointer property instance comprising:
obtaining a volume geometry cell object from the cell back pointer property instance; and
initiating a cell split call to the volume geometry cell object, comprising:
initiating a call to the volume cell aggregate patron of the volume geometry cell object to invalidate the graphics of the first volume.

28. The method of claim 27, wherein the step of performing a feature add child callback for a volume feature comprises:
registering the meta-property add child callback class method with the geometry modeler interface to be invoked when a feature add child event occurs;
attaching a second meta-property attribute instance to the volume feature;
receiving from the geometry modeler interface the add child callback specifying the volume feature, a volume object and the second meta-property attribute;
obtaining a pointer value from the second meta-property attribute and de-referencing the pointer value to locate a second meta-property object;
invoking the add child callback in the second meta-property object comprising:
obtaining a second point set preservation property instance;
obtaining a second point set preservation property policy instance from the second point set preservation property instance; and
initiating the add child callback method of the second point set policy object with the volume feature and the volume geometry object, comprising:
attaching the point set preservation property to the volume cell;
obtaining a feature back pointer property instance;
obtaining a second aggregate back pointer property policy instance from the feature back pointer property instance; and
initiating the add child callback method of the second aggregate back pointer property policy instance with the volume feature, the volume geometry object and the volume feature back pointer property, comprising:
initiating an add child notify call to the volume feature geometry object identified by the feature back pointer property instance, comprising:
initiating a call to the volume feature aggregate patron of the volume feature object to validate the geometry of the volume feature object; and
initiating a call to the volume feature aggregate patron of the volume feature object to invalidate the graphics of the volume feature object.

29. The method of claim 13, wherein the step of performing an edit callback for a surface feature comprises:
registering the meta-property split callback class method with the geometry modeler interface to be invoked when a surface split event occurs;
attaching a first meta-property attribute to at least one surface object contained by the surface feature;
receiving from the geometry modeler interface a callback specifying a first surface object, a second surface affected by a change to the first surface and the first meta-property attribute;
obtaining a pointer value from the first meta-property attribute and de-referencing the pointer value to locate a first meta-property object;

invoking a split callback in the first meta-property object with the first surface object, the second surface object and the first meta-property attribute, comprising:
obtaining a first point set preservation property instance;
obtaining a first point set preservation policy instance from the property instance; and
initiating a first split callback to the point set preservation policy instance with the point set preservation property instance, the first surface object and the second surface object comprising:
obtaining at least one containing feature for the first surface object; and
initiating a feature add child update on the geometry modeler interface with the containing feature and the second surface object;
obtaining a cell back pointer property instance;
obtaining an aggregate back pointer property policy instance from the cell back pointer property instance; and
initiating a second split callback to the aggregate back pointer property policy instance with the cell back pointer property instance comprising:
obtaining a surface geometry cell object from the cell back pointer property instance; and
initiating a cell split call to the surface geometry cell object, comprising:
initiating a call to the surface cell aggregate patron of the surface geometry cell object to invalidate the graphics of the first surface.

30. The method of claim 29, wherein the step of performing a feature add callback comprises:
registering the meta-property add child callback class method with the geometry modeler interface to be invoked when a feature add child event occurs;
attaching a second meta-property attribute instance to the surface feature;
receiving from the geometry modeler interface the add child callback specifying the surface feature, a surface object and the second meta-property attribute;
obtaining a pointer value from the second meta-property attribute and de-referencing the pointer value to locate a second meta-property object; and
invoking the add child callback in the second meta-property object comprising:
obtaining a second point set preservation property instance;
obtaining a second point set preservation property policy instance from the second point set preservation property instance; and
initiating the add child callback method of the second point set policy object with the surface feature and the surface geometry object, comprising:
attaching the point set preservation property to the surface cell;
obtaining a feature back pointer property instance;
obtaining a second aggregate back pointer property policy instance from the feature back pointer property instance; and
initiating the add child callback method of the second aggregate back pointer property policy instance with the surface feature, the surface geometry object and the surface feature back pointer property, comprising:
initiating an add child notify call to the surface feature geometry object identified by the feature back pointer property instance, comprising:
initiating a call to the surface feature aggregate patron of the surface feature object to validate the geometry of the surface feature object; and
initiating a call to the surface feature aggregate patron of the surface feature object to invalidate the graphics of the surface feature object.

31. The method of claim 4, wherein the step of performing the callback causes a change of state for the cell.

32. The method of claim 31, wherein the change of state for the cell is in a consistency finite state machine.

33. The method of claim 4, wherein the second surface feature is not contained within the model.

34. The method of claim 4, wherein the second surface feature is contained within the model.

35. The method of claim 1, wherein the output device is a display.

36. The method of claim 13, wherein the step of performing an edit callback for a volume feature comprises:
registering the meta-property merge callback class method with the geometry modeler interface to be invoked when a volume merge event occurs;
attaching a first meta-property attribute to at least one volume object contained by the volume feature;
receiving from the geometry modeler interface a callback specifying a first volume object, a second volume object, a surface object which formerly bounded the first and second volume objects and which has been removed from the model, and a meta-property attribute;
obtaining a pointer value from the geometry model attribute and de-referencing the pointer value to locate a first meta-property object; and
invoking a merge callback in the first meta-property object, comprising:
obtaining a first point set preservation property instance;
obtaining a first point set preservation policy instance from the property instance; and
initiating a first merge callback to the point set preservation policy instance with the point set preservation property instance, the first volume object, the second volume object, and the surface object, comprising:
obtaining at least one containing feature for the first volume object; and
initiating a feature remove child update on the geometry modeler interface with the containing feature and the second volume object;
obtaining a cell back pointer property instance;
obtaining an aggregate back pointer property policy instance from the cell back pointer property instance; and
initiating a second merge callback to the aggregate back pointer property policy instance with the cell back pointer property instance, the first volume object, the second volume object, and the surface object, comprising:
obtaining a volume geometry cell object from the cell back pointer property instance, and
initiating a cell merge call to the volume geometry cell object, comprising:
initiating a call to the volume cell aggregate patron of the volume geometry cell object to invalidate the graphics of the first volume.

37. The method of claim 36, wherein the step of performing a feature remove child callback comprises:
registering the meta-property remove child callback class method with the geometry modeler interface to be invoked when a feature remove child event occurs;

attaching a second meta-property attribute instance to the volume feature;

receiving from the geometry modeler interface the remove child callback specifying the volume feature, a volume object and the second meta-property attribute;

obtaining a pointer value from the second meta-property attribute and de-referencing the pointer value to locate a second meta-property object; and invoking the remove child callback in the second meta-property object comprising:

obtaining a second point set preservation property instance;

obtaining a second point set preservation property policy instance from the second point set preservation property instance;

initiating the remove child callback method of the second point set policy object with the volume feature and the volume geometry object, comprising:

removing the point set preservation property from the volume cell;

obtaining a feature back pointer property instance;

obtaining a second aggregate back pointer property policy instance from the feature back pointer property instance; and initiating the remove child callback method of the second aggregate back pointer property policy instance with the volume feature, the volume geometry object and the volume feature back pointer property, comprising:

initiating an remove child notify call to the volume feature geometry object identified by the feature back pointer property instance, comprising:

initiating a call to the volume feature aggregate patron of the volume feature object to validate the geometry of the volume feature object; and initiating a call to the volume feature aggregate patron of the volume feature object to invalidate the graphics of the volume feature object.

38. The method of claim 13, wherein the step of performing an edit callback for a surface feature comprises:

registering the meta-property merge callback class method with the geometry modeler interface to be invoked when a surface merge event occurs;

attaching a first meta-property attribute to at least one surface object contained by the surface feature;

receiving from the geometry modeler interface a callback specifying a first surface object, a second surface object, and a curve object which formerly bounded the first and second surfaces and which has been removed from the model and a meta-property attribute;

obtaining a pointer value from the geometry model attribute and de-referencing the pointer value to locate a first meta-property object; and invoking a merge callback in the first meta-property object, comprising:

obtaining a first point set preservation property instance;

obtaining a first point set preservation policy instance from the property instance; and initiating a first merge callback to the point set preservation policy instance with the point set preservation property instance, the first surface object, the second surface object, and the curve object, comprising:

obtaining at least one containing feature for the first surface object; and initiating a feature remove child update on the geometry modeler interface with the containing feature and the second surface object;

obtaining a cell back pointer property instance;

obtaining an aggregate back pointer property policy instance from the cell back pointer property instance; and initiating a second merge callback to the aggregate back pointer property policy instance with the cell back pointer property instance, the first surface object, the second surface object, and the curve object comprising:

obtaining a surface geometry cell object from the cell back pointer property instance; and initiating a cell merge call to the surface geometry cell object, comprising:

initiating a call to the surface cell aggregate patron of the surface geometry cell object to invalidate the graphics of the first surface.

39. The method of claim 38, wherein the step of performing a feature remove callback comprises:

registering the meta-property remove child callback class method with the geometry modeler interface to be invoked when a feature remove child event occurs;

attaching a second meta-property attribute instance to the surface feature;

receiving from the geometry modeler interface the remove child callback specifying the surface feature, a surface object and the second meta-property attribute;

obtaining a pointer value from the second meta-property attribute and de-referencing the pointer value to locate a second meta-property object; and invoking the remove child callback in the second meta-property object with the second meta-property attribute, the surface feature and the surface geometry object comprising:

obtaining a second point set preservation property instance;

obtaining a second point set preservation property policy instance from the second point set preservation property instance; and initiating the remove child callback method of the second point set policy object with the surface feature and the surface geometry object, comprising:

removing the point set preservation property from the surface cell;

obtaining a feature back pointer property instance;

obtaining a second aggregate back pointer property policy instance from the feature back pointer property instance; and initiating the remove child callback method of the second aggregate back pointer property policy instance with the surface feature, the surface geometry object and the surface feature back pointer property, comprising:

initiating an remove child notify call to the surface feature geometry object identified by the feature back pointer property instance, comprising:

initiating a call to the surface feature aggregate patron of the surface feature object to validate the geometry of the surface feature object; and initiating a call to the surface feature aggregate patron of the surface feature object to invalidate the graphics of the surface feature object.

40. A computer system for interactively editing a model stored on computer-readable media and having a first surface, the computer system further having a processor, a data storage system, at least one input device, and at least one output device, the computer system further having random access memory constructed and arranged to contain an object structure, the object structure comprising:

a geometry query interface object, the geometry query interface object having a GQI material property framework object, the GQI material property framework object comprising:

a cc_RefObj object;

a gmMP object having an IsA relationship with the cc_RefObj object;

a gmMPPolicy object having an IsA relationship with the cc_RefObj object; and a gmMPConstant object having an IsA relationship with the gmMP object an interactive geometric modeling object derived from a common model builder object, the interactive geometric modeling object having a relationship with the GQI material property framework object, and an IGM material property framework object, the IGM material property framework object comprising:

a gmMPPolyXYZ object having an IsA relationship with the gmMP object;

a gmMPZ object having an IsA relationship with the gmMP object;

a gmMPTime object having an IsA relationship with the gmMPZ object;

a gmMPDepth object having an IsA relationship with the gmMPZ object;

a gmMP2DPoly object having an IsA relationship with the gmMP object;

a gmMP2DGrid object having an IsA relationship with the gmMP object;

a gmMP3dGrid object having an IsA relationship with the gmMP object;

a gmMPName object having an IsA relationship with the gmMPConstant object;

an mbCellGMReference object having an IsA relationship with the gmMPConstant object;

a mbFtrGMReference object having an IsA relationship with the gmMPConstant object;

a vspQualityProp object having an IsA relationship with the gmMPConstant object;

a vspTransverseIsotroppy object having an IsA relationship with the gmMPConstant object; and a fbFtrParameters object having an IsA relationship with the gmMPConstant object;

wherein data is processed by the object structure in order to enable a user to edit the model.

41. The computer system as in claim 40, the IGM material property framework object further comprising:

a gmGradientProp object;

a vspDensProp object having an IsA relationship with the gmGradProp object;

a vspVelPProp object having an IsA relationship with the gmGradProp object;

a vspVelSProp object having an IsA relationship with the gmGradProp object; and a gmResistivityProp object having an IsA relationship with the gmGradProp object.

42. The computer system as in claim 40, the IGM material property framework object further comprising:

a gmMPNamePropertyPolicy object having a composition relationship with the gmMPName object.

43. The computer system as in claim 40, the IGM material property framework object further comprising:

a gmMPIGMPropertyPolicy object having a composition association with the mbCellGMReference object and a composition relationship with the mbFtrGMReference object.

44. The computer system as in claim 40, the GQI material property framework object further comprising:

a gmutil_status object;

an my_vt object; and a gm_mp_atoms object.

45. The computer system as in claim 40, the GQI material property framework object further comprising:

a gmSysRules object having an IsA relationship with the gmMPConstant object;

a gmSysPSPProperty object having an IsA relationship with the gmMPConstant object;

a gmUtilFtrBnd object having an IsA relationship with the gmMPConstant object;

a gmMPGQIPolicy object having an IsA relationship with the gmMPPolicy object;

a gmSysPSPolicy object having an IsA relationship with the gmMPPolicy object and a composition relationship with the gmSysPSPProperty object;

a gmSysRulesPolicy object having an IsA relationship with the gmMPPolicy object and a composition relationship with the gmSysRules object; and a gmMPVolumePropertyPolicy object having an IsA relationship with the gmMPPolicy object and a composition relationship with the gmMPConstant object.

46. The computer system as in claim 45, the GQI material property framework object further comprising:

a gmUtilFtrBndPolicy object having an IsA relationship with the gmMPGQIPolicy object.

47. The computer system as in claim 45, the GQI material property framework object further comprising:

a gmMPTopologyTraversalStates object having a composition relationship with the gmMPPolicy object.

48. The computer system as in claim 46, wherein a gmMPIGMPropertyPolicy object has an IsA relationship with the gmUtilFtrBndPolicy object.

49. The computer system as in claim 45, wherein a gmMPNamePropertyPolicy object has an IsA relationship with the gmMPVolumePropertyPolicy object.

50. The computer system as in claim 41, wherein a gmMPVolumePropertyPolicy object has a first composition relationship with the gmGradientProp object and a second composition relationship with the gmMPZ object.

51. The computer system of claim 40, the computer system further comprising:

an aqi_Parameter object having a relationship with the gmMP object;

a gmMPTopologyTraversalState object having a relationship with the gmMPPolicy object;

a first gqi_MetaProperty object having a relationship with the gmMP object;

a second gqi_MetaProperty object having a relationship with the gmMP object;

a gqi_AttachmentSite object having a relationship with the first gqi_MetaProperty object; and a gqi_Core object having a relationship with the second gqi$_{13}$ MetaProperty object and an IsA relationship with the gqi_AttachmentSite object.

52. The computer system of claim 51, the computer system further comprising:

an ag_BaseClass object;

an ag_Geometry object having an IsA relationship with the ag_BaseClass object;

a gm_Geometry object having an hasA relationship with the ag_Geometry object, the gm_Geometry object having a relationship with the Geometry object;

an oi_Feature object having a relationship with an ag_Feature object, the ag_Feature object having an IsA relationship with the ag_Geometry object, the ag_Feature object further having a relationship with the gm_Feature object;

an oi_Cell object having a relationship with an ag_Cell object, the ag_Cell object having an IsA relationship with the ag_Cell object, the ag_Cell object further having a relationship with the gm_Cell object;

an X_Feature object having a relationship with the gm_Feature object, the X_Feature object having an IsA relationship with an xAttrFtr object, the xAttrFtr object having an IsA relationship with a gqi_Feature object, and the gqi_Feature object having an IsA relationship with the X_Feature object;

an X_Cell object, the X_Cell object having an IsA relationship with the X_Feature object the X_Cell object having an IsA relationship with a first xAttrMP object, the first xAttrMP object having an IsA relationship with a first gqi_MetaProperty object, the first gqi_MetaProperty object having an association with a FtrRef object, the FtrRef object having at least one association with the gm_Feature object; and the X_Feature object further having an IsA relationship with a second xAttrMP object, the second xAttrMP object having an IsA relationship with a second gqi_MetaProperty object, the second gqi_MetaProperty object having an association with CellRef object, the CellRef object having at least one association with the gm_Cell object.

53. A random access memory, the random access memory having an object structure comprising:

a geometry query interface object, the geometry query interface object having a GQI material property framework object, the GQI material property framework object comprising: a cc_RefObj object;

a gmMP object having an IsA relationship with the cc_RefObj object;

a gmMPPolicy object having an IsA relationship with the cc_RefObj object; and a gmMPConstant object having an IsA relationship with the gmMP object an interactive geometric modeling object derived from a common model builder object, the interactive geometric modeling object having a relationship with the GQI material property framework object, and an IGM material property framework object, the IGM material property framework object comprising:

a gmMPPolyXYZ object having an IsA relationship with the gmMP object;

a gmMPZ object having an IsA relationship with the gmMP object;

a gmMPTime object having an IsA relationship with the gmMPZ object;

a gmMPDepth object having an IsA relationship with the gmMPZ object;

a gmMP2DPoly object having an IsA relationship with the gmMP object;

a gmMP2DGrid object having an IsA relationship with the gmMP object;

a gmMP3dGrid object having an IsA relationship with the gmMP object;

a gmMPName object having an IsA relationship with the gmMPConstant object;

an mbCellGMReference object having an IsA relationship with the gmMPConstant object;

a mbFtrGMReference object having an IsA relationship with the gmMPConstant object;

a vspQualityProp object having an IsA relationship with the gmMPConstant object;

a vspTransverseIsotroppy object having an IsA relationship with the gmMPConstant object; and a fbFtrParameters object having an IsA relationship with the gmMPConstant object;

wherein data is processed by the object structure in order to enable a user to edit a model stored in a database.

54. The random access memory as in claim 53, the IGM material property framework object further comprising:

a gmGradientProp object;

a vspDensProp object having an IsA relationship with the gmGradProp object;

a vspVelPProp object having an IsA relationship with the gmGradProp object;

a vspVelSProp object having an IsA relationship with the gmGradProp object; and a gmResistivityProp object having an IsA relationship with the gmGradProp object.

55. The random access memory as in claim 53, the IGM material property framework object further comprising:

a gmMPNamePropertyPolicy object having a composition relationship with the gmMPName object.

56. The random access memory as in claim 53, the IGM material property framework object further comprising:

a gmMPIGMPropertyPolicy object having a composition association with the mbCellGMReference object and a composition relationship with the mbFtrGMReference object.

57. The random access memory as in claim 53, the GQI material property framework object further comprising:

a gmutil_status object;

an my_vt object; and a gm_mp_atoms object.

58. The random access memory as in claim 53, the GQI material property framework object further comprising:

a gmSysRules object having an IsA relationship with the gmMPConstant object;

a gmSysPSPProperty object having an IsA relationship with the gmMPConstant object;

a gmUtilFtrBnd object having an IsA relationship with the gmMPConstant object;

a gmMPGQIPolicy object having an IsA relationship with the gmMPPolicy object;

a gmSysPSPolicy object having an IsA relationship with the gmMPPolicy object and a composition relationship with the gmSysPSPProperty object;

a gmSysRulesPolicy object having an IsA relationship with the gmMPPolicy object and a composition relationship with the gmSysRules object; and a gmMPVolumePropertyPolicy object having an IsA relationship with the gmMPPolicy object and a composition relationship with the gmMPConstant object.

59. The random access memory as in claim 58, the GQI material property framework object further comprising:

a gmUtilFtrBndPolicy object having an IsA relationship with the gmMPGQIPolicy object.

60. The random access memory as in claim 58, the GQI material property framework object further comprising:

a gmMPTopologyTraversalStates object having a composition relationship with the gmMPPolicy object.

61. The random access memory as in claim 59, wherein a gmMPIGMPropertyPolicy object has an IsA relationship with the gmUtilFtrBndPolicy object.

62. The random access memory as in claim 58, wherein a gmMPNamePropertyPolicy object has an IsA relationship with the gmMPVolumePropertyPolicy object.

63. The random access memory as in claim 54, wherein a gmMPVolumePropertyPolicy object has a first composition relationship with the gmGradientProp object and a second composition relationship with the gmMPZ object.

64. The random access memory of claim 53, the random access memory further comprising:
- an aqi_Parameter object having a relationship with the gmMP object;
- a gmMPTopologyTraversalState object having a relationship with the gmMPPolicy object;
- a first gqi_MetaProperty object having a relationship with the gmMP object;
- a second gqi_MetaProperty object having a relationship with the gmMP object;
- a gqi_AttachmentSite object having a relationship with the first gqi_MetaProperty object; and
- a gqi_Core object having a relationship with the second gqi_MetaProperty object and an IsA relationship with the gqi_AttachmentSite object.

65. The random access memory of claim 64, the random access memory further comprising:
- an ag_BaseClass object;
- an ag_Geometry object having an IsA relationship with the ag_BaseClass object;
- a gm_Geometry object having an hasA relationship with the ag_Geometry object, the gm_Geometry object having a relationship with the Geometry object;
- an oi_Feature object having a relationship with an ag_Feature object, the ag_Feature object having an IsA relationship with the ag_Geometry object, the ag_Feature object further having a relationship with the gm_Feature object;
- an oi_Cell object having a relationship with an ag_Cell object, the ag_Cell object having an IsA relationship with the ag_Cell object, the ag_Cell object further having a relationship with the gm_Cell object;
- an X_Feature object having a relationship with the gm_Feature object, the X_Feature object having an IsA relationship with an xAttrFtr object, the xAttrFtr object having an IsA relationship with a gqi_Feature object, and the gqi_Feature object having an IsA relationship with the X_Feature object;
- an X_Cell object, the X_Cell object having an IsA relationship with the X_Feature object the X_Cell object having an IsA relationship with a first xAttrMP object, the first xAttrMP object having an IsA relationship with a first gqi_MetaProperty object, the first gqi_MetaProperty object having an association with a FtrRef object, the FtrRef object having at least one association with the gm_Feature object; and
- the X_Feature object further having an IsA relationship with a second xAttrMP object, the second xAttrMP object having an IsA relationship with a second gqi_MetaProperty object, the second gqi_MetaProperty object having an association with CellRef object, the CellRef object having at least one association with the gm_Cell object.

* * * * *